US009444740B2

(12) United States Patent
Yamaguchi et al.

(10) Patent No.: US 9,444,740 B2
(45) Date of Patent: Sep. 13, 2016

(54) ROUTER, METHOD FOR CONTROLLING ROUTER, AND PROGRAM

(71) Applicant: Panasonic Corporation, Osaka (JP)

(72) Inventors: Takao Yamaguchi, Osaka (JP); Atsushi Yoshida, Osaka (JP); Tomoki Ishii, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 525 days.

(21) Appl. No.: 13/752,452

(22) Filed: Jan. 29, 2013

(65) Prior Publication Data

US 2013/0194927 A1 Aug. 1, 2013

Related U.S. Application Data

(63) Continuation of application No. PCT/JP2012/001624, filed on Mar. 9, 2012.

(30) Foreign Application Priority Data

| Mar. 28, 2011 | (JP) | 2011-070637 |
| Mar. 28, 2011 | (JP) | 2011-070638 |
| Mar. 28, 2011 | (JP) | 2011-070639 |
| Mar. 28, 2011 | (JP) | 2011-070640 |

(51) Int. Cl.
*H04L 12/801* (2013.01)
*H04L 12/933* (2013.01)
(Continued)

(52) U.S. Cl.
CPC .............. *H04L 47/12* (2013.01); *H04L 47/70* (2013.01); *H04L 49/109* (2013.01); *H04L 49/252* (2013.01); *H04L 49/505* (2013.01)

(58) Field of Classification Search
CPC ... H04L 49/505; H04L 49/252; H04L 47/70; H04L 47/12; H04L 49/109
See application file for complete search history.

(56) References Cited

U.S. PATENT DOCUMENTS 6,347,094 B1 * 2/2002 Gopalakrishnan .. H04L 12/6418
370/464
6,959,151 B1 10/2005 Cotter et al.
(Continued)

FOREIGN PATENT DOCUMENTS

| CN | 1352841 A | 6/2002 |
| CN | 100534063 C | 8/2009 |

(Continued)

OTHER PUBLICATIONS

International Search Report for corresponding International Application No. PCT/JP2012/001624 mailed Apr. 3, 2012.
(Continued)

*Primary Examiner* — Ajay Cattungal
(74) *Attorney, Agent, or Firm* — Renner, Otto, Boisselle & Sklar, LLP

(57) ABSTRACT

A router includes a buffer selection section for receiving a flit from an adjacent router and determining whether to store the flit on an input buffer or to store the flit on a bypass buffer. The buffer selection section executes at least one of a first control of, when a bypass process was performed, changing at least one of a transmission path and a transmission flow rate of data based on a transmission state of the router; and a second control of, when a bypass control section did not execute the bypass process, changing at least one of a transmission path and a transmission flow rate of data based on a transmission state of another first router at which data not subjected to the bypass process and data subjected to the bypass process by another second router are joined together.

23 Claims, 56 Drawing Sheets

(51) Int. Cl.
*H04L 12/911* (2013.01)
*H04L 12/947* (2013.01)
*H04L 12/931* (2013.01)

(56) References Cited

U.S. PATENT DOCUMENTS

| | | | | |
|---|---|---|---|---|
| 2002/0027917 | A1* | 3/2002 | Sugai | H04L 45/00 370/394 |
| 2005/0058149 | A1* | 3/2005 | Howe | H04L 47/10 370/428 |
| 2007/0081515 | A1* | 4/2007 | Dielissen | H04L 12/5693 370/351 |
| 2007/0195761 | A1* | 8/2007 | Tatar | H04L 49/1546 370/389 |
| 2008/0031269 | A1 | 2/2008 | Shimizu et al. | |
| 2009/0059910 | A1* | 3/2009 | Rijpkema | H04L 12/5695 370/375 |
| 2010/0280999 | A1* | 11/2010 | Atluri | G06F 11/1471 707/657 |
| 2011/0019539 | A1 | 1/2011 | Suzuki et al. | |
| 2011/0211451 | A1* | 9/2011 | Dattagupta | H04N 21/2381 370/235 |
| 2012/0124251 | A1* | 5/2012 | Hnatko | G06F 13/28 710/29 |

FOREIGN PATENT DOCUMENTS

| | | |
|---|---|---|
| JP | 2000-201158 A | 7/2000 |
| JP | 2000-269969 A | 9/2000 |
| JP | 2002-344509 A | 11/2002 |
| JP | 2004-356792 A | 12/2004 |
| JP | 2007-510345 T | 4/2007 |
| JP | 2007-228148 A | 9/2007 |
| JP | 2008-042916 A | 2/2008 |
| JP | 2008-294586 A | 12/2008 |
| JP | 2010-114592 A | 5/2010 |

OTHER PUBLICATIONS

PCT/ISA/237 for corresponding International Application No. PCT/JP2012/001624 dated Apr. 3, 2012 and partial English translation.
Matsutani et al., "Evaluations of Prediction Router for Low-Latency On-Chip Networks", Technical Report of the Institute of Electronics, Information and Communication Engineers 2009-ARC-181, pp. 1-6, Jan. 2009.
John Kim, "Low-Cost Router Microarchitecture for On-Chip Networks", MICRO '09, Dec. 12-16, 2009.
Co-pending U.S. Appl. No. 13/752,462, filed Jan. 29, 2013 (application provided).
International Search Report for related International Application No. PCT/JP2012/001625 mailed Apr. 3, 2012.
PCT/ISA/237 for related International Application No. PCT/JP2012/001625 dated Apr. 3, 2012 and partial English translation.
Chinese Search Report for corresponding Chinese Application No. 201280003958.5 dated Aug. 4, 2015 and English translation thereof.

* cited by examiner

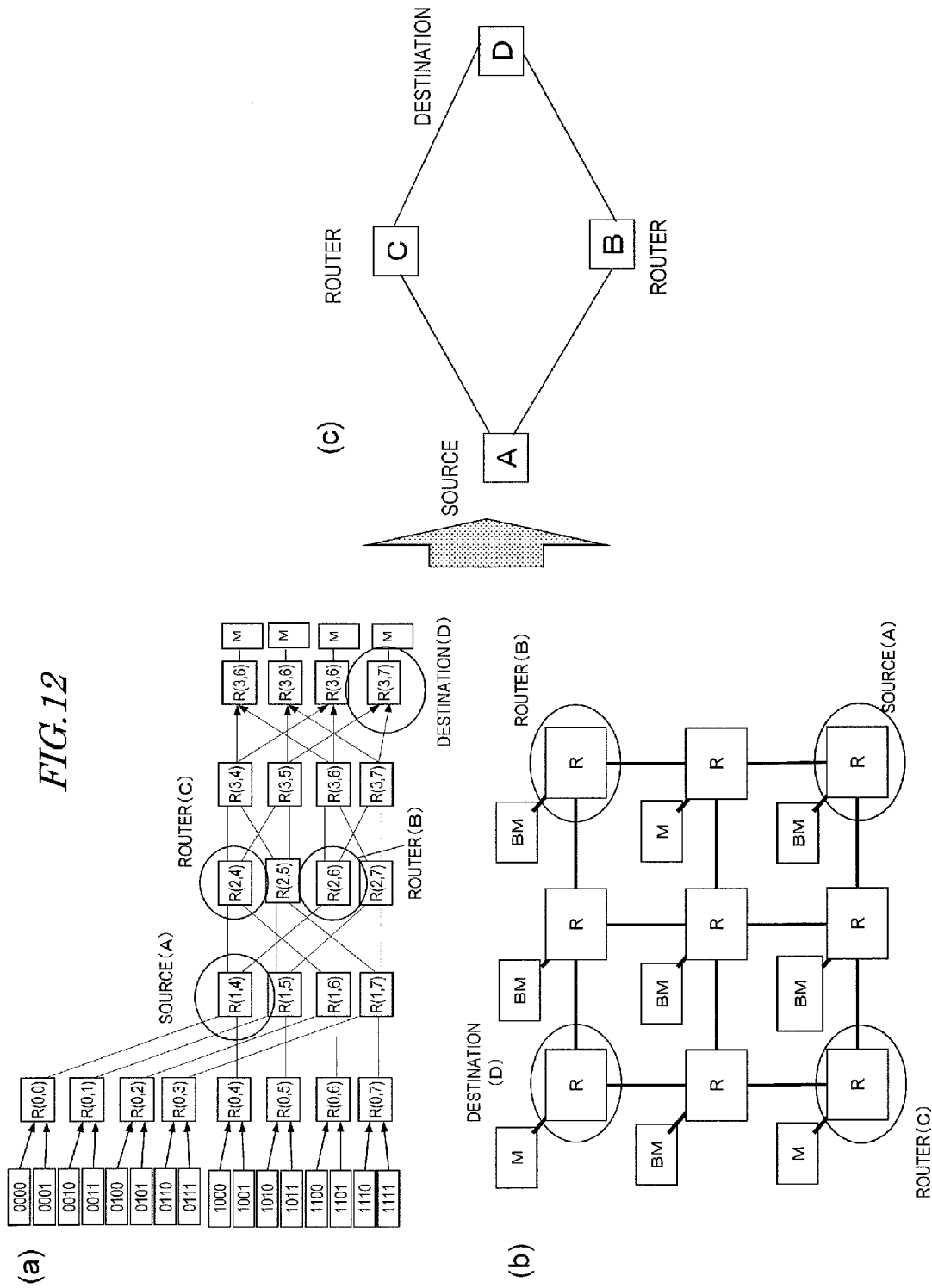

(1) BYPASS PERFORMED
(2) NOTIFICATION
SOURCE
A
C
DESTINATION
D
(3) DETOUR
B

| PATH NO. | PATH |
|---|---|
| 1 | A ⇒ B |
| 2 | A ⇒ B ⇒ D |
| 3 | A ⇒ C |
| 4 | A ⇒ C ⇒ D |

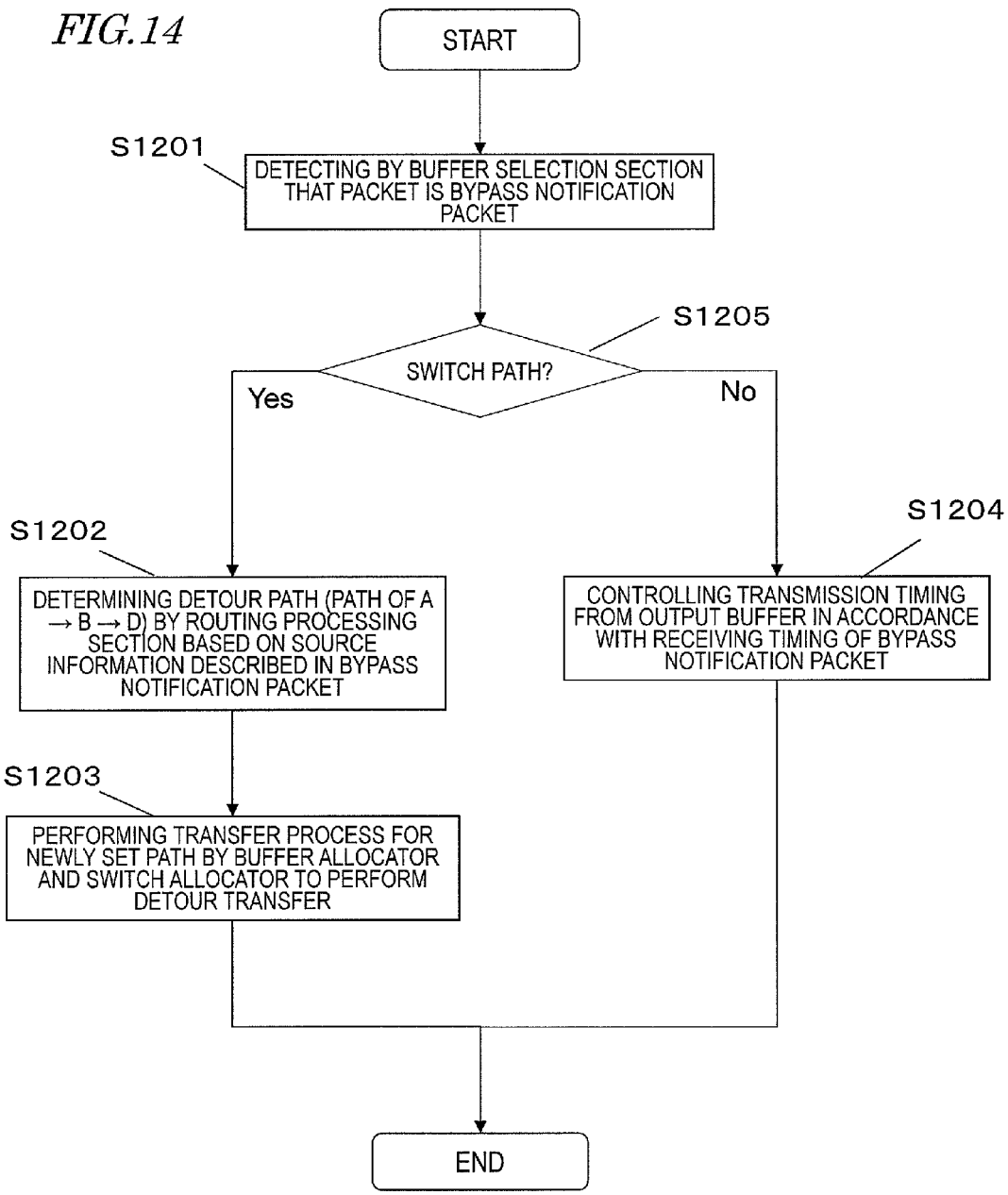

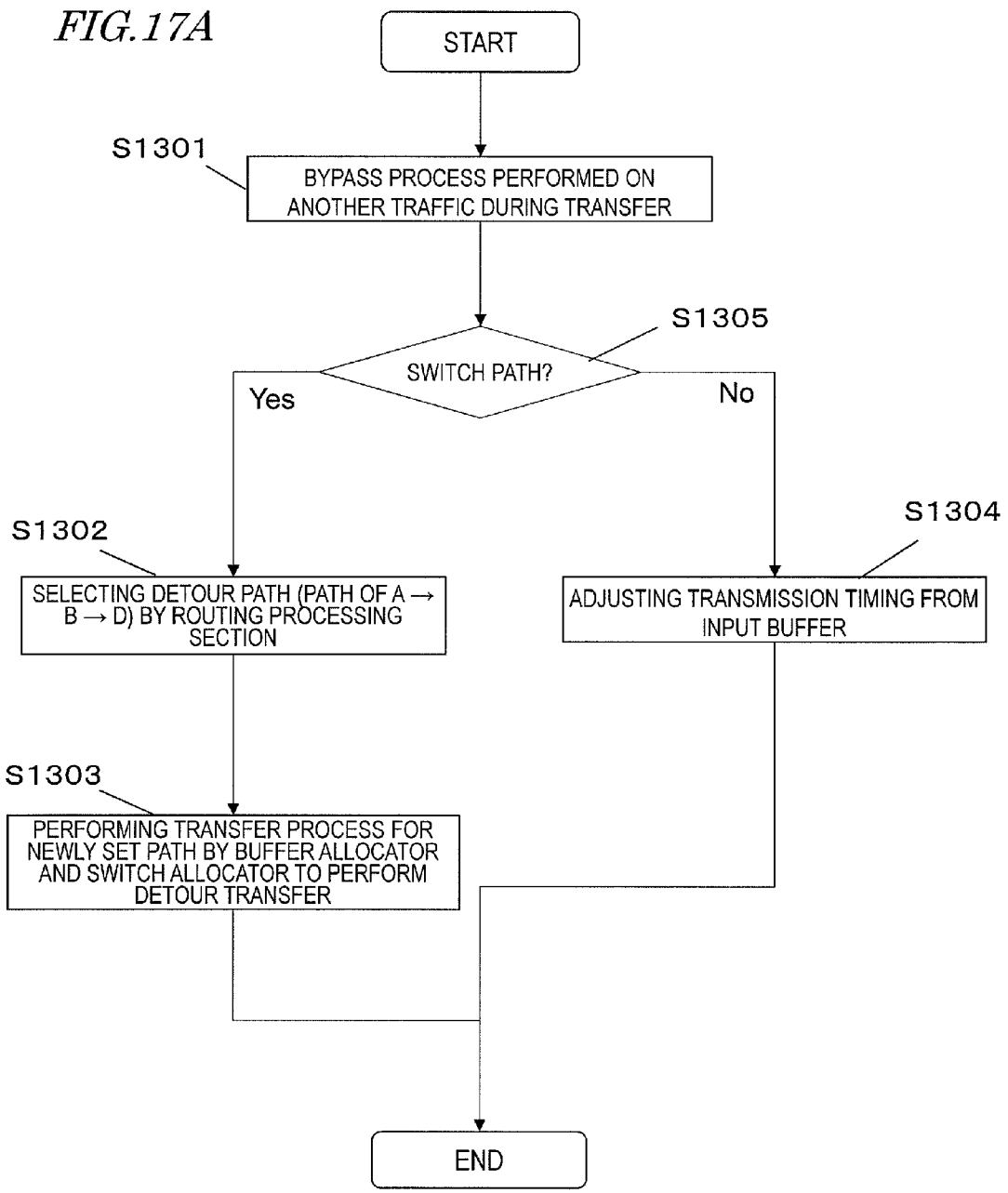

FIG.20
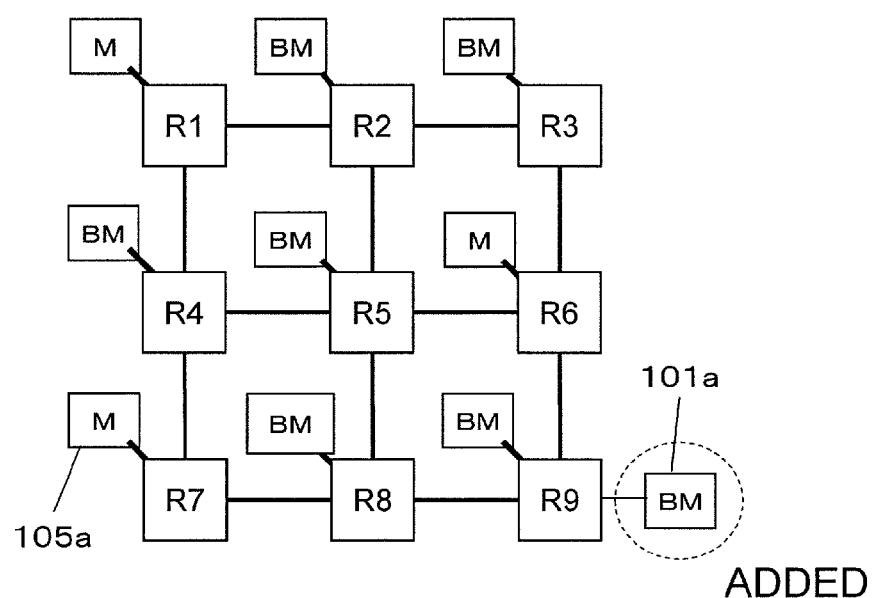
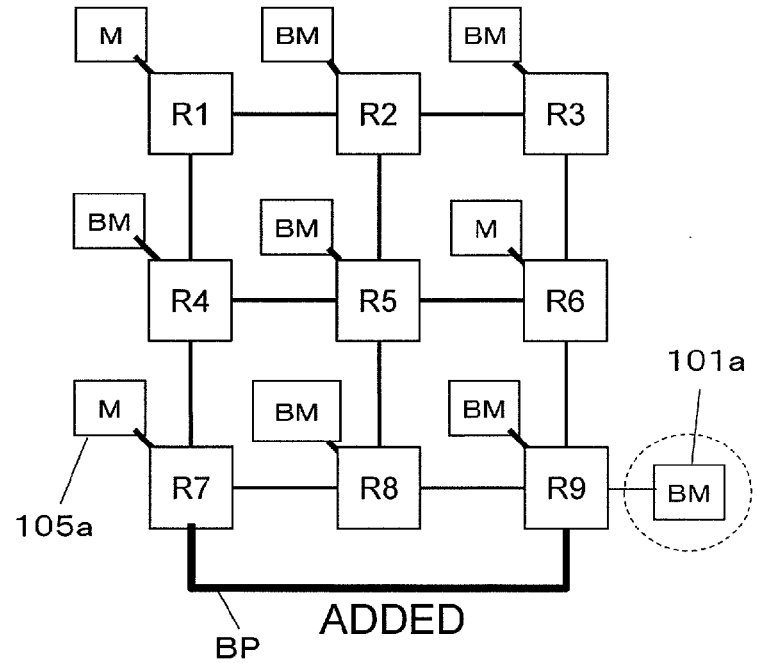

R  ROUTER

——  BUS

R  ROUTER

——  BUS (2) TRANSFER OF HIGH PRIORITY TRAFFIC
(1) TRANSFER
SOURCE
A
C
DESTINATION
D
(3) DETOUR
B

| PATH NO. | PATH |
|---|---|
| 1 | A ⇒ B |
| 2 | A ⇒ B ⇒ D |
| 3 | A ⇒ C |
| 4 | A ⇒ C ⇒ D |

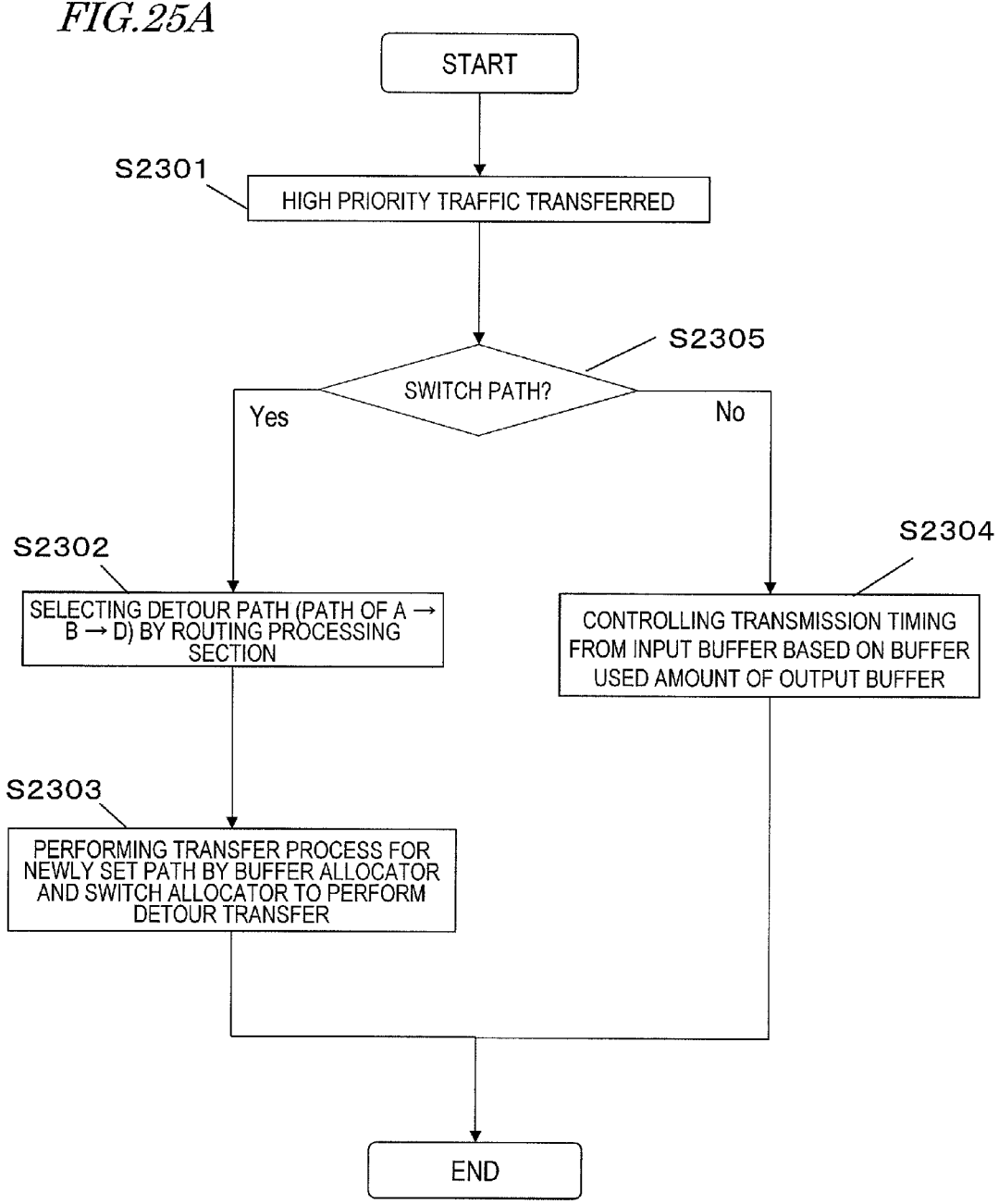

| FLOW ID | PRIORITY LEVEL | TIME LIMIT | NUMBER OF TIMES OF ROUTING | DATA SIZE | NUMBER OF TIMES OF BYPASS | BYPASS BUFFER TIME DURATION OF STAY |
|---------|----------------|------------|----------------------------|-----------|---------------------------|--------------------------------------|
| 123 | 1 | 1:00 | 5 | 1200 | 0 | 0 |
| 321 | 1 | 1:00 | 5 | 1200 | 2 | 200 |
| 234 | 1 | 3:00 | 5 | 1200 | 2 | 200 |
| 456 | 1 | 3:00 | 5 | 1200 | 2 | 200 |
| 567 | 1 | 3:00 | 3 | 1200 | 2 | 200 |
| 567 | 1 | 3:00 | 3 | 2000 | 2 | 200 |

ROUTER, METHOD FOR CONTROLLING ROUTER, AND PROGRAM

This is a continuation of International Application No. PCT/JP2012/001624, with an international filing date of Mar. 9, 2012, which claims priority of Japanese Patent Application No. 2011-070637, filed on Mar. 28, 2011, Japanese Patent Application No. 2011-070638, filed on Mar. 28, 2011, Japanese Patent Application No. 2011-070639, filed on Mar. 28, 2011, Japanese Patent Application No. 2011-070640, filed on Mar. 28, 2011, the contents of which are hereby incorporated by reference.

BACKGROUND

1. Technical Field

The present disclosure relates to a router in a semiconductor system including a bus, a method for controlling the router, and a program.

2. Description of the Related Art

There are various methods for controlling the transfer in a data transfer system including a bus. FIGS. 53A and 53B each show an exemplary known transfer control method for a conventional semiconductor system. FIG. 53A shows an example of conventional centralized bus control. In the centralized bus control shown here, a plurality of bus masters and a memory are connected to each other with a single bus 910, and accesses to the memory by the respective bus masters are arbitrated by an arbiter 912. By adopting such a configuration, data can be transferred while traffic flow interference caused between the plurality of bus masters and the memory is avoided. However, as the functionality of an integrated circuit has been improved and as the number of cores in an integrated circuit has been increased, the scale of the circuit has become larger and the traffic flow through the transmission path has gotten more complicated. As a result, it has become increasingly difficult to design an integrated circuit by such a centralized bus control.

Meanwhile, semiconductor integrated circuits with distributed buses have been developed one after another lately by introducing, for example, connection technologies in parallel computers and/or ATM (Asynchronous Transfer Mode) network control technologies. FIG. 53B shows an example of distributed bus control. In a semiconductor integrated circuit with distributed buses, a plurality of routers (R) are connected to each other with multiple buses in a mesh. Recently, researchers have been working on a so-called "Network on Chip (NoC)" in which traffic flows in a large-scale integrated circuit are transferred through a plurality of distributed buses by adopting the distributed bus control as shown in FIG. 53B.

FIG. 54 shows an exemplary configuration for a router 920 for use in an NoC, a parallel computer, an ATM network, and so on. The data to be transferred (i.e., traffic) is divided into a plurality of small units such as packets or cells, each of which is transmitted to a destination node by way of multiple routers. The router 920 shown in FIG. 54 includes a plurality input ports #0 through #3, a plurality of input buffers 922, a plurality of output ports #0 through #3, a crossbar switch 924 for connecting the input buffers and the respective output ports, and an arbiter 912 for switching the connection by the crossbar switch. Data input to the router 920 through the input ports #0 through #3 is temporarily stored on the input buffers 922.

The input buffers 922 each include a plurality of buffer queues. In the example shown in FIG. 54, each input buffer 922 has two virtual channels (VC0, VC1) as buffer queues.

The arbiter 912 performs a routing process of analyzing the received data and determining the output port to be used. The arbiter 912 also defines a correspondence between the buffer queues of the input buffers in the router which is a transfer destination to which the data is to be transferred and the output ports, and performs a scheduling process for transmitting the data from the buffer queues. The router 920 may have a configuration including output buffers each having a plurality of buffers on a stage after the crossbar switch 924. In such a configuration, the arbiter 912 defines a correspondence between the buffer queues of the output buffers and the output ports. These processes are performed based on information which indicates priority levels defined by the data, or by a round-robin method of allocating data to the buffer queues in the order of process requests. The data is routed based on the scheduling result and is transferred to a router or a bus master which is a transfer destination. Each router 920 switches the connection by the crossbar switch 924 in accordance with the scheduling process and thus routes data stored on the input buffers 922 to the respective destination.

In the router, a transfer process of traffic may be delayed due to, for example, a wait at each buffer or a process delay at the crossbar switch. In an application in which such a delay is required to be suppressed as much as possible (e.g., application of notifying emergency information), such a delay needs to be decreased. As the scale of the network becomes larger, the number of routers is increased, and thus the problem of delay becomes more serious.

The problem of delay occurring in the router is conspicuous for a traffic of data transferred with no break (bursty traffic), such as video data or the like. FIG. 55 shows an example of bursty traffics. The horizontal axis represents the time, and the vertical axis represents the amount of data transferred. In the example shown here, a traffic continuous for a certain time duration is generated, and then once stops. Then again, a traffic continuous for a certain time duration is generated. Such bursty traffics are likely to occupy buffer queues in the router and thus exert a strong influence on the other traffics. For this reason, while a bursty traffic is transferred, a traffic jam is likely to occur to cause a transfer delay.

As a specific example, it is assumed that a packetized bursty traffic is stored on each of the buffer queues by a round-robin allocation method. When a throughput is decreased in another router on a path reaching a destination node due to the interference between the bursty traffic and another traffic, transfer is not performed smoothly from any of all the buffer queues storing the bursty traffics. As a result, the throughput of each buffer queue is decreased, and thus the transfer performance of the entire system is decreased.

As a measure against this problem, Japanese Laid-Open Patent Publication No. 2002-344509 discloses a method of allocating traffics having high priority levels to predetermined buffer queues at the time of designing. Hiroki MATSUTANI, Michihiro KOIBUCHI, Hideharu AMANO, and Tsutomo YOSHINAGA, "Evaluations of Prediction Router for Low-Latency On-Chip Networks", Technical Report of the Institute of Electronics, Information and Communication Enginneers 2009-ARC-181, PP. 1-6, January 2009 (hereinafter referred to as "Non-patent Document 1"), and John KIM, "Low-Cost Router Microarchitecture for On-Chip Networks", MICRO '09, Dec. 12-16, 2009 (hereinafter referred to as "Non-patent Document 2") each disclose a measure against a delay caused by both of a wait at the buffer queues and a process delay at the crossbar switch. Non-patent Document 1 discloses various methods of decreasing the delay. According to these methods, the routing process is performed in parallel, or a part of the process is skipped, so that the transfer process by the router is simplified or is performed at a higher speed. Non-patent Document 2 discloses a method of omitting the transfer process in the router to decrease the delay in the transfer process.

FIG. 56 shows a schematic configuration of a router 940 disclosed in Non-patent Document 2. In the router 940, a part of data input to an input port passes a bypass line 930 and is output from an output port, without passing an input buffer 922 or a crossbar switch 924. Owing to such a configuration, the transfer process in the router 940 is omitted. Therefore, the data passing the bypass line 930 is transferred more quickly than data transferred by a usual process.

In this manner, the transfer delay in the router can be decreased by omitting at least a part of the routing process, allocating a part of the traffics to a buffer queue with priority, or performing the routing process in parallel. As a result, a part of the data can be transferred with priority. In this specification, decreasing the delay in the transfer process by omitting at least a part of the routing process, allocating a part of the traffics to a buffer queue with priority, or performing the routing process in parallel as described above will be represented as "bypassing". Also in this specification, a traffic which is bypassed may be referred to as a "bypass traffic", and a traffic which is not bypassed may be referred to as a "non-bypass traffic". A buffer queue in an input buffer or an output buffer may be referred to as a "data storage section".

SUMMARY

In a conventional router for performing a bypass process, when a part of the traffics is bypassed, the non-bypass traffics which are transferred by a usual routing process are transferred later. This causes a problem that the transfer delay of the non-bypass traffics is increased. Especially when a part of the traffics is bypassed in a state where a transmission path has a high load, many of the buffers of the transfer destination are occupied by the bypass traffics. This makes the transfer delay of the non-bypass traffics conspicuous. In the case where a method of predicting the bypass destination or the specifics of the process is used as disclosed in Non-patent Document 1, there is a possibility that the transfer delay in the router which performed the bypass process may be larger than assumed due to a prediction error.

In one general aspect, a router disclosed herein is designed to be used in a data transfer system which includes a first node for transmitting data, a second node for receiving the data transmitted from the first node, and a plurality of routers for routing the data transferred between the first node and the second node via a bus. The router includes an input section configured to receive an input of data; a switch for selecting a transmission path for the data input to the input section from a plurality of paths; a bypass control section configured to determine, based on a type of the data input to the input section, whether or not to perform a bypass process of outputting the data with priority; and an output control section configured to change at least one of a transmission path and a transmission flow rate of data which is not to be subjected to the bypass process and thus controlling an output of the data. The output control section executes at least one of a first control by which when the bypass control section executed the bypass process, an output of the data which is not to be subjected to the bypass process and has the same destination as data which was subjected to the bypass process is controlled based on a transmission state of the router; and a second control by which when the bypass control section did not execute the bypass process, an output of the data which is not to be subjected to the bypass process is controlled based on a transmission state of another first router at which data which was not subjected to the bypass process and data which was subjected to the bypass process by another second router are joined together.

According to the above aspect, a transfer delay of a traffic of data can be decreased in a data transfer system such as a semiconductor system.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 12 is provided to explain a simple network model.

FIG. 14 shows an example of process performed by a router which received a bypass notification.

FIG. 17A is a flowchart showing a process performed by the router on a traffic not to be bypassed when a bypass process is performed in the first embodiment.

FIG. 20 shows an example in which a bus master and a bypass path are added by functionality expansion.

FIG. 25A shows a process performed by the router on a low priority traffic when a high priority traffic is transferred.

DETAILED DESCRIPTION

Figure 1A:
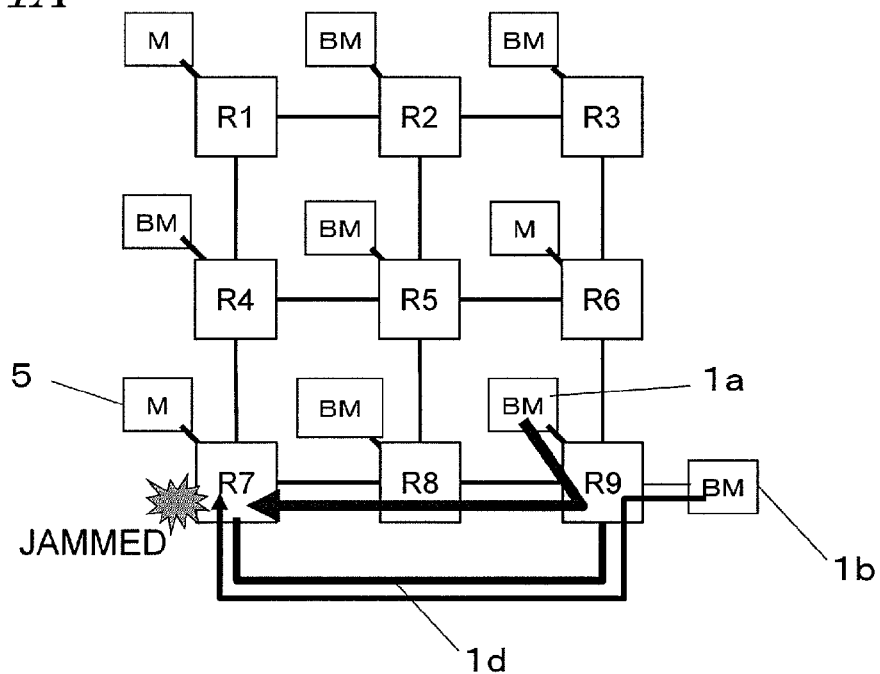
FIG. 1A is a first figure provided to explain a problem caused a bypass process performed between routers.

A router according to an embodiment of the present disclosure is used in a data transfer system which includes a first node for transmitting data, a second node for receiving the data transmitted from the first node, and a plurality of routers for routing the data transferred between the first node and the second node via a bus. The router includes an input section configured to receive an input of data; a switch configured to select a transmission path for the data input to the input section from a plurality of paths; a bypass control section configured to determine, based on a type of the data input to the input section, whether or not to perform a bypass process of outputting the data with priority; and an output control section configured to change at least one of a transmission path and a transmission flow rate of data which is not to be subjected to the bypass process and thus controlling an output of the data. The output control section executes at least one of a first control by which when the bypass control section executed the bypass process, an output of the data which is not to be subjected to the bypass process and has the same destination as data which was subjected to the bypass process is controlled based on a transmission state of the router; and a second control by which when the bypass control section did not execute the bypass process, an output of the data which is not to be subjected to the bypass process is controlled based on a transmission state of another first router at which data which was not subjected to the bypass process and data which was subjected to the bypass process by another second router are joined together.

In an embodiment, the router further includes a bypass notification section configured, when the bypass process was executed, to notify information indicating that the bypass process was executed to another router which inputted data to the input section.

In an embodiment, the router further includes a buffer section configured to store the data input to the input section. The bypass control section determines whether to execute a usual process of outputting the data input to the input section via the buffer section or to execute a bypass process of outputting the data without having the data pass the buffer section, the determination being made based on the type of the input data.

In an embodiment, the bypass control section determines whether to perform a usual process of outputting the data via the switch or to perform a bypass process of outputting the data via a bypass path without having the data pass the switch, the determination being made based on information representing burstiness of the data input to the input section.

In an embodiment, the router further includes a buffer section including a plurality of data storage sections configured to store the data received by the input section. The bypass control section determines whether or not to store the data on a pre-secured specific data storage section among the plurality of data storage sections, or whether or not to store the data on a pre-secured specific data storage section among a plurality of data storage sections in a buffer section of another router which is an output destination, the determination being made based on information representing burstiness of the data received by the input section, and thus executes the bypass process on the data determined as having burstiness.

In an embodiment, the information representing burstiness is at least one of a transfer amount per unit time, a transmission cycle, a transmission interval, a number of packets transferred continually, and a time delay.

In an embodiment, the information representing burstiness is at least one of a permissible throughput and a permissible time delay of the data. The information representing burstiness is at least one of an identifier representing burstiness, a priority level of the data, an identifier representing the type of the data, and an identifier specifying the first node.

In an embodiment, the bypass control section determines the data as having burstiness and executes the bypass process in at least one of the cases where the transfer amount per unit time of the data is larger than a predefined threshold value, where the transmission cycle of the data is shorter than a predefined threshold value, where the transmission interval of the data is shorter than a predefined threshold value, where the number of packets transferred continually is larger than a predefined threshold value, and where the permissible time delay of the data is shorter than a predefined threshold value.

In an embodiment, the input section receives information representing the transmission state of the another first router, and the output control section executes the second control based on the information.

In an embodiment, the transmission state is at least one of a free capacity of a buffer connected to the switch, a used amount of the buffer, a wait time, a throughput, and a transfer efficiency.

In an embodiment, the output control section includes a buffer measurement section configured to measure at least one of the free capacity of the buffer and the wait time at the buffer.

In an embodiment, when the free capacity of the buffer is equal to or larger than a preset threshold value, the output control section decreases the transmission flow rate of, or stops the transfer of, the data which is not to be subjected to the bypass process; and when the free capacity of the buffer is smaller than the threshold value, the output control section changes the transmission path for the data which is not subjected to the bypass process.

In an embodiment, the buffer is an input buffer of an adjacent router.

In an embodiment, in the data received by the input section, an identifier representing at least one of a priority level, time passage information, a packet length, and a number of routing stages is described; and the bypass control section determines whether or not to execute the bypass process based on the identifier.

In an embodiment, in the data received by the input section, an identifier representing a priority level is described; and when a high priority traffic having a priority level set to a value equal to or higher than a preset threshold value is transferred, the output control section controls an output from the switch of a low priority traffic having a priority level lower than the threshold value.

A method for controlling a router according to an embodiment of the present disclosure is usable in a data transfer system which includes a first node for transmitting data, a second node for receiving the data transmitted from the first node, and a plurality of routers for routing the data transferred between the first node and the second node via a bus. The method includes the steps of receiving an input of data; selecting a transmission path for the data from a plurality of paths by use of a switch; determining, based on a type of the data, whether or not to perform a bypass process of outputting the data with priority; and executing at least one of a first control by which when the bypass process was executed, at least one of a transmission path and a transmission flow rate of data which is not to be subjected to the bypass process and has the same destination as data which was subjected to the bypass process is changed based on a transmission state of the router; and a second control by which when the bypass process was not executed, at least one of the transmission path and the transmission flow rate of the data which is not to be subjected to the bypass process is changed based on a transmission state of another first router at which data which was not subjected to the bypass process and data which was subjected to the bypass process by another second router are joined together.

A control program for a router according to an embodiment of the present disclosure is usable in a data transfer system which includes a first node for transmitting data, a second node for receiving the data transmitted from the first node, and a plurality of routers for routing the data transferred between the first node and the second node via a bus. The control program is stored on a non-transitory computer-readable medium and causes a computer mounted on the router to execute the steps of receiving an input of data; selecting a transmission path for the data from a plurality of paths by use of a switch; determining, based on a type of the data, whether or not to perform a bypass process of outputting the data with priority; and executing at least one of a first control by which when the bypass process was executed, at least one of a transmission path and a transmission flow rate of data which is not to be subjected to the bypass process and has the same destination as data which was subjected to the bypass process is changed based on a transmission state of the router; and a second control by which when the bypass process was not executed, at least one of the transmission path and the transmission flow rate of the data which is not to be subjected to the bypass process is changed based on a transmission state of another first router at which data which was not subjected to the bypass process and data which was subjected to the bypass process by another second router are joined together.

A simulation program according to an embodiment of the present disclosure is dedicated to design a router usable in a data transfer system which includes a first node for transmitting data, a second node for receiving the data transmitted from the first node, and a plurality of routers for routing the data transferred between the first node and the second node via a bus. The simulation program is stored on a non-transitory computer-readable medium and causes a computer to execute the steps of receiving an input of data; selecting a transmission path for the data from a plurality of paths by use of a switch; determining, based on a type of the data, whether or not to perform a bypass process of outputting the data with priority; and executing at least one of a first control by which when the bypass process was executed, at least one of a transmission path and a transmission flow rate of data which is not to be subjected to the bypass process and has the same destination as data which was subjected to the bypass process is changed based on a transmission state of the router; and a second control by which when the bypass process was not executed, at least one of the transmission path and the transmission flow rate of the data which is not to be subjected to the bypass process is changed based on a transmission state of another first router at which data which was not subjected to the bypass process and data which was subjected to the bypass process by another second router are joined together.

Hereinafter, more specific embodiments according to the present disclosure will be described with reference to the attached drawings. In the following description, identical or corresponding elements will bear identical reference numerals.

(Embodiment 1)

<1. Overview of this Embodiment>

First, a first embodiment of the present disclosure will be described. This embodiment provides a technology for solving the problem of traffic jam which may occur when a bypass process is executed. First, with reference to FIG. 1A and FIG. 1B, problems caused by the bypass process will be described.

<1.1 Problems Caused by Bypass Process>

FIG. 1A shows an example of configuration of a data transfer system for performing transmission and receiving of data between a plurality of bus masters (BM) and a plurality of memories (M) via a plurality of routers R1 through R9. In the example of configuration shown here, the plurality of routers R1 through R9 are connected in a mesh via a bus, and each router is connected to a bus master or a memory. Between the router R9 and the router R7, a bypass path 1d is provided.

In this example of configuration, from a bus master 1a connected to the router R9, data is transmitted to a memory 5 via the routers R9, R8 and R7 without passing the bypass path 1d. By contrast, from a bus master 1b, data is transmitted to the memory 5 via the routers R9 and R7 by use of the bypass path 1d. In this case, a bypass traffic generated from the bus master 1b and a non-bypass traffic generated from the bus master 1a cause a jam in the router R7 connected to the memory 5, which is a common destination. Therefore, the bypass traffic is delayed by the influence of the non-bypass traffic. If the bypass traffic is processed with a high priority level and the non-bypass traffic is processed with a low priority level in the router R7, the non-bypass traffic is made to wait until the transfer of the bypass traffic is completed. For this reason, the transfer delay of the non-bypass traffic becomes a problem. In addition, the non-bypass traffic which is made to wait occupies a buffer of each router on the path. Therefore, transfer from the other bus masters connected to the routers on the path is blocked.

Figure 1B:
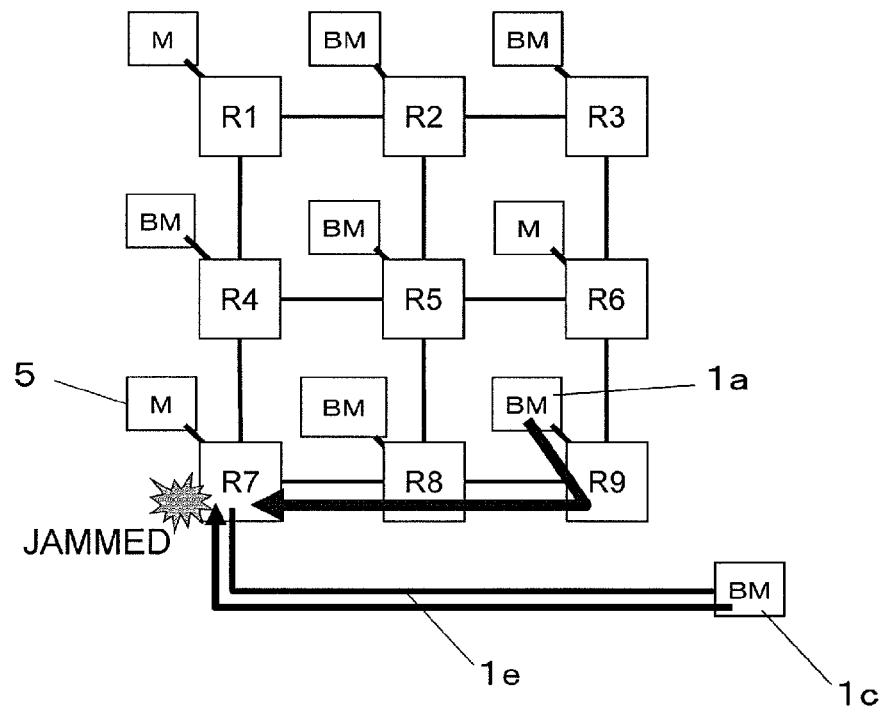
FIG. 1B is a second figure provided to explain a problem caused a bypass process performed between routers.

FIG. 1B shows another example of problem which may occur when traffics are bypassed between the routers. In the configuration shown here, a bypass process is performed from a bus master is to the memory 5 as a destination via the router R7 by use of a bypass path 1e. In this example also, a jam occurs in the router R7 by the interference between a non-bypass traffic transferred from the bus master 1a and a bypass traffic transferred from the bus master 1c. If the bypass traffic is processed with a high priority level and the non-bypass traffic is processed with a low priority level in the router R7, the non-bypass traffic is made to wait until the transfer of the bypass traffic is completed. For this reason, the transfer delay of the non-bypass traffic becomes a problem. In addition, the non-bypass traffic which is made to wait occupies a buffer of each router on the path. Therefore, transfer from the other bus masters connected to the routers on the path is blocked.

When there is a router at which a bypass traffic and a non-bypass traffic are joined together as described above, a transfer delay of the traffic passing the router becomes a problem. In general, when a bypass process is performed on a traffic, transfer of the other traffics is postponed. Therefore, the throughput is decreased.

<1.2 Overview of Operation in this Embodiment>

In order to deal with the above-described problems, the router in this embodiment, after performing a bypass process, transmits a notification indicating that the bypass process was performed (bypass notification) to a router adjacent thereto. The router also executes transfer control on the non-bypass traffic. Hereinafter, overview of each process will be described.

<1.2.1. Bypass Notification>

The router in this embodiment has a function of, after performing the bypass process, transmitting a notification indicating that the bypass process was performed (bypass notification) to a router adjacent thereto. Hereinafter, a basic concept of a bypass notification process in this embodiment will be described with reference to FIG. 2.

Figure 2:
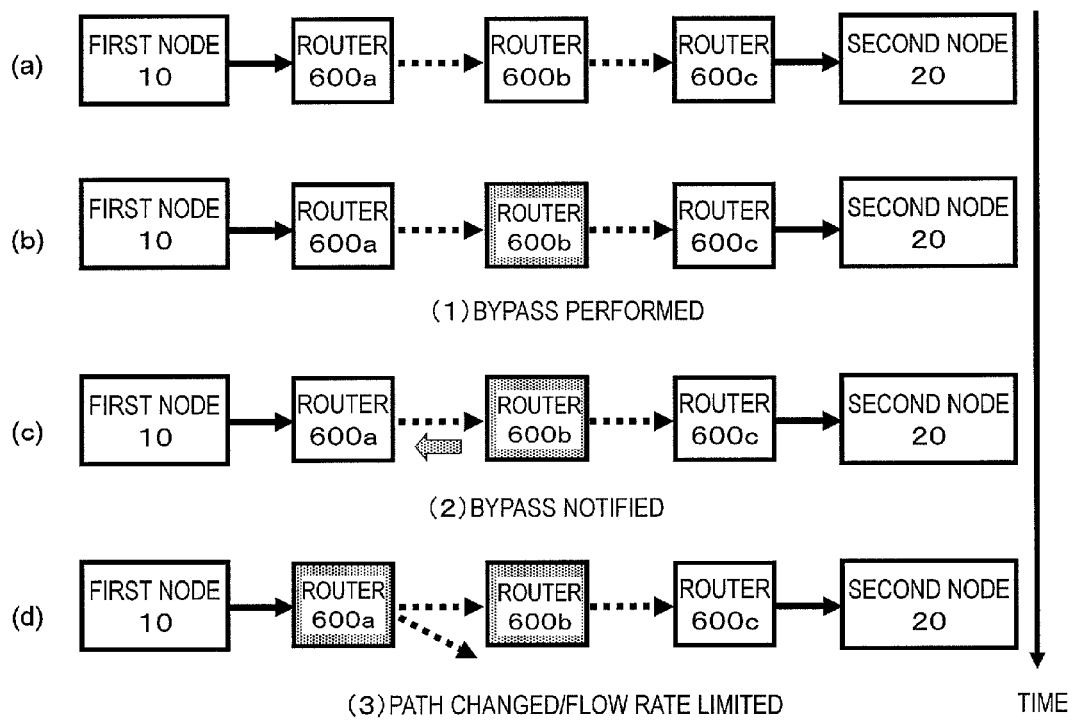
FIG. 2 shows an overview of operation of a router in a first embodiment.

FIG. 2 shows an example of configuration of a data transfer system and an overview of an operation of a router which are assumed in this embodiment. The data transfer system shown here includes a first node (transmission node) 10 for transmitting data, a second node (receiving node) 20 for receiving data, and a plurality of routers 600a, 600b and 600c for routing data between the first node 10 and the second node 20. FIG. 2(a) shows how data is transferred from the first node 10 to the second node 20 via the plurality of routers 600a, 600b and 600c. The configuration of the data transfer system shown here is merely exemplary, and the present disclosure is not limited to such a configuration.

Each router can perform a bypass process to transfer a traffic having a high priority level or a high emergency level with priority. After performing the bypass process, the router can transmit a bypass notification, which indicates that the bypass process was performed, to the other routers in accordance with a load situation of the transmission path. Owing to this, the other routers which received the bypass notification can take various measures for alleviating the transfer load. In this sense, the bypass notification is considered as a notification for notifying the other routers that transfer of a traffic which is not to be bypassed needs to be suppressed.

FIG. 2(b) shows that one of the routers, i.e., the router 600b performed the bypass process. FIG. 2(c) shows how the router 600b, which performed the bypass process, transmits the bypass notification to the router 600a on a stage before the router 600b. FIG. 2(d) shows an example in which the router 600a, which received the bypass notification, takes a measure for avoiding a transfer delay in the router 600b by changing the data transmission path or limiting the flow rate of data. In this manner, the router 600b, which performed the bypass process, transmits the bypass notification to the other routers, so that the transfer load of the entire system can be alleviated.

A bypass method which can be adopted in this embodiment may be a method of setting a bypass path in one router or between two routers, or a method of allocating a dedicated buffer queue to a traffic having a high priority level, such as a bursty traffic, in each router on the transfer route, as described later.

In order to suppress overhead of the routing process caused by the bypass notification, only a part of the routers may have a function of transmitting a bypass notification. It is not necessary that all the routers have a function of transmitting a bypass notification. It is sufficient that For example, only the router 600c connected to the second node 20 (e.g., slave such as a memory or I/O) as the destination may be supplied with such a function. Namely, the bypass notification may be transmitted to the router 600b only when the router 600c performed the bypass process (e.g., when bursty data is transferred from the router 600c to the second node 20). The bypass notification may be used also for traffic flow control performed between routers adjacent to each other. The term "flow control" refers to a process by which a router as a source notifies, before data transfer, whether or not a buffer is usable in a router as the destination.

Specifically, it is assumed that while a bursty traffic is transferred from the router 600c to the second node 20 by use of the bypass path, transfer of a non-bursty traffic is blocked at the router 600c by the influence of the transfer of the bursty traffic. Namely, it is assumed that the bursty traffic is transferred with a higher priority level than the non-bursty traffic. In this case, no buffer in the router 600c is usable for the non-bursty traffic. Before transferring the non-bursty traffic under such a situation, the router 600b inquires of the router 600c whether or not a buffer is usable. The router 600c notifies the router 600b that no buffer is usable. The notification in this flow control is substantially the same as a notification which is performed from the router 600c to the router 600b in order to inform that a bypass process is being performed. In this manner, the bypass notification can be used also as a notification in flow control.

Similarly, each of the routers 600a and 600b other than the router 600c may be configured such that the routing operation of the bypass notification from the router 600c is also used as the flow control between the router 600a or 600b and a router adjacent thereto or between the router 600a or 600b and the first node 10. Owing to this, the first node 10 (e.g., bus master such as a DSP or a processor) can adaptively control the transmission timing or transmission amount of data as a result of the flow control performed on the traffic between the first node 10 and the router 600a. Similarly, the router 600a can adaptively control the transmission timing or transmission amount of data as a result of the flow control performed on the traffic between the router 600a and the router 600b.

<1.2.2. Transfer Control on Non-Bypass Traffic>

Now, transfer control on a non-bypass traffic will be described. This transfer control may be performed in the following two modes.

A first control is performed, when a bypass process is to be executed, on an output of a non-bypass traffic which is set to be transmitted to the same destination as that for the bypass traffic. This control is performed based on the transmission state of the router of interest. This control may be executed by a router for transmitting data to be bypassed and data not to be bypassed to the same destination (memory 5), such as, for example, the router R9 shown in FIG. 1A. The "transmission state of the router of interest" is, for example, information such as a used amount of the input buffer or the output buffer (free capacity). The transfer delay can be suppressed by a method of changing the transmission path of the non-bypass traffic or suppressing the transmission flow rate, in consideration of the transmission state of the router of interest. The first control will be described later in detail.

A second control is performed, when the bypass process is not to be executed, on an output of a non-bypass traffic based on the transmission state of a router at which a non-bypass traffic and a bypass traffic sent from another router are joined together. When a jam is caused between a bypass traffic and a non-bypass traffic in the router R7 as a destination, this control may be executed by a router, for example, the router R9 shown in FIG. 1A and FIG. 1B which is located upstream (on the transmission node side) with respect to the router R7. In accordance with the jamming state of the router at which the bypass traffic and the non-bypass traffic are joined together, the transmission path of a non-bypass traffic is changed, or the transmission flow rate of a non-bypass traffic is suppressed. Thus, the transfer delay can be suppressed. The system may be configured such that the jamming state is notified to the other routers, for example, at the time of flow control performed before the data transfer. The second control will also be described later in detail.

The router in this embodiment does not need to execute both of the first control and the second control. As long as the router is configured to execute at least one of these controls, a certain degree of effect can be provided.

Hereinafter, a specific configuration and operation in this embodiment will be described.

<2. System Configuration>

Figure 3:
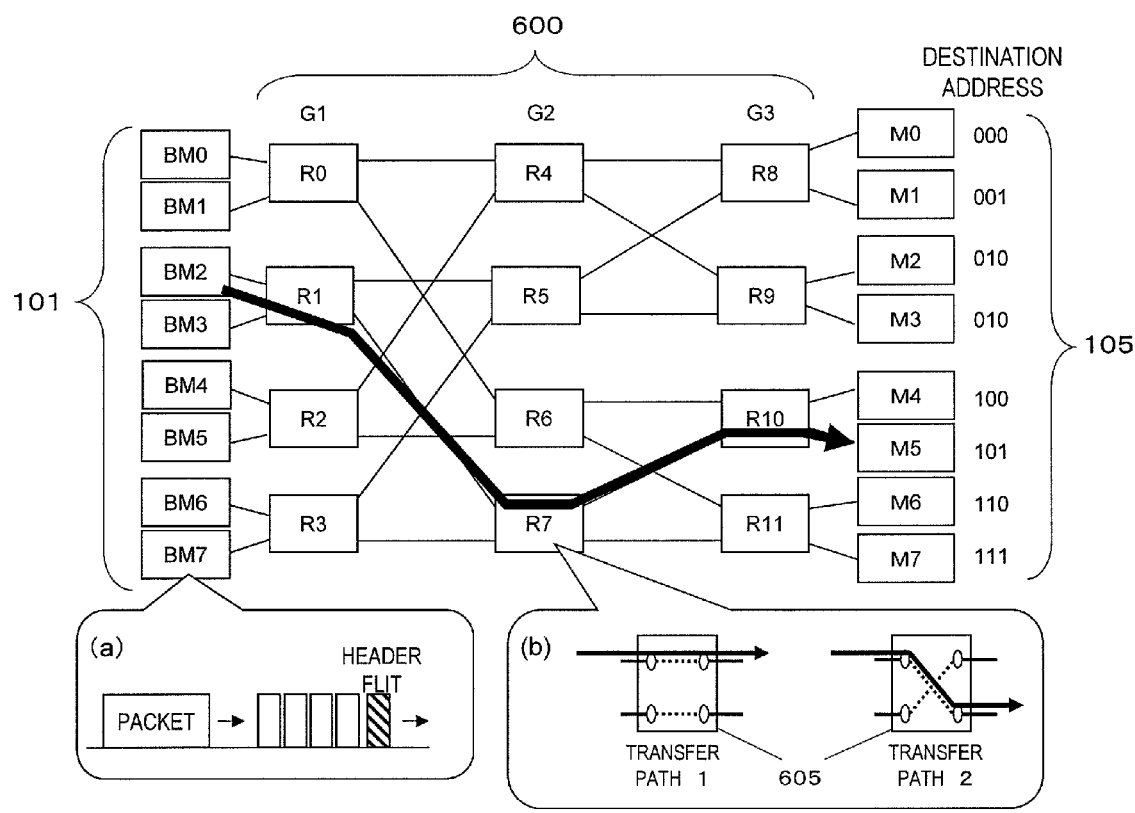
FIG. 3 shows an example of configuration of a transfer system in the first embodiment.

FIG. 3 shows an example of configuration of a data transfer system that uses routers 600 in this embodiment. The system shown here includes a plurality of bus masters 101 (HM0 through BM7) as transmission nodes and a plurality of memories 105 (M0 through M7) as receiving nodes. The plurality of bus masters 101 and the plurality of memories 105 are connected to each other in multiple stages with a bus via the plurality of routers 600. In this manner, the transfer system shown in FIG. 3 forms a multistage interconnection network (MIN). In this embodiment, each of the bus masters 101 functions as the first node according to the present disclosure, and each of the memories 105 functions as the second node according to the present disclosure.

In this embodiment, each bus master 101 is a device which can perform data transfer control using a bus and may be, for example, a CPU (central processing unit) or a DSP (digital signal processor). Each memory 105 is, for example, a semiconductor memory such as a DRAM, an SRAM or the like. Each router 600 is, for example, a semiconductor circuit and has a function of routing data to be transferred between the plurality of bus masters 101 and the plurality of memories 105.

In the example of configuration shown in FIG. 3, eight bus masters (HM0 through BM7), 12 routers (R0 through R11), and eight memories (memories #0 through #7) are connected to each other with a bus. The 12 routers are classified into the following three groups. A first group (G1) includes four routers (R0, R1, R2 and R3) which are connected to the eight bus masters 101. A second group (G2) includes four routers (R4, R5, R6 and R7) which are connected on a stage after the first group. A third group includes four routers (R8, R9, R10 and R11) which are connected on a stage after second group and also connected to the eight memories.

Data transfer from the bus masters 101 to the memories 105 is performed by a packet exchange method. As shown in FIG. 3(a), each bus master divides a packet to be transmitted into minimum units called "flits" before transmitting the packet to a router adjacent thereto. Among a plurality of flits obtained by dividing one packet, a flit which is transmitted first is called a "header flit". In the header flit, flag information indicating that the flit is a leading part of the packet, address information on the destination of the packet, and the like are described. Data structures of the packet and flit in this embodiment will be described in detail later.

Each of the routers included in the multistage interconnection network shown in FIG. 3 includes a crossbar switch 605 having two inputs and two outputs. As shown in FIG. 3(b), each router can change the combination of the input source and the output destination by switching the crossbar switch 605. Therefore, the traffic flow can be switched between two transmission paths (transmission paths #1 and #2). If the paths for the output destination are different, the router can output two types of traffic flows through the two transmission paths at the same time. According to such a multistage interconnection network, the switch in each router 600 can be switched so that one or more transmission paths can always be formed between all the bus master 101 and all the memories 105.

In general, in order to connect every one of N-piece bus masters and every one of M-piece memories to each other with a crossbar switch, N×M switches are needed. In this description, a "switch" refers to an element that is provided at an intersection of a plurality of communications lines that run parallel with each other in one direction and a plurality of communications lines that run parallel with each other in another direction and that can form a communications line dynamically by being turned ON and OFF. In general, the number of necessary switches steeply rises as the number of the bus masters and the memories increases. By contrast, in the multistage interconnection network, crossbar switches with a small number of inputs and outputs are connected in a hierarchical pattern, so that the connection between the bus masters and the memories can be switched with a smaller number of switches.

As an example of data transfer in the configuration shown in FIG. 3, it is assumed that data is transferred from the bus master BM2 to the memory M5. In this case, the bus master BM2 divides a packet, which specifies address (101) of the memory M5 as the destination address, into a plurality of flits and transmits the flits to the router R1. The plurality of divided flits are transferred to the memory M5 via the routers R1, R7 and R10. The memory M5 receives the plurality of flits transmitted from the router R10 and restores the original packet based on these flits. By performing this series of process steps, data is transferred from the bus master BM2 to the memory M5.

It should be noted that a router 600 in this embodiment are not limited to being applied to an integrated circuit that forms a multistage interconnection network as shown in FIG. 3 but may also be applied to an integrated circuit with any other topology as well. In addition, in this embodiment, data transfer from the bus master 101 to the memory 105 is described as being performed via a plurality of routers by the packet exchange method, but data transfer may also be performed by any other method. A router in this embodiment is not limited to being applied to transfer data from a bus master to a memory, but may also be applied to any other system which transfers data between multiple nodes. For example, as in the case of reading data from a memory, the memory may be a node at the transmission end and the bus master may be a node at the receiving end. In addition, the node with which the bus master performs data transmission and receiving is not limited to a memory, and may also be an input/output port provided for connection with an external storage device such as an external HDD. An example of such an input/output port is a USB port.

In the configuration shown in FIG. 3, the first and third groups of routers (R0 through R3 and R8 through R11), as well as the second group of routers (R4 through R7), are each shown as an individual functional block. Actually, however, any other functional section such as an NIC (network interface controller) or the like is connected between each router belonging to the first group and the bus masters and between each router belonging to the third group and the memories.

Figure 4:
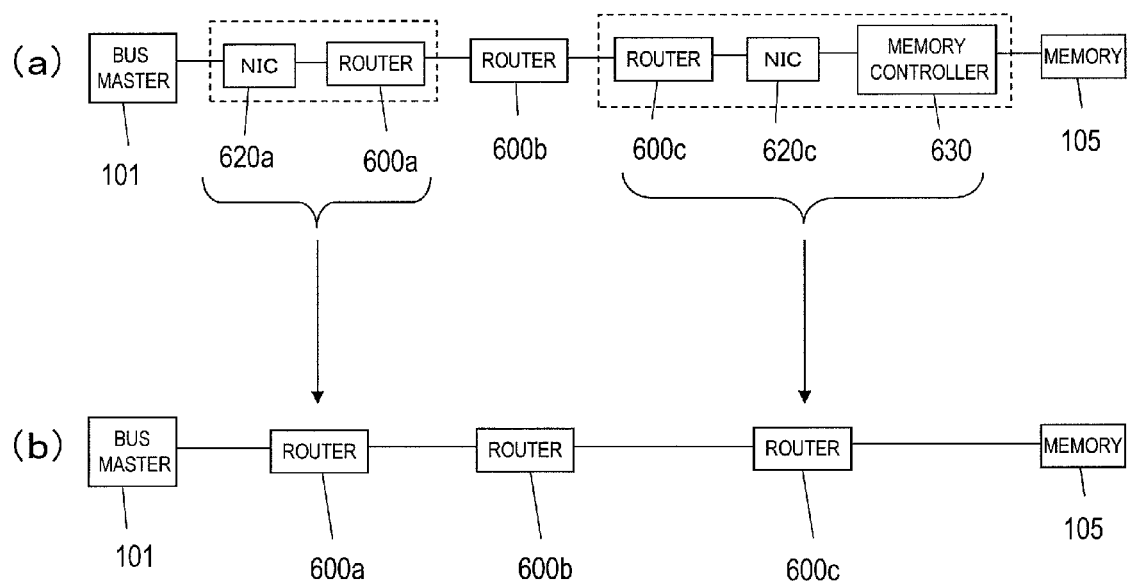
FIG. 4 is provided to explain the representation of a router in this specification.

FIG. 4 is a block diagram showing a part of the data transfer system in this embodiment. In FIG. 4, only a bus master 101, a router 600a in the first group, a router 600b in the second group, a router 600c in the third group, and a memory 105, which are connected as a set to a single transmission path, are shown for the sake of simplicity.

As shown in FIG. 4(a), an NIC 620a is connected between the bus master 101 and the router 600a in the first group. The NIC 620a has a function of performing a bus protocol conversion process and a function of selecting a memory 105 that can afford to have a memory size by the bus master 101 from the plurality of memories and notifying the bus master 101 of the selected memory 105.

By contrast, an NIC 620c and a memory controller 630 are connected between the router 600c in the third group and the memory 105. The NIC 620c performs a bus protocol conversion process, defines a correspondence between outward paths and return paths of data transfer, and sends, to the NIC 620a, a response of a return path to an outward path. Herein, the "outward path" refers to a transmission path in a direction from the bus master 101 to the memory 105, and the "return path" refers to a transmission path in a direction from the memory 105 to the bus master 101. The memory controller 630 is connected to the NIC 620c and performs, for example, control on the order of access to the memory 105.

In this specification, as in FIG. 4(b), the NICs 620a and 620c and the memory controller 630 will not be shown for the sake of simplicity. That is to say, in the following description, every router described as being directly connected to a transmission node such as the bus master 101 or the like actually includes an NIC. In the same way, every router described as being directly connected to a receiving node such as the memory 105 or the like actually includes an NIC and a memory controller.

<3. Configuration of Router>
<3.1 Schematic Configuration of Router>

Figure 5A:
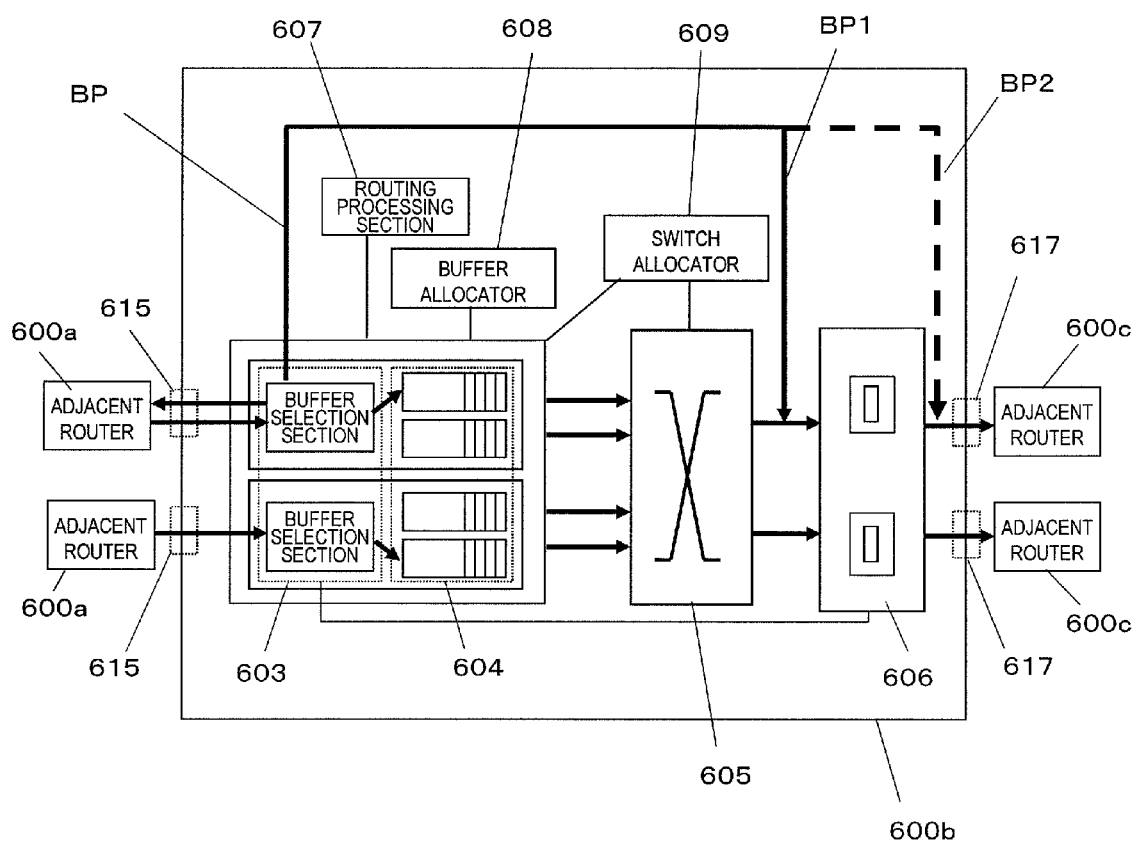
FIG. 5A shows a configuration of a router in the first embodiment.

FIG. 5A shows a schematic configuration of a router in this embodiment. In the following, a configuration of the router 600b in the second group will be described as an example, but the routers in the first and third groups have the same basic configuration except that transfer sources and transfer destinations are different. Hereinafter, the routers 600a in the first group may each be referred to as a "previous stage router", and the routers 600c in the third group may each be referred to as a "subsequent stage router". The routers in the first and third groups may each be referred to as an "adjacent router". The router 600b determines a path from each of the previous stage routers 600a to each of the subsequent stage routers 600c, and routes the traffic therebetween.

The router 600b includes a plurality of input ports 615 and a plurality of output ports 617. The router 600b receives flits from the previous stage routers 600a via the input ports 615, and sends the flits to the subsequent stage routers 600c via the output ports 617. The router 600b includes buffer selection sections 603 for receiving the flits sent from the previous stage routers 600a and determining whether or not to bypass the flits. The router 600b also includes input buffers 604 for temporarily storing flits not to be bypassed, the crossbar switch 605 for switching the connection between the input source and the output destination, and output buffers 606 for temporarily storing data which is output from the crossbar switch 605. The router 600b further includes a routing processing section 607 for performing a process for transferring a flit not to be processed to the destination thereof, a buffer allocator 608, and a switch allocator 609.

The input buffers 604 and the output buffers 606 are each, for example, a primary storage area such as an SRAM, a register or the like. The crossbar switch 605 is, for example, a known switch circuit. The routing processing section 607, the buffer allocator 608 and the switch allocator 609 are each formed of a logic circuit configured to execute an operation described later.

In the example shown in FIG. 5A, the router 600b includes two buffer selection sections 603, four input buffers 604, and two output buffers 606. However, the present disclosure is not limited to such an example. In the example shown in FIG. 5A, the router 600b is configured such that only one of the two buffer selection sections 603 performs the bypass process.

In this embodiment, the input buffers 604 and the output buffers 606 each include a plurality of buffer queues. Such a buffer queue may be formed of a virtual channel. In the case where the buffer queue is formed of a virtual channel, a plurality of virtual circuits are constructed. Herein, the "virtual circuit" refer to a line which is physically one communications line but is logically regarded as being a plurality of lines.

The buffer selection sections 603 each determine whether or not each received flit need to be bypassed based on the information described in the header flit. When determining that the flit does not need to be bypassed, the buffer selection section 603 stores the traffic including the flit on the input buffer 604. When determining that the flit needs to be bypassed, the buffer selection section 603 sends the traffic to a bypass path BP.

The bypass path BP may be configured such that the bypass traffic is input to the output buffer 606 (bypass BP1) or may be configured such that the bypass traffic is input to the adjacent router 600c without passing the output buffer 606 (bypass BP2). In the case where the bypass path BP2 by which the bypass traffic does not pass the output buffer 606, no delay occurs due to the buffer ring. However, since the input buffer in the router 600c as the transfer destination needs to be uniquely determined, the freedom of selecting the buffer is not provided. By contrast, in the case where the bypass traffic passes the output buffer 606, a delay occurs due to the buffer ring. However, since the bypass traffic is temporarily stored on the output buffer 606, the input buffer as the transfer destination can be selected from the input buffers in the router 600c as the transfer destination. Therefore, the buffer selection freedom is higher in the case where the bypass traffic passes the output buffer 606 than in the case where the bypass traffic does not pass the output buffer 606.

By contrast, the traffic which is determined by the buffer selection section 603 as not needing to be bypassed is transferred based on path information determined by the routing processing section 607, the buffer allocator 608 and the switch allocator 609. The routing processing section 607 determines the output port 617 which is the destination of the flit based on the destination information described in the flit. An algorithm for routing may be dimension-order routing by which the destination is determined dynamically or static routing by which the destination is determined uniquely at the time of designing based on the relationship between the source and the destination. The present disclosure is not limited to using any specific routing algorithm.

The buffer allocator 608 selects free output buffers 606 from the output buffers 606 corresponding to the output port 617 determined by the routing processing section 607, and defines a correspondence between buffer queues of the input buffers 604 and the output buffers 606 to be used.

In order to transfer traffic, the switch allocator 609 selects one set of buffer queue and output buffer 606 from sets of the buffer queues of the input buffers 604 and the output buffers 606, the correspondence of which has been defined. The switch allocator 609 transfers the flit from the selected buffer queue of the input buffer 604 to the selected output buffer 606 via the crossbar switch 605. Then, the flit is transferred from the output buffer 606 to the corresponding router 600c via the output port 617.

In this embodiment, the router 600b includes the output buffers 606. Alternatively, there may be a case where no output buffer 606 is provided in order to suppress the memory capacity when the router 600b is incorporated into a specific apparatus. In such a case, the input buffer in the router 600c as the transfer destination is also used as the output buffer 606. Even when the input buffer in the router as the transfer destination is used instead of the output buffer 606, substantially the same effect as that of this embodiment is provided. In the case where no output buffer 606 is provided, the buffer allocator 608 is configured to define a correspondence between the buffer queues of the input buffers 604 and the buffer queues of the input buffer in the router 600c as the transfer destination.

<3.2. Configuration of Buffer Selection Section>

Figure 5B:
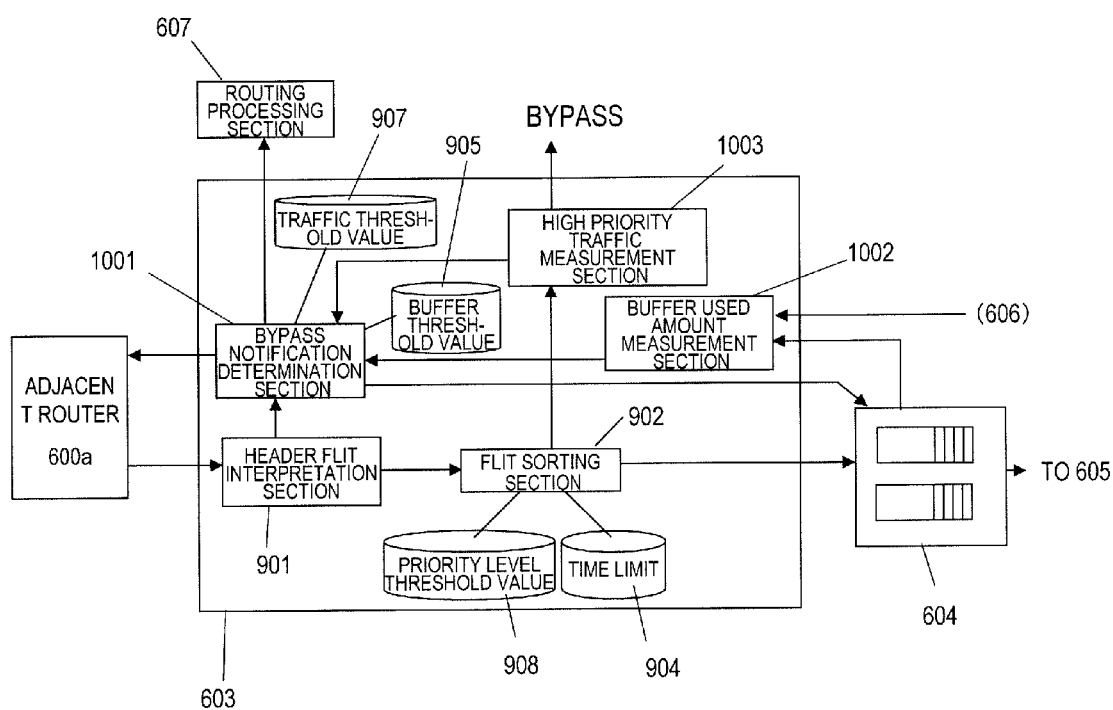
FIG. 5B shows a configuration of a buffer selection section in the router in the first embodiment.

Now, a configuration of the buffer selection section 603 in this embodiment will be described. FIG. 5B is a block diagram showing a detailed configuration of the buffer selection section 603.

The selection section 603 includes a header flit interpretation section 901 for interpreting the data structure of the header flit, and a flit sorting section 902 for determining whether or not to bypass the received data based on the information described in the header flit. The flit sorting section 902 compares the information described in the header flit against information such as a priority level threshold value 908 or a time limit 904 stored on a memory (not shown) included in the buffer selection section 603. When determining that the priority level or emergency level of the received data is low, the flit sorting section 902 sends the data to the input buffer 604. When determining that the priority level or emergency level of the received data is high, the flit sorting section 902 bypasses the data. In this embodiment, the flit sorting section 902 has a function of a bypass control section and a function of an output control section according to the present disclosure. The bypass process will be described in detail later.

The buffer selection section 603 also includes a high priority traffic measurement section 1003 for measuring a transfer amount and a routing continuation time duration of the traffic to be bypassed, a buffer used amount measurement section 1002 for measuring a buffer used amount and a buffer used time duration of the input buffer 604 and/or the output buffer 606, and a bypass notification determination section (bypass notification section) 1001 for transmitting a bypass notification to the adjacent router 600a based on the transfer load of the bypass path, the buffer used amount or the like. The bypass notification determination section 1001 performs the bypass notification process based on information such as a traffic threshold value 907 and a buffer threshold value 905 stored on a memory (not shown), and also traffic information and buffer information representing the measurement results. The bypass notification process will be described in detail later.

In this embodiment, the router 600b includes a bypass line and has a bypass notification function. A router according to the present disclosure does not need to include the bypass line or have the bypass notification function. An example of performing the bypass process with no use of the bypass line will be described in a second embodiment.

<4. Configuration of Packet and Flit>

Now, a configuration of a packet and a flit in this embodiment will be described.

Figure 6:
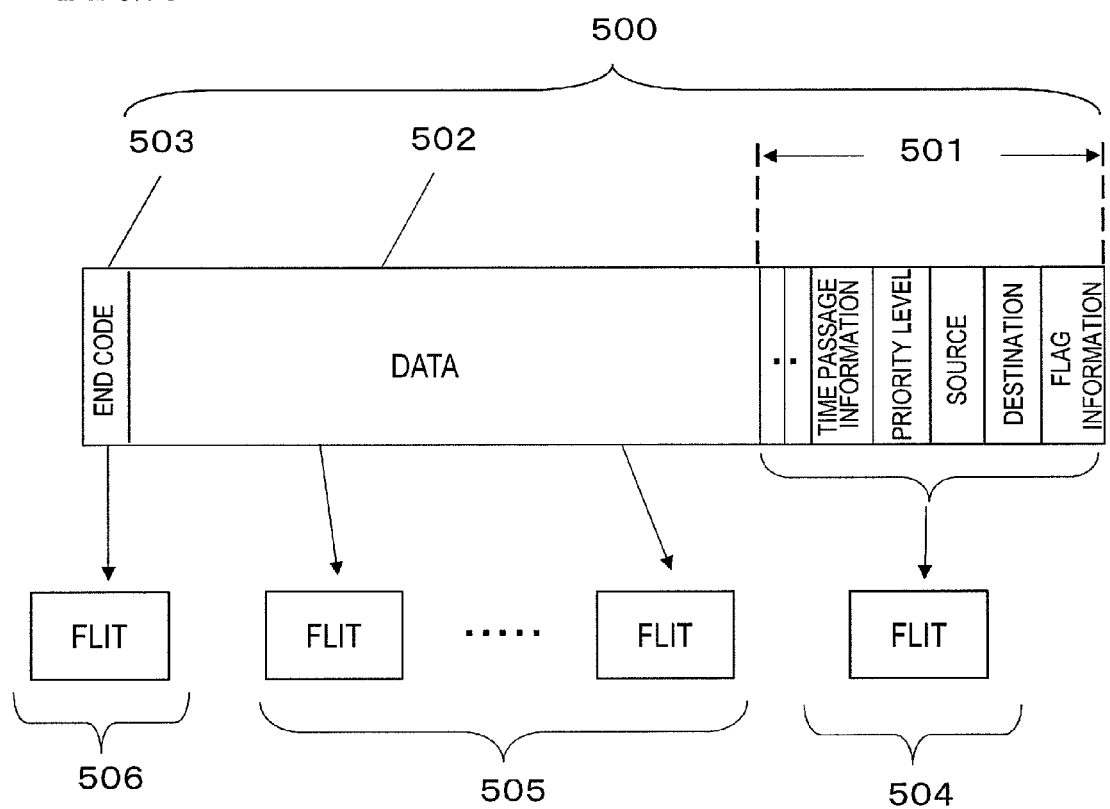
FIG. 6 shows an example of transfer format of a packet.

FIG. 6 shows an example of transfer format of a packet 500 and an example in which the packet 500 is divided into a plurality of flits. The packet 500 includes a header field 501, a data field 502, and a control code field 503.

In the header field 501, the following information is described, for example: flag information indicating that the header field is a leading part of the packet, the destination address, the source address, information representing the priority level of the packet, and information representing the time duration which has passed since the transmission of the packet (time passage information). The time passage information may be described in any form as long as a value specifying the time duration which has passed since the transmission is provided. For example, the time of transmission, the time duration which has passed since the transmission, the number of routers that the packet passed (number of hops) or the like may be described. In the header field 501, information other than the above information may be described. Among the above-described types of data in the header field 501, the destination address and the source address are used to perform the process of routing the packet 500 and the process of receiving the packet 500 at the receiving end.

In the data field 502, video data, audio data and the like are described. In the control code field 503, a predefined end code is described, for example. The end of the packet 500 is detected by the end code. In the control code field 503, information other than the end code may be stored.

As described above, the bus master 101 transfers the packet 500 after dividing the packet 500 into the small units called flits. The size of one flit is determined in accordance with the width of the bus, such that the flit can be transferred in one cycle through the bus. The packet 500 is divided into a header flit 504, a plurality of data flits 505, and a tail flit 506. The header flit 504 includes the flag information, destination address information and the like that are stored on the header field 501. In this specification, a data string including the flit is expressed as a "packet" unless otherwise specified.

In the data flits 505 and the tail flit 506 following the header flit 504, no address information specifying the destination is stored. A reason for this is that the flits following the header flit 504 are sent to the same destination as that for the header flit 504. When the destination is determined by the header flit 504 and the output buffer 606 for outputting the flit of the traffic is determined, the flits following the header flit 504 are transferred to the destination specified by the header flit 504 by use of the same output buffer as that for the header flit 504.

The tail flit 506 is provided with flag information indicating that the flit is the last one of the flits that form the packet (i.e., end code stored on the control code field 503). The plurality of data flits 505 other than the header flit 504 and the tail flit 506 are flits that are mainly used for transferring data and correspond to the data field 502 of the packet 500.

Upon detecting the flag information (i.e., end code) described in the tail flit 506, the memory 105 at the receiving end restores the plurality of transferred flits into the original packet based on the end code.

One packet has a size of, for example, 128 bytes, and one flit is set to have a size of, for example, 32 or 64 bits. It should be noted, however, that the size of one packet or one flit may vary in accordance with the application and these sizes are merely exemplary. The length of one flit may be defined to be long enough to have control data such, as the destination address, the source address or the like, to be described therein.

As described above, each of the routers 600 includes input buffers 604 for accumulating the incoming flits. In a normal process (non-bypass process), the flits are once accumulated in the input buffer 604 and then transmitted to either a router leading to the memory at the destination or directly to the memory at the destination by switching of the crossbar switch.

<5. Operation of Router>
<5.1. Overview of Bypass Operation>

Figure 7:
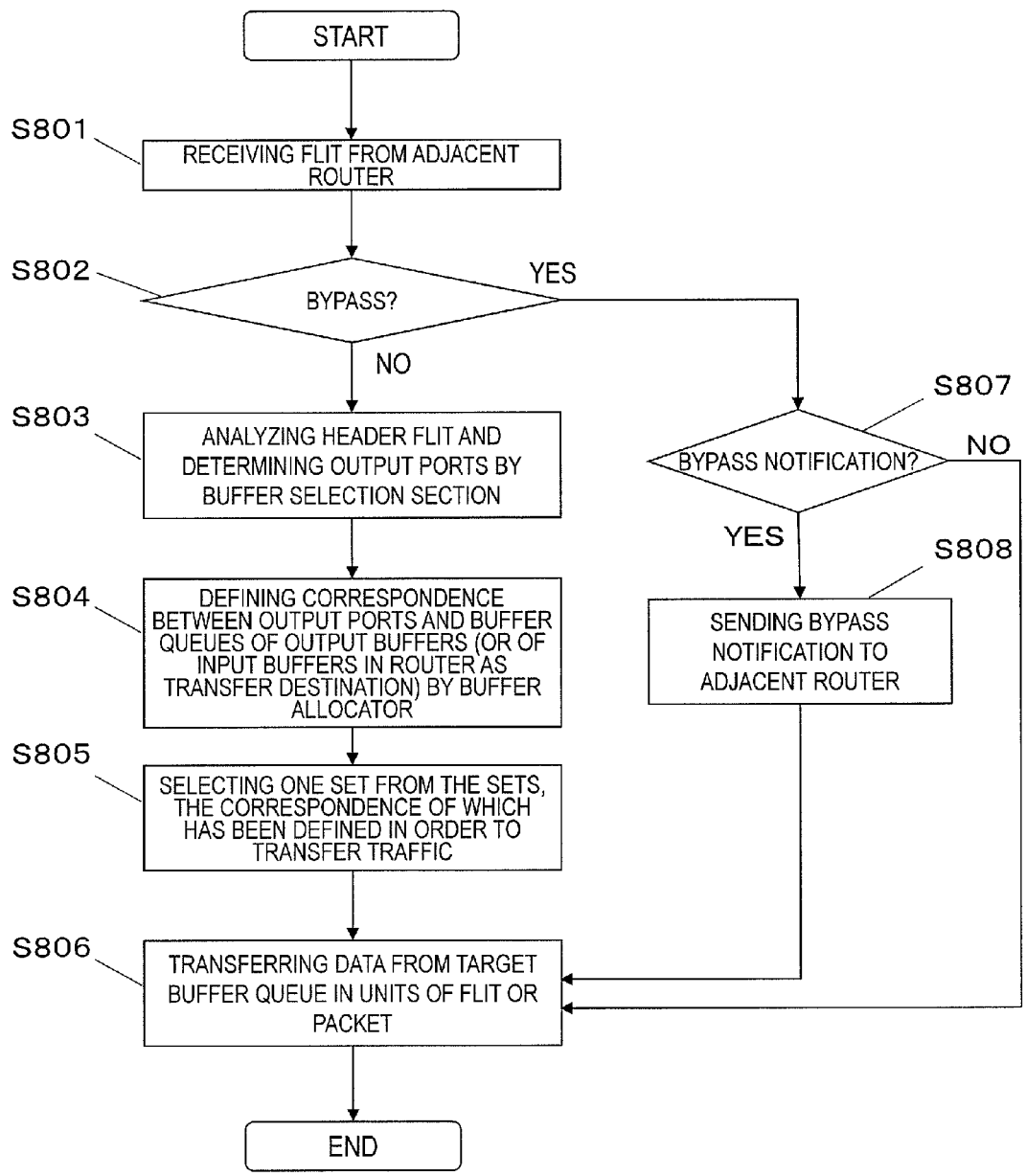
FIG. 7 shows a procedure of operation of the router in the first embodiment.

Now, an operation of the router 600b will be described. FIG. 7 is a flowchart schematically showing an operation of the router 600b.

First, the buffer selection section 603 in the router 600b receives a flit from the adjacent router 600a (S801). Next, the buffer selection section 603 determines whether or not to perform a bypass process (S802). When determining to perform the bypass process, the buffer selection section 603 performs the bypass process, and determines whether or not to perform a bypass notification process (S807). When determining to perform the bypass notification process, the buffer selection section 603 sends a bypass notification to the adjacent router 600a (S808). When determining not to perform the bypass notification process, the buffer selection section 603 does not sent the bypass notification. The bypassed flit is transmitted to the output buffer 606 and transferred from the target buffer queue (S806). A specific method for determining whether or not to perform the bypass process, and details of the operation for issuing the bypass notification, will be described later.

By contrast, when determining not to perform the bypass process in step S802, the routing processing section 607 analyzes the header flit and determines the output port (S803). Next, the buffer allocator 608 selects free output buffers 606 from the output buffers 606 corresponding to the output port selected by the routing process, and defines a correspondence between the selected output buffers and the buffer queues of the input buffers 604 in the router 600b (S804). In the configuration with no output buffer 606, the buffer allocator 608 defines a correspondence between the input buffers in the router 600c as the destination, instead of the output buffers 606, and the input buffers 604 in the router 600b. Next, the switch allocator 609 selects one set of buffer queue and output buffer 606 from sets of the buffer queues of the input buffers 604 and the output buffers 606, the correspondence of which has been defined, in order to transfer the traffic (S805). The data is transferred from the target buffer queue in units of one flit or one packet (S806).

According to the process described in S803 through S806, at least three cycles are needed for the flit input to the router 600b to be output from the router 600b. Specifically, the following three cycles are needed.

(1) Process corresponding to step S803. Specifically, based on the destination address described in the header flit, routing computation regarding the output ports 617 (output physical channel) (RC) is performed.

(2) Process corresponding to step S804. Specifically, the output buffers 606 to be used or the buffer queues (output virtual channels) of the input buffers in the router 600c as the destination to be used are allocated (virtual channel allocation; VA).

(3) Process corresponding to steps S805 and S806. Specifically, arbitration for the crossbar switch 605 (switch allocation; SA) is performed, and thus the flit is sent to, and allowed to pass, the crossbar switch 605 (switch traversal; ST). According to another mounting method, a process of sending the flit to, and allowing the flit to pass, the crossbar switch 605 may be performed in the fourth cycle.

By contrast, for the flit which is determined in step S802 as needing to be bypassed, the processes in steps S803 through S805 are omitted, and only the process corresponding to step S806 (ST) is performed. As a result, the bypassed flit is transferred in one cycle at the minimum.

<5.2. Bypass Determination>

Now, a specific process of bypass determination performed in step S802 will be described.

Figure 8:
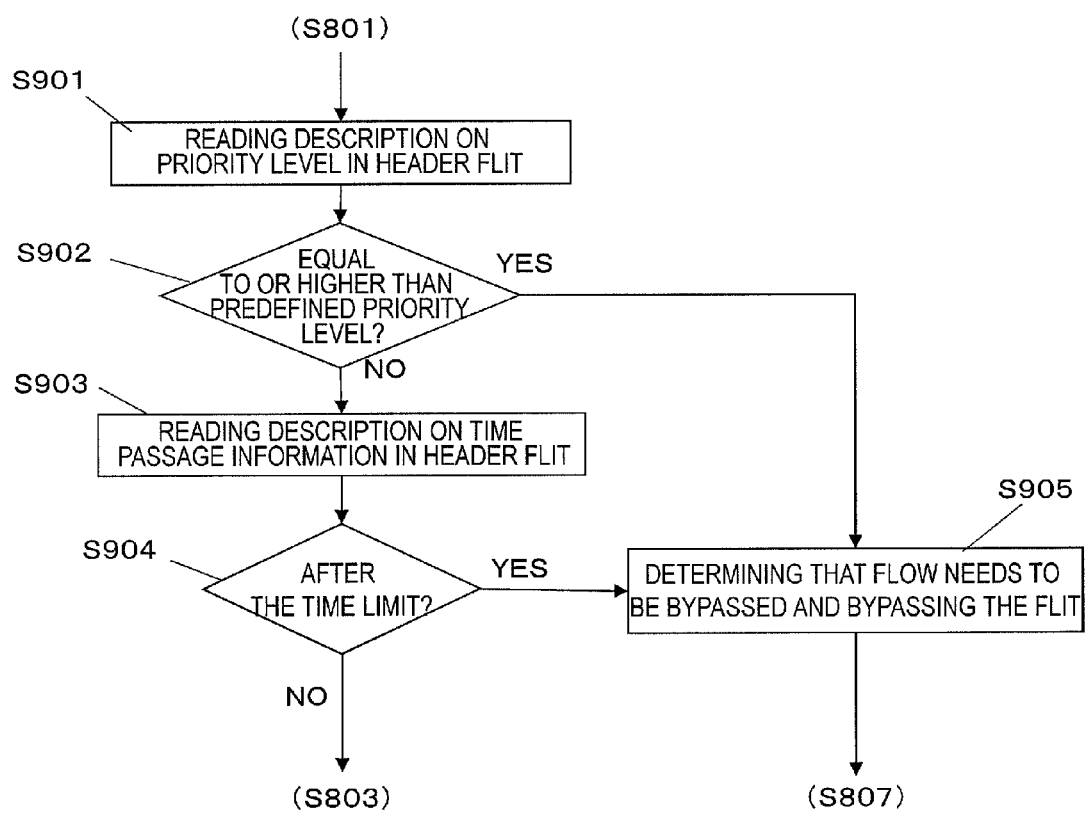
FIG. 8 shows a process, performed by the buffer selection section in the first embodiment, of determining whether or not to perform a bypass process.

FIG. 8 shows a process of determining whether or not to perform a bypass process by the buffer selection section 603. First, the header flit interpretation section 901 shown in FIG. 5B reads the description regarding the priority level in the header flit (S901). Next, the flit sorting section 902 compares the priority level of the flit against the value of the priority threshold value 908 stored on the memory, and determines whether or not the priority level of the flit is equal to or higher than a predefined priority level (S902). As the degree of request for low-latency transfer is higher for the flit, the priority value of the flit is set to a higher value, and the flit is treated as having a higher priority level.

When the value of the priority level of the flit is equal to or higher than the predefined priority level, the flit sorting section 902 determines that the flow including the flit is to be bypassed, and bypasses the target traffic (S903). The bypassed traffic is sent to the high priority traffic measurement section 1003 and then is transferred.

By contrast, when the value of the priority level of the flit is lower than the predefined priority level, the header flit interpretation section 901 reads the description regarding the time passage information in the header flit (S903). Next, the flit sorting section 902 compares the time passage information of the flit against the time limit information 904 stored on the memory, and determines whether or not the flit was transferred within the time limit (S904). When the flit was transferred after the time limit, the flit sorting section 902 determines that the data has a high emergency level, and performs bypass transfer (S905). When the flit was transferred within the time limit, the flit sorting section 902 determines that the data has a low emergency level, and does not perform bypass transfer.

The value of the priority level described in the header flit may be determined at the time of designing based on the emergency level or importance level of the data. For example, data such as video data or audio data which is required to be transferred with low latency, or information representing a command issued by the user or notifying system abnormality has a high emergency level and thus is provided with a high priority level. By contrast, data on file transfer or data of an application to be processed in the background has a low emergency level and thus is provided with a low priority level.

The time passage information described in the header flit is supplied by the bus master 101 which performs data transmission. The time passage information may be described in an absolute expression (e.g.: ○ (hour): Δ (minute): ×(second)) or may be a relative expression (e.g., within ○○ seconds).

The data transfer system may be configured such that the priority level is changed each time the data passes the router, with no time limit being set. In each router, data having a shorter time left by the time limit is provided with a higher priority level. In this manner, data having a high emergency level can be bypassed with no use of the information on the time limit. For example, data staying in the router for a longer time is re-provided with a high priority level, and thus substantially the same effect as above can be provided by use of only the information on the priority level, with no use of the time limit.

The flit sorting section 902 may be configured to perform a bypass process only when both of the priority level and the time passage information in the header flit exceed the priority threshold value 908 and the time limit 904. Alternatively, as shown in FIG. 5A, there may be two bypass paths (bypass BP1 and bypass BP2) and the flit sorting section 902 may be configured to select either one of the bypass paths in accordance with the priority level or emergency level. For example, the flit sorting section 902 may be configured such that when both of the priority level and the time passage information exceed the respective threshold values, the bypass BP2 with no output buffer 606 is selected, whereas when one of the priority level and the time passage information exceeds the respective threshold value, the bypass BP1 by which the data is transferred via the output buffer 606 is selected. Owing to such a configuration, data having a high emergency level or importance level can be transferred more quickly.

In this embodiment, the priority level and the time passage information are used as evaluation indexes which represent the height of the degree of request for low-latency transfer of a flit. The present disclosure is not limited to this. Instead of the priority level and the time passage information, the packet length of the traffic to be transferred or the number of routers that the data passes from the transmission node to the receiving node (number of routing stages) may be used as the evaluation index. For example, a packet having a short length and a small number of routing stages may be transferred with priority so that the effect of bypassing is improved. Alternatively, in the bus master 101 or the router 600, a flat indicating that the packet is to be bypassed may be provided in the header flit, so that it can be determined whether or not the packet needs to be bypassed.

Still alternatively, it may be determined whether or not a bypass process is to be performed in accordance with the correspondence between the transmission node and the receiving node (e.g., only a memory access from a specific bus master is bypassed) or in accordance with the type of the traffic. Such information may be used to limit the path by which the data is bypassed, so that it is not necessary to include an unnecessary bypass path, which can avoid the design of the system from being complicated.

In this embodiment, the bypass method shown in FIG. 5A is assumed. The bypass method used by a router is not limited to this example. A method of securing a transmission path by which data is dynamically bypassed, or a method of securing a bypass transmission path in advance at the time of designing, may be used. In the example of FIG. 5A, the lines are physically independent in order to avoid a transfer process. A method other than this may be adopted. Specifically, a method as disclosed in Non-patent Document 1, by which the routing process is omitted or performed in parallel for traffic transfer between specific transmission and receiving nodes to realize low latency, may be used. The router may have the following configuration: a plurality of buffers are provided, the packets are allocated to the plurality of buffers in accordance with the priority level information or the time passage information described in the packet, and a packet stored on a specific buffer is transferred with priority. Alternatively, a specific buffer may be preserved for a specific time duration to secure a transmission path, so that low latency is realized.

<5.3 Bypass Notification Determination>

Now, a specific process of determining whether or not to perform bypass notification in step S807 shown in FIG. 7 and a specific process of bypass notification in step S808 will be described.

Figure 9A:
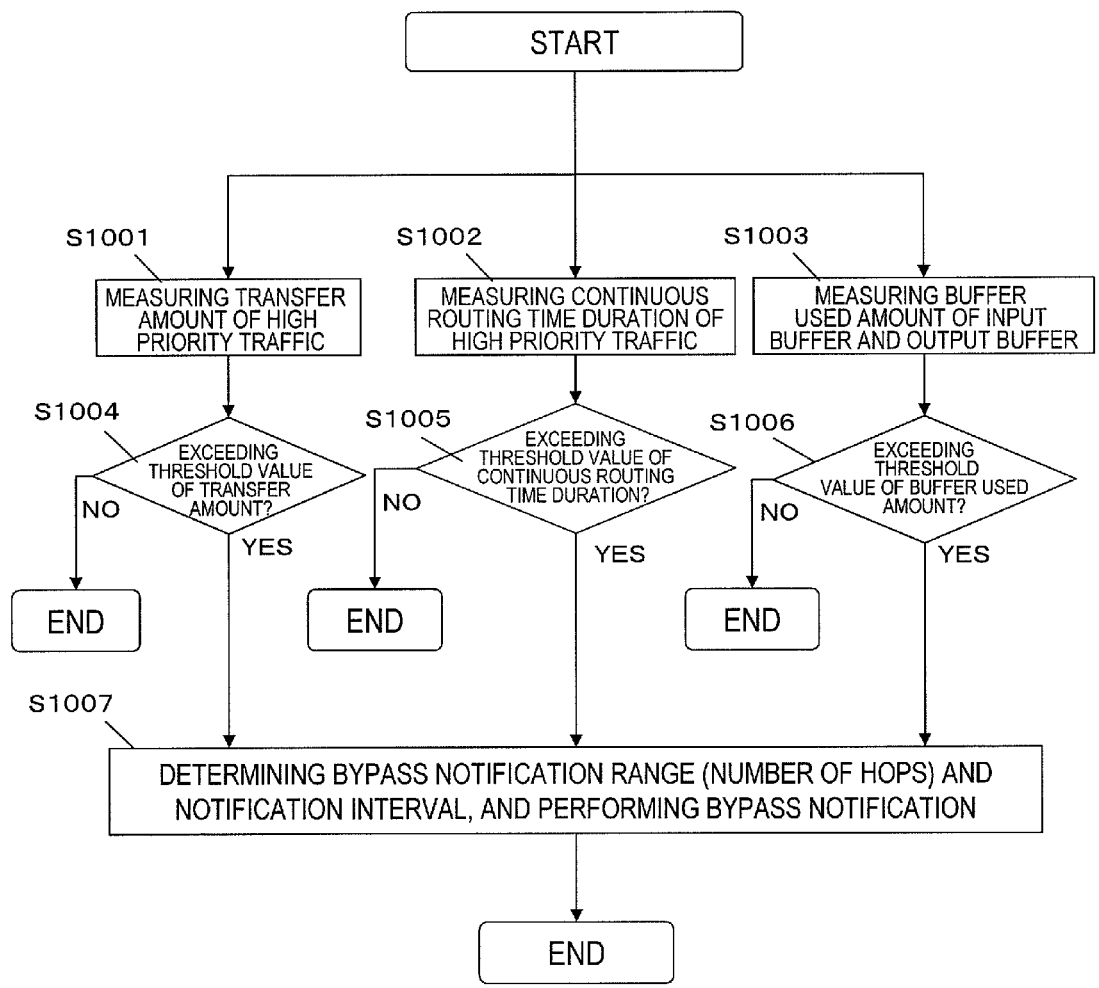
FIG. 9A shows a process of sending a bypass notification to an adjacent router in the first embodiment.

FIG. 9A shows a process of sending a bypass notification to an adjacent router 600a. In the following description, the term "high priority traffic" refers to a traffic determined as needing to be bypassed in step S802 shown in FIG. 7.

The high priority traffic measurement section 1003 in the buffer selection section 603 shown in FIG. 5B measures a transfer amount of high priority traffics to be bypassed (S1001), and sends the measurement result to the bypass notification determination section 1001. The bypass notification determination section 1001 determines whether or not the transfer amount of the traffics per unit time exceeds a predefined threshold value of transfer amount (S1004). When determining that the transfer amount of the traffics per unit time exceeds the threshold value of the transfer amount, the bypass notification determination section 1001 determines that the influence on a traffic not to be bypassed will be strong, determines a bypass notification range and a notification interval, and performs bypass notification to the other routers (S1007). The threshold value of transfer amount is included in the information on the traffic threshold value 907.

The bypass notification is performed by transmitting a bypass notification packet to the adjacent router 600a on the previous stage. A structure of the bypass notification packet will be described later.

Now, instead of the network architecture shown in FIG. 3, a configuration including the routers 600 in a larger number of stages will be discussed. Namely, a configuration in which routers 600 on a large number of stages route traffics in series on each of the transmission paths between the bus masters 101 to the memories 105 will be discussed.

In such a configuration, when one of the routers determines to perform bypass notification, the bypass notification range is determined by, for example, the following method. The unit time is set to 10,000 cycles. When ¼ or more of the physical band of the bypass transmission path is occupied by high priority traffics during the unit time, the bypass notification is performed to the routers within a distance of one hop. When the ½ of the physical band is occupied by high priority traffics during the unit time, the bypass notification is performed to the routers within a distance of two hops. When the ¾ of the physical band is occupied by high priority traffics during the unit time, the bypass notification is performed to the routers up to the router connected to the bus master 101. By such a method, the bypass notification range can be flexibly changed in accordance with the transfer load on the bypass transmission path in the router which performed the bypass process. As a result, the other routers which received the bypass notification can take a measure for alleviating the traffic interference in the router which issued the bypass notification. A behavior of the routers which received the bypass notification packet will be described later.

The notification interval is determined by, for example, the following method. Where the unit time is set to 10,000 cycles, only when a high priority traffic passing the bypass path is detected within the unit time, bypass notification is performed. By such a method, when high priority traffics are detected frequently, the bypass notification is performed at a short notification interval. By contrast, when the high priority traffics are not detected frequently, the bypass notification is performed at a long notification interval. As a result, when the frequency of traffic interference is increased, a process of suppressing the traffic interference immediately can be performed. By contrast, when the frequency of traffic interference is decreased, the traffic interference can be suppressed while the number of messages of bypass notification is decreased.

The high priority traffic measurement section 1003 in the buffer selection section 603 measures the time duration in which high priority traffics pass the bypass path with no break (continuous routing time duration) (S1002), and sends the measurement result to the bypass notification determination section 1001. The bypass notification determination section 1001 determines whether or not the continuous routing time duration of the bypassed traffics exceeds a predefined threshold value (S1005). When determining that the continuous routing time duration exceeds the threshold value, the bypass notification determination section 1001 determines that the influence on traffics not to be processed will be strong, determines a bypass notification range and a notification interval, and performs bypass notification to the other routers (S1007). The threshold value of continuous routing time duration is also included in the information on the traffic threshold value 907.

The bypass notification range is determined by, for example, the following method. The unit time is set to 10,000 cycles. When the time duration in which high priority traffics pass the bypass path exceeds ¼ of the unit time, the bypass notification is performed to the routers within a distance of one hop. When the time duration in which high priority traffics pass the bypass path exceeds ½ of the unit time, the bypass notification is performed to the routers within a distance of two hops. When the time duration in which high priority traffics pass the bypass path exceeds ¾ of the unit time, the bypass notification is performed to the routers up to the router connected to the bus master. By such a method, the bypass notification range can be flexibly changed in accordance with the transfer load on the bypass transmission path in the router which performed the bypass process. As a result, the other routers which received the bypass notification can take a measure for alleviating the traffic interference in the router which issued the bypass notification.

The notification interval may be determined in substantially the same manner as in the case where the transfer amount of the high priority traffics exceeds the threshold value.

The buffer used amount measurement section 1002 in the buffer selection section 603 measures a buffer used amount of the input buffer 604 and/or the output buffer 606 (S1003), and sends the measurement result to the bypass notification determination section 1001. The bypass notification determination section 1001 determines whether or not the buffer used amount exceeds a predefined threshold value (buffer threshold value 905) (S1006). When determining that the buffer used amount exceeds the predefined threshold value, the bypass notification determination section 1001 determines that the influence of the bypass process on the traffic not to be bypassed has become strong, determines a bypass notification range and a notification interval, and performs bypass notification to the other routers (S1007).

The bypass notification range is determined by, for example, the following method. The unit time is set to 10,000 cycles. When the free capacity of the input buffer 604 (or the output buffer 606) is ¾ or more of the total capacity thereof during the unit time, the bypass notification is performed to the routers within a distance of one hop. When the free capacity of the input buffer (or the output buffer) is ½ or more of the total capacity thereof during the unit time, the bypass notification is performed to the routers within a distance of two hops. When the free capacity of the input buffer (or the output buffer) is smaller than ½ the total capacity thereof during the unit time, the bypass notification is performed to the routers up to the router connected to the bus master. By such a method, the bypass notification range can be flexibly changed in accordance with the free capacity of the input buffer and/or the output buffer. As a result, the other routers which received the bypass notification can take a measure for alleviating the interference between traffics to be bypassed and traffics not to be bypassed in the router which issued the bypass notification.

The notification interval may be determined in substantially the same manner as in the case where the transfer amount of the high priority traffics exceeds the threshold value.

A wait time at the buffer, instead of the buffer used amount, may be used to make the determination. When the buffer capacity is small, it may be easier to reflect the jamming state in the router by making an evaluation based on the wait time than based on the used amount.

The notification range for the bypass notification packet may be specified by, for example, the following method. First, the bypass notification determination section 1001 describes the number of hops determined by the above-described method as the "number of times of routing" in the header flit and sends the number of times of routing to a previous stage router. The router which received the bypass notification packet subtracts a prescribed value from the number of times of routing, and transfers the bypass notification packet to a further previous stage router. In this manner, the routers are configured such that each time the bypass notification packet passes the router, subtraction is made on the number of times of routing, and the transfer of the bypass notification packet is stopped on the stage where the number of times of routing becomes equal to or smaller than zero. Thus, the notification range can be specified. Regarding the direction of notification, for the traffic on the outward path from the bus master 101 to the memory 105, the bypass notification packet may be transmitted toward the bus master 101, which is the source, as described above. By contrast, for the traffic on the return path from the memory 105 to the bus master 101, the bypass notification packet may be transmitted toward the memory 105, which is the destination. In this manner, the notification direction may be limited to toward the bus master 101, which is the source, or toward the memory 105, which is the source. Thus, the message can be sent efficiently between a router having a high load and other routers, which can decrease the number of notification messages.

In the example shown in FIG. 9A, the measurement of the transfer amount of the high priority traffics, the measurement of the routing continuation time duration, and the measurement of the buffer used amount are performed in parallel. Alternatively, these measurements may be performed in series. When these measurements are performed in series, the bypass notification may be transmitted when the threshold value is exceeded in any of the determinations, or the bypass notification may be transmitted only when threshold value is exceeded in all of the determinations.

Figure 9B:
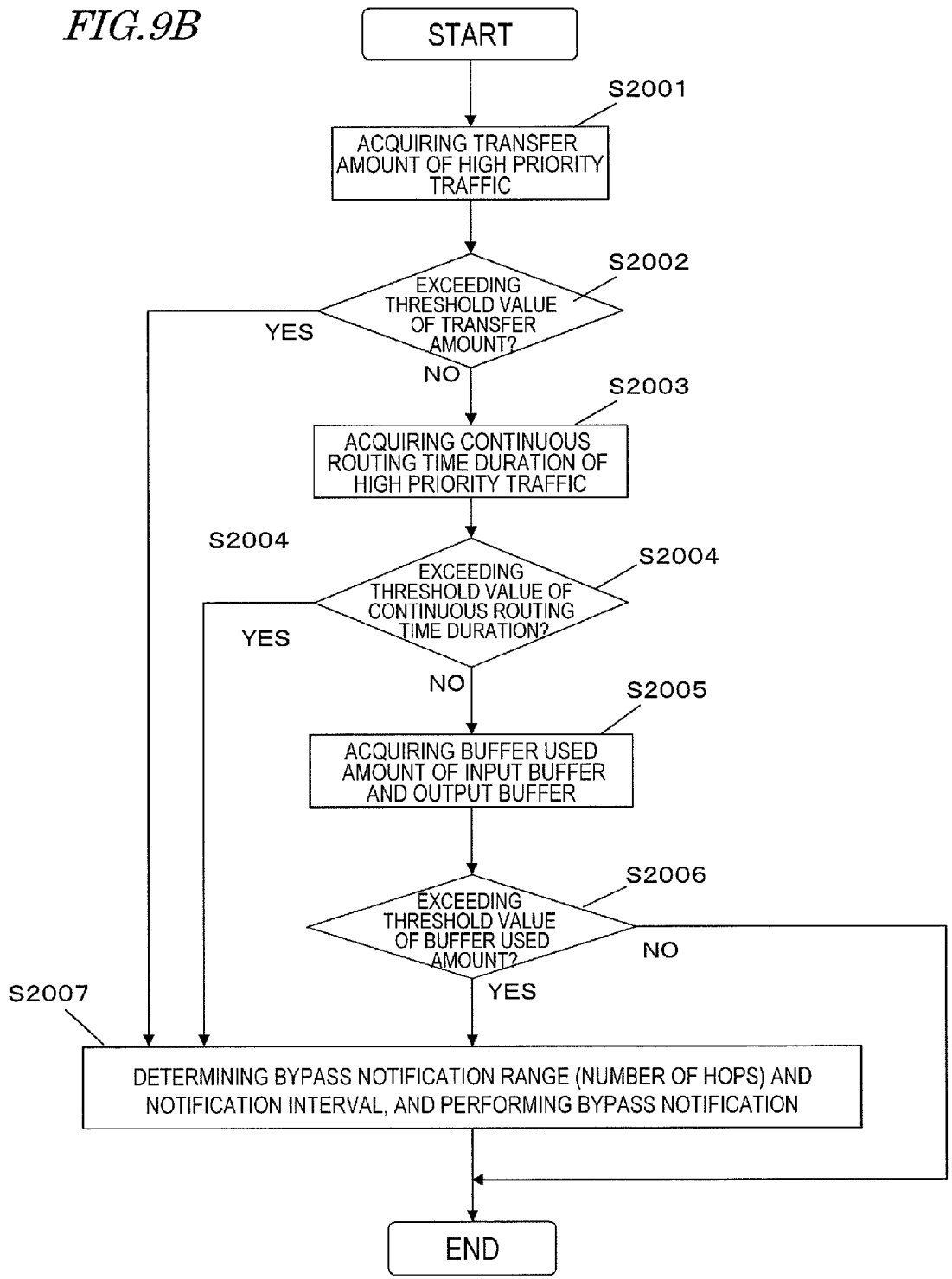
FIG. 9B shows another example of process of sending a bypass notification to an adjacent router in the first embodiment.

FIG. 9B shows an example of process of making the determinations in series. In this example, the bypass notification determination section 1001 performs bypass notification when the threshold value is exceeded in any of the determinations. First, the bypass notification determination section 1001 acquires information on the transfer amount of high priority traffics from the high priority traffic measurement section 1003 (S2001). Next, the bypass notification determination section 1001 determines whether or not the transfer amount of the high priority traffics exceeds the threshold value (S2002). When determining that the transfer amount of the high priority traffics exceeds the threshold value, the bypass notification determination section 1001 determines a bypass notification range (number of hops) and a notification interval, and performs bypass notification to the other routers (S2007). When determining that the transfer amount of the high priority traffics does not exceed the threshold value, the bypass notification determination section 1001 acquires information on the continuous routing time duration from the high priority traffic measurement section 1003 (S2003). Next, the bypass notification determination section 1001 determines whether or not the continuous routing time duration exceeds the prescribed threshold value (S2004). When determining that the continuous routing time duration exceeds the threshold value, the bypass notification determination section 1001 performs bypass notification to the other routers (S2007). When determining that the continuous routing time duration does not exceed the threshold value, the bypass notification determination section 1001 acquires information on the buffer used amount from the buffer used amount measurement section 1002 (S2005). The bypass notification determination section 1001 determines whether or not the buffer used amount exceeds the threshold value (S2006). When determining that the buffer used amount exceeds the threshold value, the bypass notification determination section 1001 performs bypass notification (S2007). When determining that the buffer used amount does not exceed the threshold value, it is determined that the transfer load is low, and the process ends. In this manner, the determinations may be performed in series. In this case, when it is determined to perform bypass notification by the first determination, the other determinations may be omitted.

There are cases where a traffic which is continuous and has a large amplitude, such as video data, is instantaneously transferred. Such a traffic (bursty traffic) causes traffic interference with other traffics and thus exerts a strong influence on the other traffics. Therefore, it may be determined whether or not to perform bypass notification based on, for example, the maximum amplitude or the transmission interval of traffics during the continuous routing time duration, in addition to the above-described determination criteria. The term "amplitude" refers to an amount of data transferred per unit time, and the term "transmission interval" refers to a time interval between packets transmitted continually. The method for determining whether or not to perform bypass notification, and the method for determining the notification range and the notification interval, are not limited to the above-described methods and may be any method.

In the above description, the determination on whether or not to perform bypass notification in step S807 shown in FIG. 7 is performed. According to the present disclosure, the process corresponding to step S807 may be omitted. Namely, the bypass notification may be performed whenever it is determined in step S802 to perform the bypass process.

Figure 10:
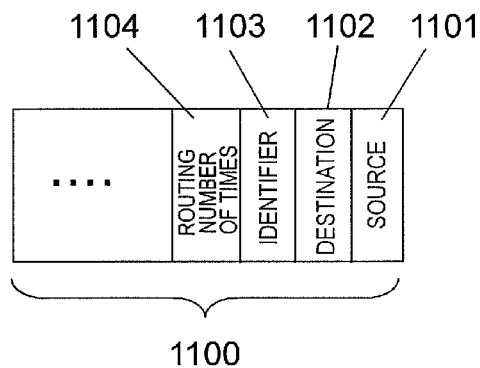
FIG. 10 shows an example of structure of a bypass notification packet in the first embodiment.

FIG. 10 shows an example of structure of a bypass notification packet 1100. As described above, in a leading part of the bypass notification packet 1100, a source address 1101 and a destination address 1102 are described. The bypass notification packet 1100 includes an identifier 1103 indicating that the packet includes a message of bypass notification, and information 1104 representing the number of times of routing. The bypass notification packet may be sent to the adjacent routers in a broadcasting manner or may be sent only to the router which is transmitting a traffic. In the example shown in FIG. 10, the notification range is specified by the number of times of routing. Alternatively, the range of the routers to which the notification is performed may be limited in terms of time, by a method of directly describing the time or a method of describing the time duration which has passed from the time of transmission.

The bypass notification packet 1100 as described above is transmitted to the other routers nearby, so that the other routers which received the bypass notification packet 1100 can learn that a bypass process is being performed on a transmission path via which the other routers are going to transmit data. As a result, the other routers can take a measure of, for example, changing the transmission path or the like in order to avoid a delay, and thus the transmission delay can be alleviated.

<5.4. Operation of Routers which Received Bypass Notification>

Now, an example of operation of the routers which received the bypass notification will be described. The following description will be given regarding the example shown in FIG. 11 instead of FIG. 3 for easier understanding.

Figure 11:
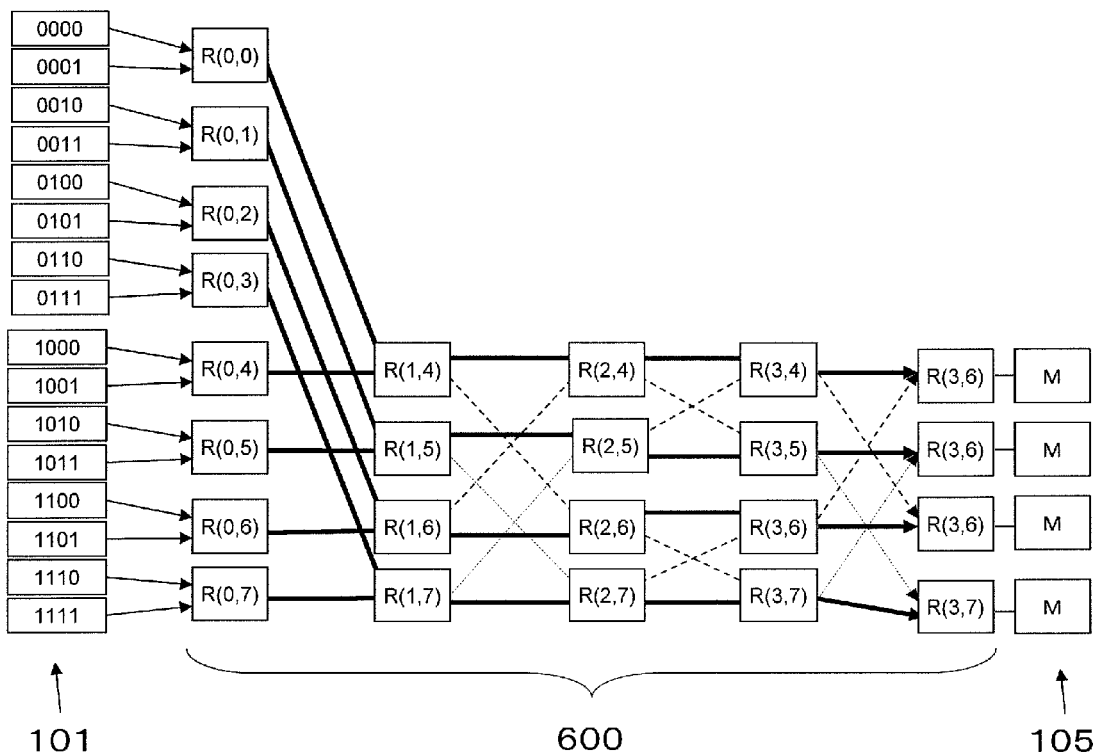
FIG. 11 shows an example of configuration of a butterfly network

FIG. 11 shows a butterfly network in which the plurality of bus masters 101 can access the plurality of memories 105 via the plurality of routers 600. In the butterfly network, the paths from the bus masters 101 to the memories 105 logically have the same distance regardless of which routers the paths pass. In the example shown in FIG. 11, only the traffics advancing straight from the bus masters 101 to the memories 105 (traffics represented with the straight lines) are targets of bypassing. Herein, the expression "traffic advancing straight" refers to, for example, a traffic transferred via the first input/output port of each router. In the transmission paths which are not straight from the bus masters to the memories, the bypass process is not performed. Such a configuration can decrease the number of lines required for a bypassing process performed by the routers. Even in the case where a network topology other than the butterfly network, for example, a mesh network, is used, it may be determined whether or not to perform a bypass process based on the relationship among the locations of the nodes (locations of the bus masters and the locations of the memories).

FIG. 12 shows a network model (simple network model) used in the following description. The network model used in the following description is, as shown in FIG. 12(c), a network in which there are two paths from the transmission node (node A) to the destination (node D). Node B and node C are routing nodes. In this network model, one of the two transmission paths can be selected when necessary.

FIG. 12(a) is a butterfly network shown in FIG. 11, and shows an example of correspondence among the nodes at the source, the routers, and the destination. FIG. 12(a) is in correspondence with FIG. 12(c). A router in this embodiment are not limited to being applied to the network as shown in FIG. 3 or FIG. 11, and may be similarly applied to the mesh network as shown in FIG. 12(b). FIG. 12(b) shows an example of mesh network, and also shows an example of correspondence among the nodes at the source, the routers, and the destination. FIG. 12(b) is in correspondence with FIG. 12(c). In the following description, the relationship among the source, the routers, and the destination as shown in FIG. 12(a) or FIG. 12(b) is represented by use of the simple network model shown in FIG. 12(c) for the sake of simplicity. It should be noted that the present disclosure is not limited to such a simple network model. The source and the destination are not limited to those shown in FIG. 12. For example, the source may be a receiving node (e.g., memory).

Figures 13A, 13B:
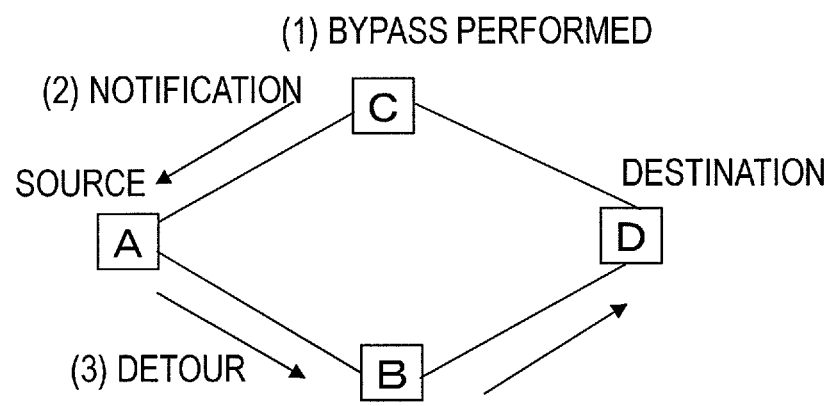
FIG. 13A shows a procedure of bypass notification process by the simple network model in the first embodiment.
FIG. 13B shows an example of path information regarding routers.

FIG. 13A shows a path assumed when a router in this embodiment receives a bypass notification, based on the simple network model. First, when a bypass process is performed by the router (node C) on the path ((1) bypass performed), the router (node C) transmits a message of bypass notification to the router (node A), which is the source of the traffic ((2) notification). Upon receiving the bypass notification, the router (node A), which is the source, changes the path and transfers the data to the router (node D), which is the destination, via the router (node B) ((3) detour). FIG. 13A shows an example in which node A changes the path. Alternatively, node A may take a measure of adjusting the transmission flow rate as described later, instead of changing the path.

FIG. 13B shows path information managed by the routing processing section 607 of node A. The information shown here includes a transmission path from the router (node A) as the source to the other routers (node B, node C and node D). The router (node A) determines the path based on the path information. Substantially the same path information is managed by the routing processing section 607 in each router.

FIG. 14 is a flowchart showing an operation of the router (node A) which received the bypass notification. First, the buffer selection section 603 reads the identifier 1103 of the received packet, and detects that the packet is the bypass notification packet 1100 (S1201).

Next, the buffer selection section 603 determines whether or not to switch the path (whether or not to use a detour path) (S1205). When the buffer selection section 603 determines to use the detour path, which is different from the path of the traffic to be bypassed, the routing processing section 607 selects a detour path (A→B→D) based on the source information described in the bypass notification packet 1100 (S1202). Next, the buffer allocator 608 and the switch allocator 609 perform a transfer process for the newly set detour path, and thus the bypass notification packet 1100 is transferred on the detour path ((3) detour) (S1203).

When the buffer selection section 603 determines not to use the detour path and to use the same path as that of the traffic to be bypassed, the router (node A) controls the transmission timing from the output buffer 606 in accordance with the receiving timing of the bypass notification packet (S1204).

The determination on whether or not to use the detour path is made by the router (node A) which received the bypass notification, based on the receiving interval of the bypass notification packets which are sent from the router (node C) which is performing the bypass process. Specifically, node A, which received the bypass notification packet, determines that the packet is the bypass notification packet by the header flit interpretation section 901, and then transfers the bypass notification packet to the bypass notification determination section 1001. When the receiving interval of the bypass notification packets is equal to or longer than a prescribed threshold value, the bypass notification determination section 1001 determines that the influence of traffic interference is not strong, and instructs the output buffer 606 to increase the transmission interval of the traffics not to be bypassed from the output buffer 606. As a result, the transmission flow rate from node A to node C is limited to be low (flow rate limitation).

By contrast, when the receiving interval of the bypass notification packets is shorter than the prescribed threshold value, the bypass notification determination section 1001 of node A determines that the influence of traffic interference between the traffic not to be bypassed and the traffic to be bypassed is strong. Then, the bypass notification determination section 1001 of the source (node A) instructs the routing processing section 607 of the source (node A) to search for a detour path. Based on the detour path, the buffer allocator 608 and the switch allocator 609 of the source (node A) operate to change the transmission path of the traffic not to be bypassed and thus to prevent the traffic interference. The threshold value of the receiving interval may be determined at the time of designing empirically.

As described above, the router which received the bypass notification packet takes a measure of switching the path or adjusting the transmission interval in accordance with the receiving interval of the bypass notification packets. The difference between the effect provided by switching the path and the effect provided by adjusting the transmission timing is as follows. When the path is switched, a delay is caused due to the switch of the path, but the influence of traffic interference between the traffic to be bypassed and the traffic not to be bypassed can be suppressed. By contrast, when the transmission timing is adjusted, the delay due to the switch of the path is not caused, but the influence of traffic interference between the traffic to be bypassed and the traffic not to be bypassed may be exerted. However, even when the detour path is used, traffic interference on the post-switch path may become a problem.

The buffer selection section 603 may determine whether to switch the path or to adjust the transmission timing based on information other than the receiving interval of the bypass notification packets. For example, the buffer selection section 603 may switch the path or adjust the flow rate based on at least one of the buffer used amount and the buffer used time duration of the output buffer 605 which are measured by the buffer used amount measurement section 1002.

According to this embodiment, the influence of traffic interference between the bypass traffic and the non-bypass traffic can be appropriately suppressed in consideration of the risk caused by switching the path (delay due to the switch, traffic interference on the post-switch path). In the case where the measure of switching the path is adopted, the transfer load on the post-switch path may be measured in advance so that the path can be switched only when the transfer load is small. In this manner, generation of the traffic interference on the post-switch path can be suppressed. Instead of performing either the process of switching the path or the process of adjusting the flow rate, both of the processes may be used.

In the above description, as a specific example of process of switching the path, a process of switching the path to a detour having the same destination as the pre-switch path is described. Alternatively, the destination may be changed as well as the transmission path. For example, the router which performed a bypass process may perform bypass notification to the transmission node, and the transmission node may select a new destination (e.g., memory on which the data is to be written). The switching of the path may be performed only for the traffic which is to be input to the router that is currently performing the bypass process. In other words, the traffic which is not to be input to the router that is currently performing the bypass process may be excluded from the target of the path switch. Alternatively, the transmission node may change the path or the destination in accordance with the bypass notification, such that the traffic which is to pass the router that is currently performing the bypass process can avoid the path on which the bypass process is being performed.

Figure 15A:
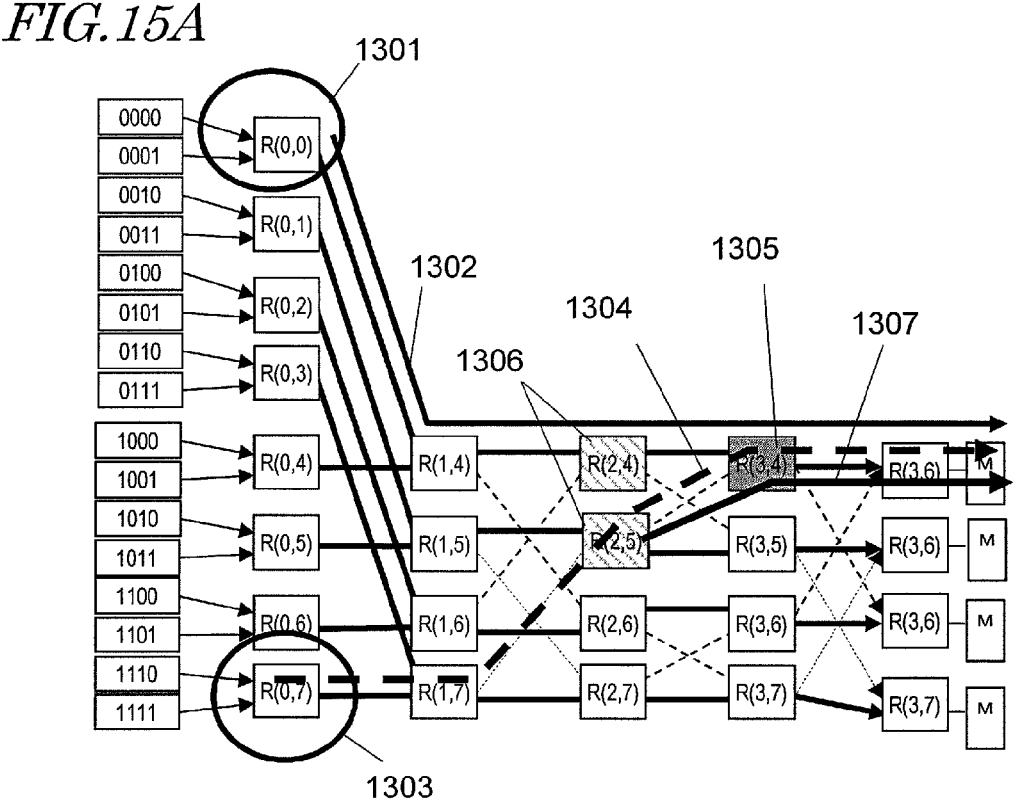
FIG. 15A shows a first example of process performed by the router which received a bypass notification on a traffic not to be bypassed.
Figure 15B:
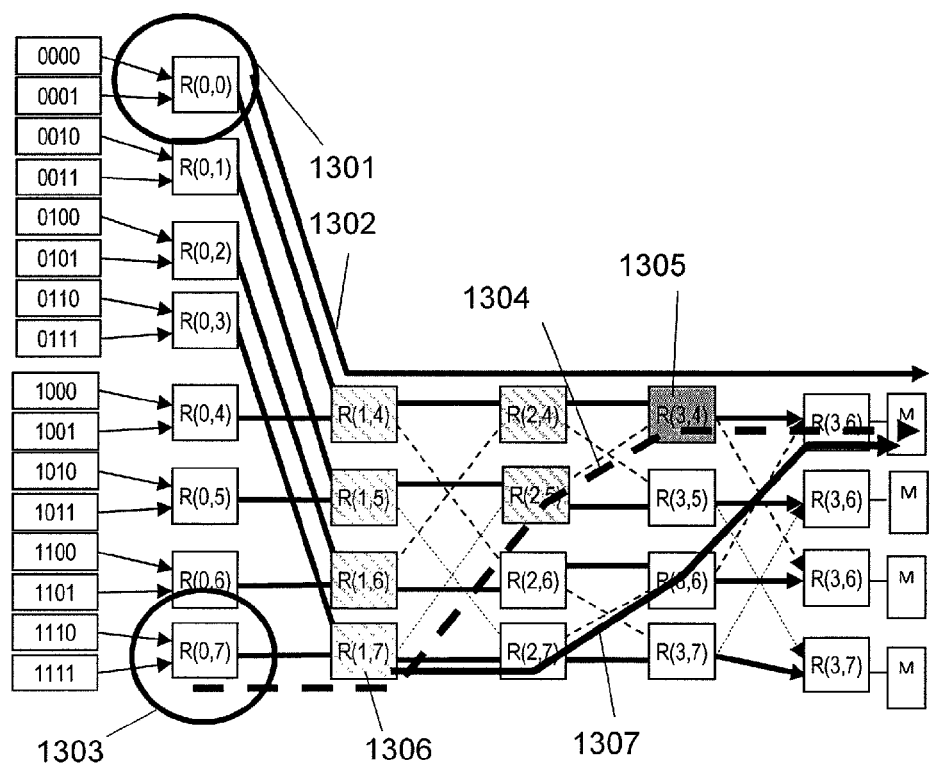
FIG. 15B shows a second example of process performed by the router which received a bypass notification on a traffic not to be bypassed.
Figure 15C:
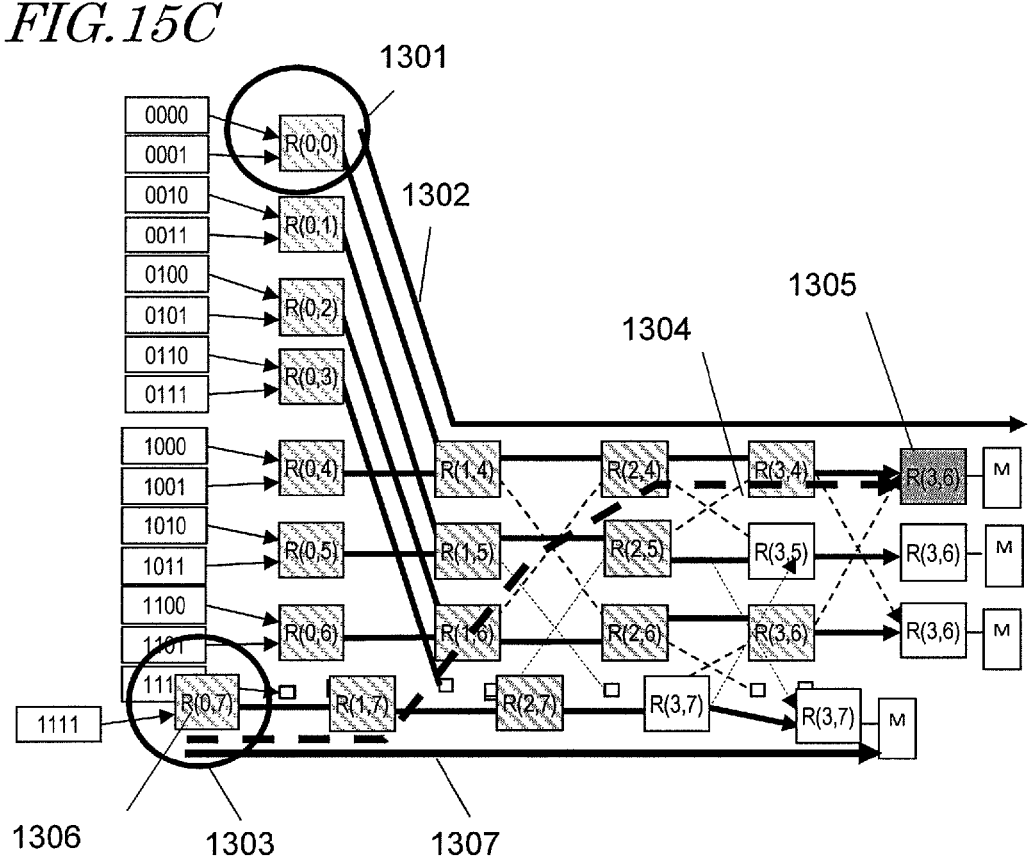
FIG. 15C shows a third example of process performed by the router which received a bypass notification on a traffic not to be bypassed.

Now, with reference to FIG. 15A through FIG. 15C, specific examples of bypass notification range and operation of the routers which received a bypass notification in this embodiment will be described. In FIG. 15A through FIG. 15C, a shaded router 1305 represents a router performing a bypass process and a bypass notification process, and hatched routers represent routers in the transmission range of the bypass notification.

FIG. 15A shows an example in which the bypass notification is performed from the router 1305, which performed the bypass process, to routers 1306 within a distance of one hop. In this example, a traffic 1302 generated from a router 1301 is bypassed by the router 1305 and is transferred to the memory. A traffic 1304 generated from a router 1303 passes the router 1305 without being bypassed and is about to be transferred to the same memory as the traffic 1302. In this case, the router 1306 which received the bypass notification from the router 1305 transfers a traffic 1307 as a result of suppressing the transmission flow rate of the traffic 1304. The flow rate of the traffic 1307 is limited as compared with the flow rate of the traffic 1304 originally scheduled to be transferred, but the interference between the traffic 1304 and the traffic 1302 to be bypassed can be suppressed.

FIG. 15B shows an example in which the bypass notification is performed from the router 1305, which performed the bypass notification, to the routers up to the router 1306 within a distance of two hops. In this example, the traffic 1302 generated from the router 1301 is bypassed by the router 1305 and is transferred to the memory. The traffic 1304 generated from the router 1303 passes the router 1305 without being bypassed and is about to be transferred to the same memory as the traffic 1302. In this case, the router 1306, which received the bypass notification from the router 1305, selects a detour path leading to the same target memory as the traffic 1302 without passing the router 1305 and transfers the traffic 1307. As a result, the data can be transferred to the target memory with no influence of the bypass process performed by the router 1305.

FIG. 15C shows an example in which the bypass notification is performed to the routers up to the router 1306 connected to the bus master. In this example, the traffic 1302 generated from the router 1301 is bypassed by the router 1305 and is transferred to the memory. The traffic 1304 generated from the router 1303 passes the router 1305 without being bypassed and is about to be transferred to the same memory as the traffic 1302. In this case, the router 1306 (1303), which received the bypass notification from the router 1305, transfers the traffic 1307 to a memory different from the memory to which the traffic 1302 is transferred (or stops the transfer of the traffic).

As described above, the operation (adjustment of the flow transmission amount, detouring, change of the destination, etc.) of the router 1306 which received the bypass notification may be set at the time of designing in accordance with the distance (number of hops) between the router 1305 performing the bypass process and the router 1306 receiving the bypass notification.

<5.5. Operation on Traffic not to be Bypassed>

Now, an operation of the router 600 on a non-bypass traffic will be described.

In this embodiment, when performing a bypass process on a part of traffics, the router performs control (transfer control) such as changing the transmission path of, or adjusting the transmission flow rate of, a traffic not to be bypassed for which the same destination as that for a bypassed traffic is set, in order to prevent the traffic interference. This control is executed based on the transmission state of the router at which bypass traffics and non-bypass traffics are joined together. Specifically, in the configuration shown in FIG. 3, a bypass traffic and a non-bypass traffic are joined together in the output buffer 606 in the router 600b of interest or the input buffer of the adjacent router 600c on the subsequent stage. Therefore, the transfer control is performed based on the transmission state of the router 600b of interest or the adjacent router 600c on the subsequent stage. This control is executed based on, for example, the transmission state such as the buffer used amount (free capacity), the buffer used time duration or the like of the output buffer 606 in the router 600b of interest or the input buffer of the adjacent router 600c. In this specification, the term "transmission state" of a router refers to information representing a transfer quality such as the free capacity, used amount, wait time, throughput, or transfer efficiency of a buffer (input buffer 604 or output buffer 606). The transfer amount of the bypass traffic may be treated as the transmission state.

By contrast, in the configuration shown in FIG. 1A, the non-bypass traffic transferred from the bus master 1a and the bypass traffic transferred from the bus master 1b are joined together at the router R9. In this case, the router R9 may perform transfer control on the non-bypass traffic based on the transmission state of the router R9 itself. In this example, the router R9 causes the traffic to skip the adjacent router R8 directly connected thereto and bypasses the traffic to the router R7 beyond the router R8. For this reason, the bypass traffic and the non-bypass traffic are joined together also at the router R7. Therefore, the router R9 may be configured to perform transfer control on the non-bypass traffic also in consideration also of the transmission state of the router R7. In the state shown in FIG. 1A, the router R8 in the middle of the path may perform transfer control on the non-bypass traffic based on the transmission state of the router R7.

In the state shown in FIG. 1B, the bypass traffic and the non-bypass traffic are joined together only at the router R7 connected to the memory 5 as the destination. Therefore, the routers R8 and R9 for routing the non-bypass traffic are configured to perform transfer control on the non-bypass traffic based on the transmission state of the router R7 as the transfer destination.

In the examples shown in FIG. 1A and FIG. 1B, the routers R8 and R9 need to obtain information representing the transmission state of the router R7 which is jammed. For this purpose, the following method may be adopted. First, the bus master 1a as the source inquires of the memory 5 regarding information on the memory capacity or the like and receives a response from the memory 5 regarding the information, before transferring data of the non-bypass traffic to the memory 5 as the destination. At this point, the router R7, at which the bypass traffic and the non-bypass traffic are joined together on the transmission path, attaches information representing the transmission state of the router R7 itself to information representing the response from the memory 5, and sends such information back to the bus master 1a. The bus master 1a, which received the response, when determining that data can be transmitted to the memory 5, attaches the information representing the transmission state of the router R7 to the data to be transmitted, and transfers such data to the memory 5. The routers R8 and R9 on the transmission path perform transfer control on the data based on the information representing the transmission state of the router R7 attached to the received data. In this manner, the routers R8 and R9 can perform transfer control on the non-bypass traffic based on the transmission state of the router R7, which is assumed to be jammed.

The above-described method is merely exemplary, and any method is usable as long as the information representing the transmission state of the router at which a bypass traffic and a non-bypass traffic are joined together can be notified to the other routers. For example, in the case where a delay of the data is caused in the router at which a bypass traffic and a non-bypass traffic are joined together, the router for transferring data to such a router cannot secure a buffer at the transfer destination. As a result, a delay of the data is also caused in the second router. Then, the jamming state is conveyed to upstream routers in a chain-reacting manner. Therefore, the routers can learn that either one of the routers as the transfer destinations is jammed. In this example, it is considered that the influence of the bypass traffic and the non-bypass traffic being joined together is notified by the state where a buffer cannot be secured in the router as the transfer destination.

Figure 16:
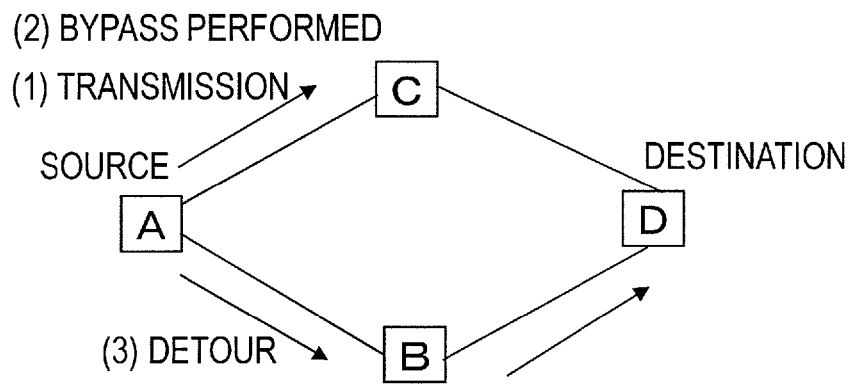
FIG. 16 shows a process performed by the router on a traffic not to be bypassed when a bypass process is performed in the first embodiment.

FIG. 16 shows a process performed by a router on a traffic not to be bypassed. FIG. 16 shows how the router in this embodiment changes the transmission path of the traffic not to be bypassed, based on the simple network model. First, it is assumed that router A, which is the source, transfers data to router D, which is the destination, via router C ((1) transmission). When router A bypasses a part of the traffics during the data transfer ((2) bypass performed), router A changes the transmission path of the traffic not to be bypassed to the path passing router B, in order to suppress the interference between the traffics ((3) detour). In this example, it is preconditioned that the destination (router D) has a capability of receiving the traffics transferred at the same time from two paths. Therefore, even when the traffics are transferred at the same time from the two paths, the destination (router D) is not jammed.

In the example shown in FIG. 16, router A changes the path of the non-bypass traffic. As described later, router A may adjust the transmission flow rate, instead of changing the path. In this embodiment, whether to change the path or to adjust the transmission flow rate is determined by the bypass notification determination section 1001 in the buffer selection section 603 based on the used amount of the output buffer 606. Examples of usable methods for adjusting the transmission flow rate include, for example, delaying the transmission start timing until the transfer of the bypass traffic is completed, stopping the transmission for a certain time duration, and the like.

FIG. 17A is a flowchart showing an operation performed by router A, which performed the bypass process, a non-bypass traffic. First, it is assumed that during transfer of a traffic, a bypass process is performed on another traffic on the path used for the transmission of the first traffic (S1301). Then, the bypass notification determination section 1001 determines whether to switch the path of non-bypass traffics (use a detour path) or to adjust the transmission flow rate by a method described later (S1305). When determining to switch the path, the bypass notification determination section 1001 sends a control signal for instructing the routing processing section 607 to switch the path. Upon receiving the control signal, the routing processing section 607 selects the detour path (path of A→B →D), and determines an output port corresponding to the detour path (S1302). Next, the buffer allocator 608 and the switch allocator 609 perform a transfer process, and the transfer is executed by use of the detour path ((3) detour) (S1303). When determining not to use the detour path, the bypass notification determination section 1001 sends a control signal for instructing the input buffer 604 of the transmission timing. Based on the control signal, the input buffer 604 adjusts the timing of transmitting the flit (S1304).

Figure 17B:
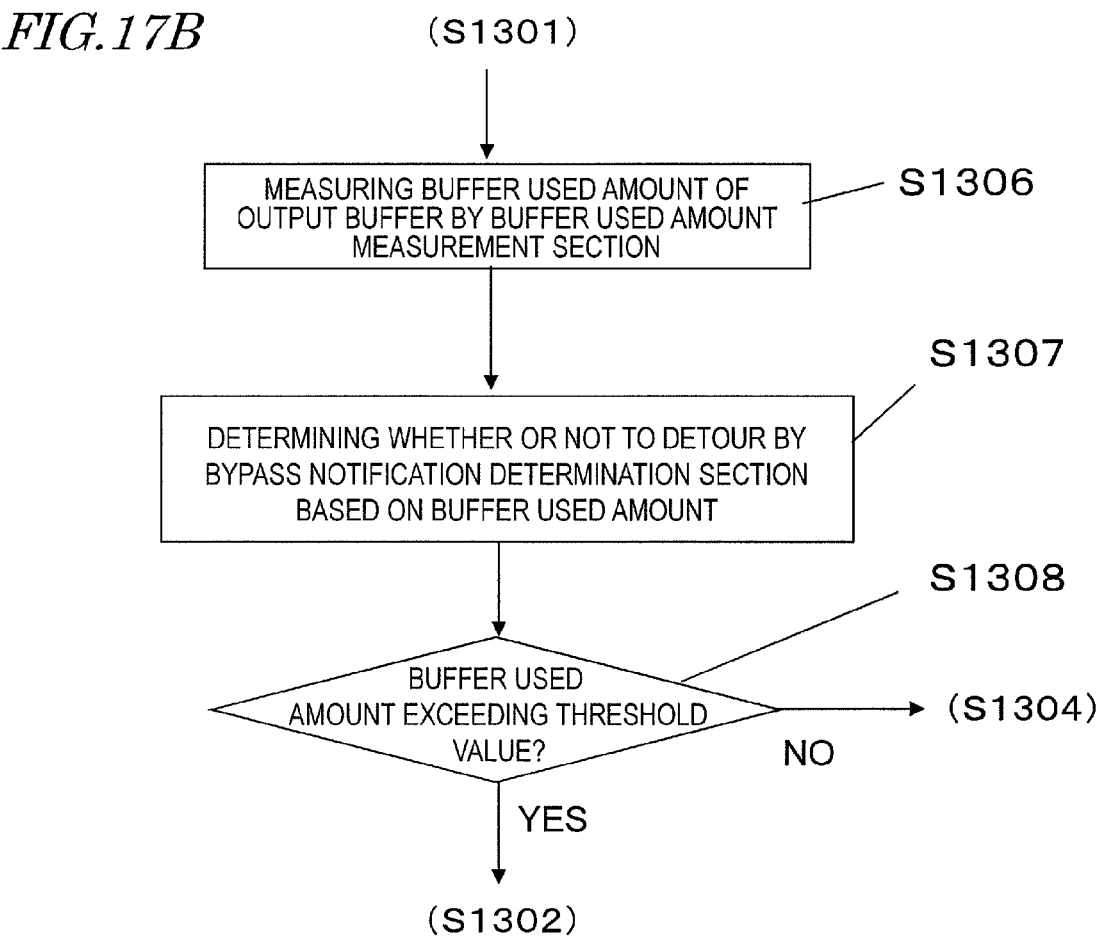
FIG. 17B is a flowchart showing a process of determining whether or not to switch the path in the first embodiment.

The determination on whether or not to use the detour path (S1305) is made by, for example, a procedure shown in FIG. 17B. First, the buffer used amount measurement section 1002 measures the buffer used amount of the output buffer 606 (S1306). Next, the bypass notification determination section 1001 determines whether or not to detour the traffic based on the measured used amount of the output buffer 606 (buffer used amount) (S1307). Specifically, where the unit time is 10,000 cycle, when the free capacity of the buffer is large (e.g., when the free capacity of the output buffer 606 is equal to or larger than ½ of the physical capacity), the bypass notification determination section 1001 determines that the influence of traffic interference is not strong, and adjusts the transmission timing without changing the path. At this point, the bypass notification determination section 1001 instructs the input buffer 604 to increase the transmission interval of the traffics not to be bypassed from the input buffer 604. As a result, the transmission interval of the traffics which are output from the crossbar switch 605 and the output port 617 is increased, and thus the transmission flow rate of the traffics is suppressed.

By contrast, when the free capacity of the buffer is small (e.g., when the free capacity of the output buffer is smaller than ½ of the physical capacity), the bypass notification determination section 1001 determines that the influence of traffic interference is strong. In order to suppress the influence of traffic interference immediately, the bypass notification determination section 1001 instructs the routing processing section 607 to search for a detour path. When the routing processing section 607 finds a detour path, the buffer allocator 608 and the switch allocator 609 execute a transfer process based on the detour path. As a result, the transmission path of the traffic not to be bypassed is changed, and thus the traffic interference can be prevented.

The above-described determinations are merely exemplary, and the method of determination may be appropriately designed in accordance with the assumed transfer delay. For example, the following configuration may be adopted: when the free capacity of the output buffer is equal to or larger than ⅔ of the physical capacity, no process is performed; when the free capacity of the output buffer is equal to or larger than ⅓ and smaller than ⅔ of the physical capacity, the flow rate is adjusted; and when the free capacity of the output buffer is smaller than ⅓ of the physical capacity, the path is changed. In the above description, the expression "free capacity" of the buffer is used. Alternatively, the "used amount" of the buffer may be used. Since the used amount of the buffer per unit time is measured, the determination is considered to be made based on the "throughput" or "transfer efficiency". The specifics of the process are substantially the same whichever of these terms may be used.

The wait time at the output buffer 606 may be measured, instead of the used amount of the output buffer 606, and the measurement result may be used to perform substantially the same control as above. When the buffer capacity is small, it may be easier to reflect the jamming state at the router by making an evaluation based on the wait time than based on the used amount.

For example, the control may be performed as follows based on the wait time at the buffer: when the wait time at the buffer is shorter than 10 cycles, no process is performed; When the wait time at the buffer is equal to or longer than 10 cycles and shorter than 50 cycles, the flow rate is adjusted; and when the wait time at the buffer is equal to or longer than 50 cycles, the path is changed. The wait time at the buffer can be measured by, for example, starting counting the time when the router of interest receives the header flit 504 and resetting the counting after the tail flit 506 is transmitted to the router as the destination. In order to simplify the process, the wait time may be counted only for high priority traffics.

As described above, in this embodiment, the buffer selection section 603 controls the output of the crossbar switch 605, such that at least one of the transmission path and the transmission flow rate of the non-bypass traffics is changed based on the transmission state of the router of interest. The present disclosure is not limited to this example, and is applicable to any configuration in which the transfer control on the non-bypass traffics is performed based on the transmission state of the router at which bypass traffics and non-bypass traffics are joined together as described above. Herein, the term "transmission state" refers to the free capacity, used amount, wait time, throughput, transfer efficiency or the like of a buffer, as described above. Alternatively, the transfer amount of the bypass traffics may be measured, so that the above-described control on the non-bypass traffics is performed based on the transfer amount.

The difference between the effect provided by switching the path and the effect provided by adjusting the transmission timing is as follows. When the path is switched, a delay is caused due to the switch of the path, but the influence of traffic interference between the traffic to be bypassed and the traffic not to be bypassed can be suppressed. By contrast, when the transmission timing is adjusted, the delay due to the switch of the path is not caused, but the influence of traffic interference between the traffic to be bypassed and the traffic not to be bypassed may be exerted. However, even when the detour path is used, traffic interference on the post-switch path may become a problem.

According to this embodiment, the influence of traffic interference between the bypass traffic and the non-bypass traffic can be appropriately suppressed in consideration of the risk caused by switching the path (delay due to the switch, traffic interference on the post-switch path). In the case where the measure of switching the path is adopted, the transfer load on the post-switch path may be measured in advance so that the path can be switched only when the transfer load is small. In this manner, generation of the traffic interference on the post-switch path can be suppressed more effectively. Instead of performing either the process of switching the path or the process of adjusting the flow rate, both of the processes may be used. For example, when the transfer load on the post-switch path is large, the transmission flow rate may be adjusted to be decreased after the path is switched.

In the above description, an example in which the path is switched to a detour having the same receiving node (e.g., memory on which the data is to be written) as the pre-switch path is described. Alternatively, the receiving node may be changed as well as the transmission path. For example, the system may be configured such that the router which performed a bypass process notifies the transmission node that the bypass process was performed, and the transmission node which received the notification selects a new receiving node. The switching of the path or the adjustment of the flow rate may be performed only for a traffic which is to be input to the router that is currently performing the bypass process. In other words, the traffic which is not to be input to the router that is currently performing the bypass process may be excluded from the target of the path switch. Alternatively, the transmission node may change the path or the destination, such that the traffic which is to pass the router that is currently performing the bypass process can avoid the path on which the bypass process is being performed.

Figure 18A:
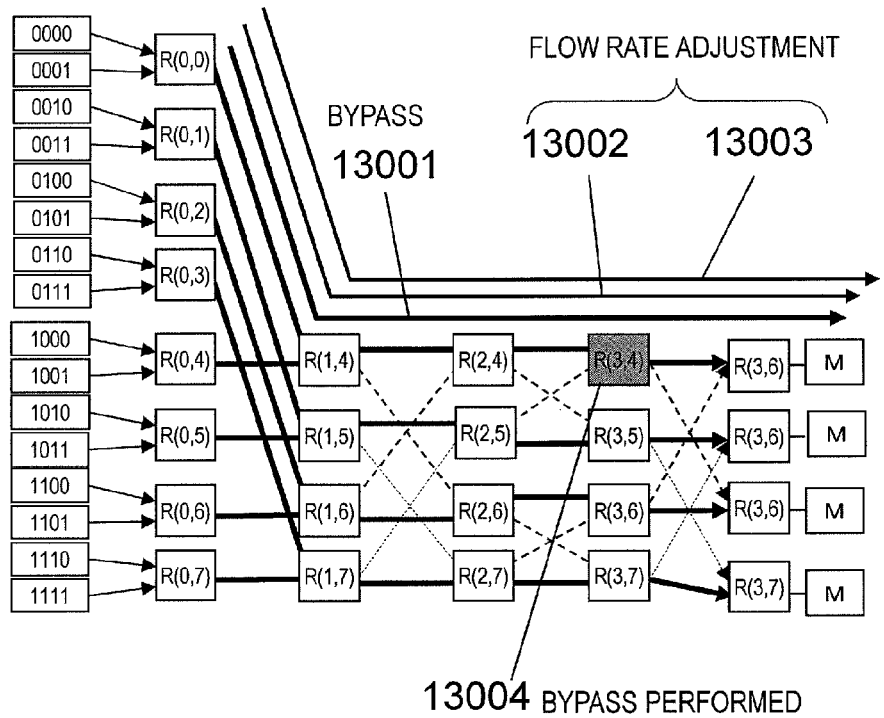
FIG. 18A shows a first example of process performed by the router on a traffic not to be bypassed in the first embodiment.
Figure 18B:
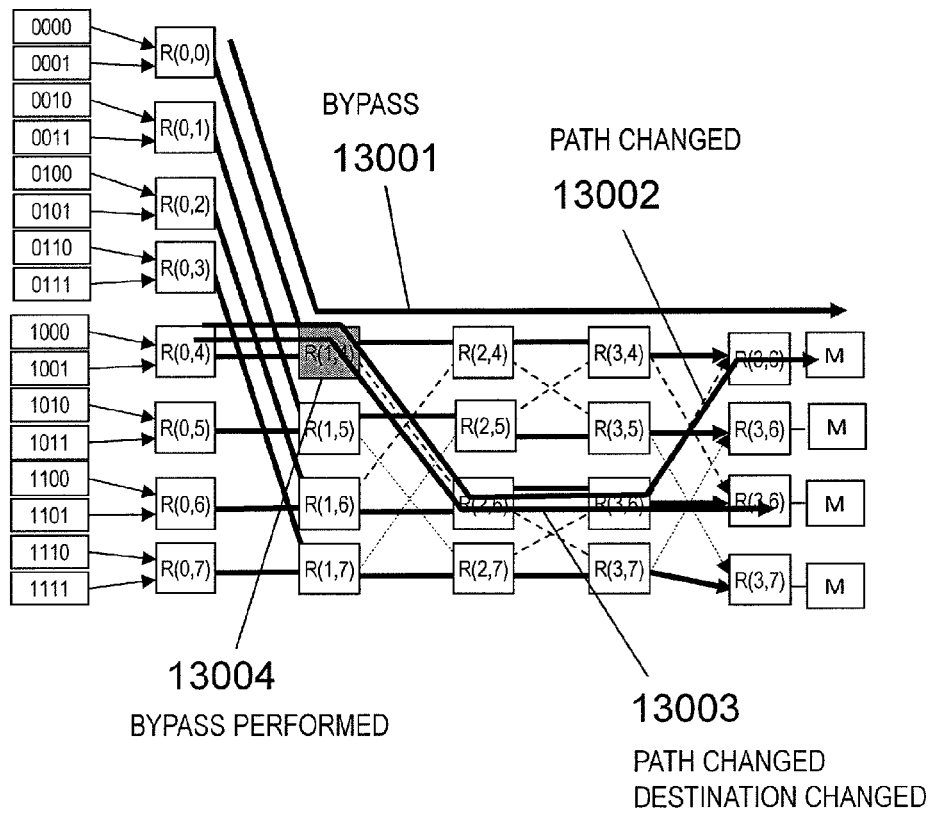
FIG. 18B shows a second example of process performed by the router on a traffic not to be bypassed in the first embodiment.

FIG. 18A and FIG. 18B show specific examples of adjustment of the transmission flow rate, detouring and changing of the destination. FIG. 18A shows an example in which while traffics 13001 through 13003 are transferred from one bus master to one memory, a router 13004 which performed a bypass process suppresses the transmission flow rate. When the traffic 13001 is to be bypassed by the router 13004, the flow rates from the output buffer 606 in the router 13004 of the traffics 13002 and 13003 not to be bypassed are suppressed. In this example, it is preconditioned that the destination has a capability of receiving the traffics transferred at the same time from two paths. Therefore, even when the traffics are transferred at the same time from the two paths, the destination is not jammed.

FIG. 18B shows an example in which while the traffics 13001 through 13003 are transferred from a plurality of different bus masters to one memory, the router 13004 which performed a bypass process performs a detour or changes the destination (memory). When the traffic 13001 is bypassed by the router 13004, the paths of the traffics 13002 and 13003 not to be bypassed are changed. Regarding the traffic 13003, the destination thereof, i.e., the memory, is also changed. For changing the destination, the router which performed the bypass process inquires of the bus master as the source regarding the new destination, and reflects the result to change the destination. The criterion based on which the router 13004, which performed the bypass process, determines which of the path change, flow rate adjustment and change of the destination is to be performed may be determined for each router at the time of designing.

As described above, a router 600 in this embodiment performs the bypass notification process and transfer control on a non-bypass traffic, and thus can decrease the traffic jam caused by the bypass process. In this embodiment, both of the bypass notification process and the transfer control on a non-bypass traffic are performed. Alternatively, the router may be configured to perform either one of the bypass notification process and the transfer control on a non-bypass traffic. Even such a configuration can provide a certain degree of effect.

In the above description, the elements of the router 600 are each represented as an individual functional block. Alternatively, the operation of the router 600 may be realized by execution of a program defining the processes of these functional blocks by use of a processor (computer) mounted on the router 600. A processing procedure of such a program is as shown in the flowcharts in, for example, FIGS. 7, 8, 9A, 9B, 14, 17A and 17B.

<6. Modifications>

<6.1. Configuration with No Output Buffer>

Figure 19A:
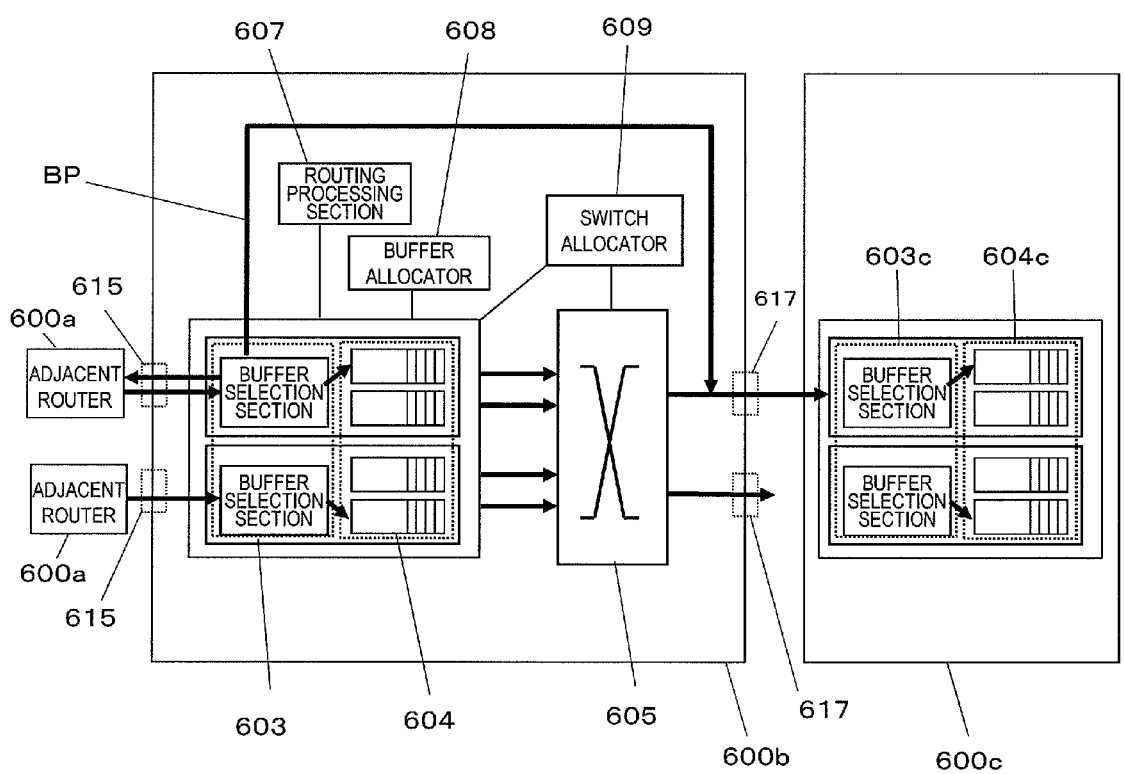
FIG. 19A shows an example of configuration of a router with no output buffer.

In the configuration shown in FIG. 5A, the router 600b includes the output buffers 606. As described above, the router does not need to include any output buffer 606. FIG. 19A shows an example of configuration of the router 600b which does not include any output buffer 606. In this router 600b, the output of the crossbar switch 605 is input to a buffer selection section 603c of the adjacent router 600c on the subsequent stage. Such a configuration can suppress the memory capacity and thus is effective when the data transfer system is incorporated into a specific apparatus.

When no output buffer 606 is provided, the above-described transfer control may be performed based on the use state of the input buffer in the adjacent router 600c on the subsequent stage. For example, at least one of the used amount of, and the wait time at, the input buffer in the adjacent router 600c on the subsequent stage is measured by the buffer used amount measurement section 1002, and the router 600b can determine whether to change the path or to adjust the flow rate based on the measured value.

<6.2. External Wiring>

Figure 19B:
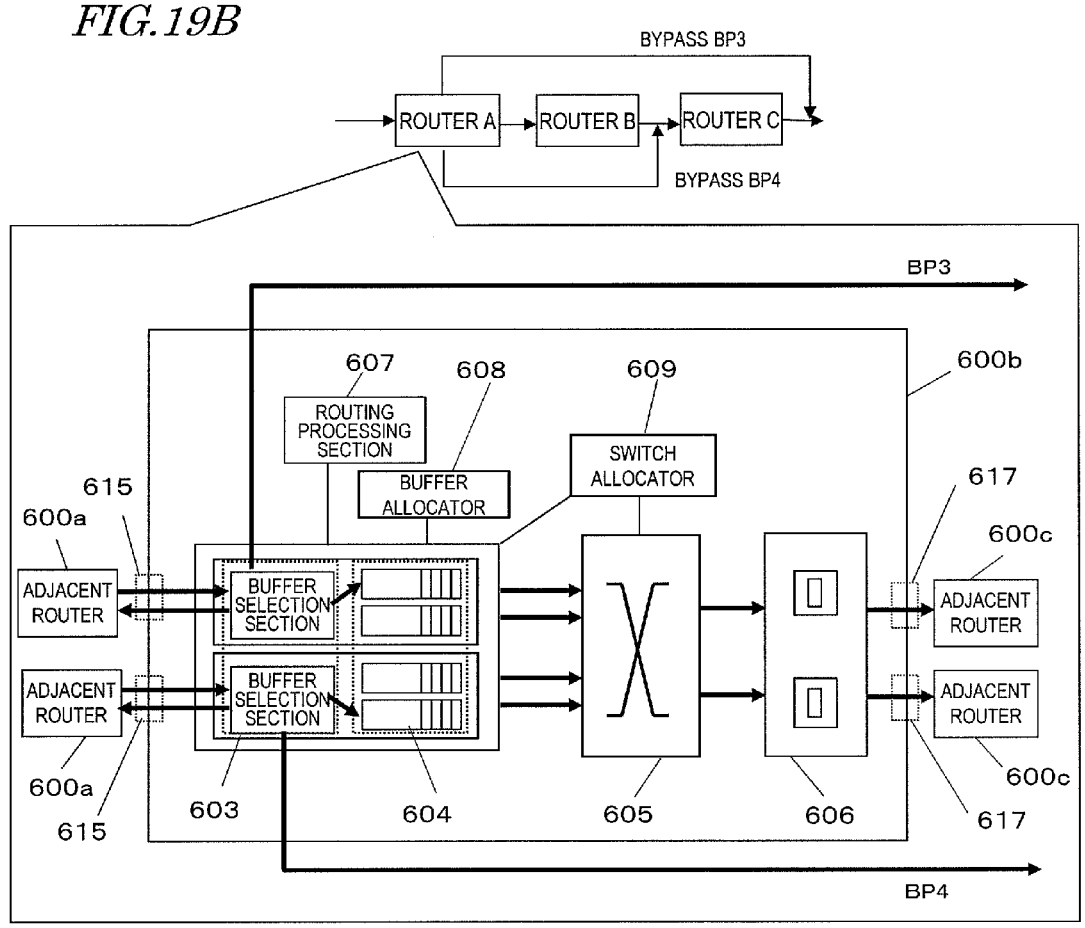
FIG. 19B shows an example of configuration of a router for performing a bypass process by use of external lines.

In the above description, as shown in FIG. 5A, an example in which the bypass process is performed in the router 600b (internal wiring) is described. Lines may be provided so as to transfer the bypass traffic to the outside of the router 600b (external wiring). FIG. 19B shows an example of configuration in which the lines are provided outside the router 600b for performing a bypass process. In this example, the buffer selection section 603 transfers a traffic to routers external to the router 600b or to the memory 105 by a bypass path BP4 and BP3.

According to the configuration using the internal wiring, the bypass process is closed for each router. Therefore, the router is highly reusable as a processing module. Namely, each individual router can be replaced as one component. However, since the data needs to pass all the routers up to the destination, overhead of the process is likely to occur. By contrast, according to the configuration using the external wiring, the router is not as highly reusable as a processing module as in the case of the internal wiring. However, since the data does not need to pass all the routers up to the destination, overhead of the process can be decreased.

FIG. 20 shows a specific application example in which a bypass process is performed by use of external wiring. FIG. 20 shows an example of mesh network architecture shown in FIG. 12(b). As shown in FIG. 20(b), a case where a new bus master 101a is connected to the network for expanding the functionality will be discussed. In addition, a case where a new bypass path BP is added will be discussed (FIG. 20(b)). The new bypass path BP is added in order to decrease the number of routers that the data passes, in consideration of the problem of time delay caused in a path from the bus master 101a to the memory 105a.

A bypass traffic generated from the bus master 101a is transferred with the flag in the header flit being valid, so as to be identifiable as being bypassed. The router R7, which received the bypassed traffic, transmits a message of bypass notification to the adjacent routers R4 and R8 in order to cause these adjacent routers to suppress the amount of flow transferred to the memory 105a, to which the bus master 101a that performed bypassing is to access. The adjacent routers R4 and R8, which received the bypass notification, read the notification range described in the message, and transfer the message to the other routers and/or bus masters when necessary.

The routers or bus masters which received the bypass notification can suppress the access to the target memory 105a by performing control of, for example, changing the transmission amount or switching the memory as the destination. In this manner, use of a bypass notification allows the bus master 101a, which permits a short time delay, to be added to the existing network in a simple manner.

Figure 21A:
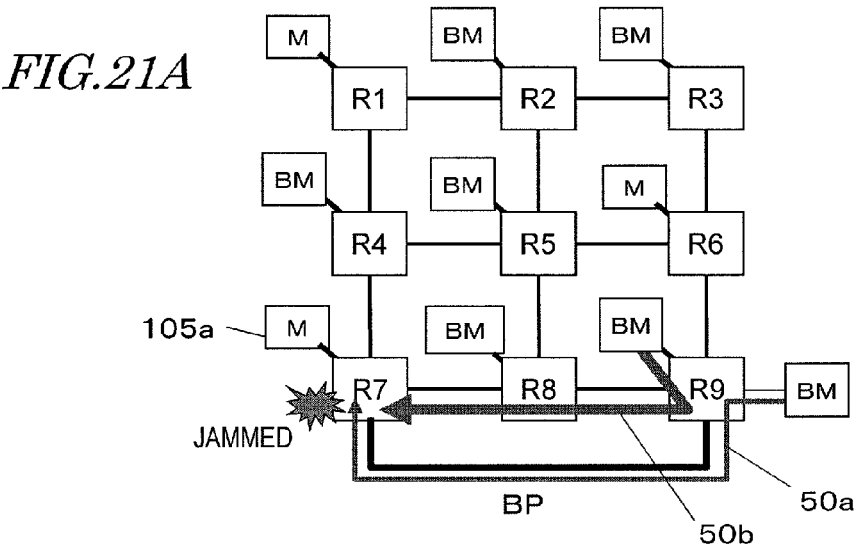
FIG. 21A shows that a jam is caused by a bypass path.
Figure 21B:
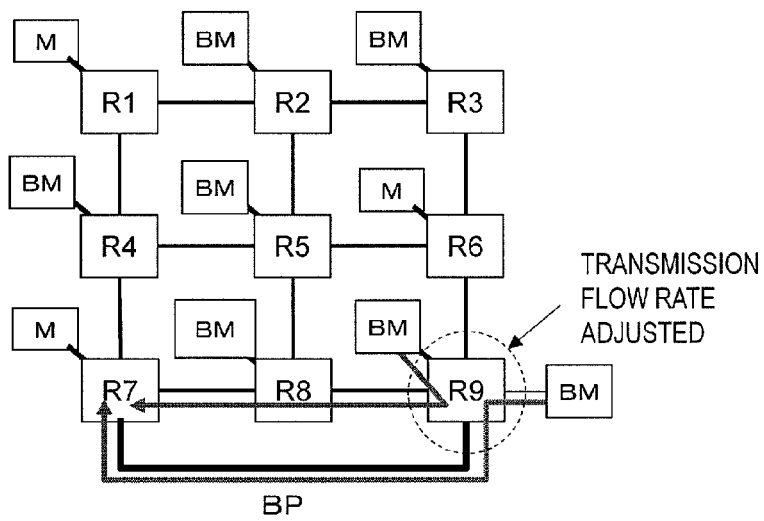
FIG. 21B shows that the problem caused by the bypass path can be solved by adjusting the transmission flow rate.
Figure 21C:
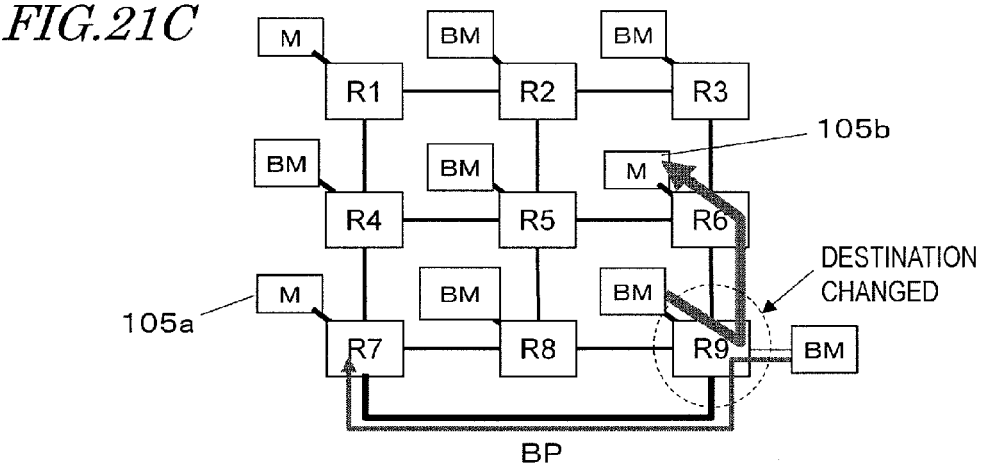
FIG. 21C shows that the problem caused by the bypass path can be solved by changing the destination.

In addition, a router in this embodiment can, for example, adjust the flow rate, or the change the path, of a non-bypass traffic in accordance with the use state of a buffer. Therefore, a higher performance can be realized. FIG. 21A through FIG. 21C show a problem caused by providing a bypass line between routers and an effect provided by using a router in this embodiment. FIG. 21A shows a problem caused by the bypass line. When a bypass traffic 50a and a non-bypass traffic 50b are transferred to the same destination (memory 105a), the router R7 as the transfer destination may be short of the bus band and jammed. Thus, in this embodiment, the transmission amount or the destination of the non-bypass traffic is adjusted in advance based on the free capacity of, or the wait time at, the buffer in the router R9 as the source. When it is determined that the jam can be avoided by the adjustment of the transmission amount, as shown in FIG. 21B, the router R9 adjusts the transmission amount of the non-bypass traffic. When it is determined that the jam can be avoided by the change of the memory as the destination, as shown in FIG. 21C, the router R9 changes the destination from the memory 105a to a memory 105b. Such a process allows the traffic to be transferred with a high throughput and a low transfer delay.

As described above, according to this embodiment, when data not to be bypassed is to be transferred to the same destination as that for bypass data by the router at which the non-bypass traffic and the bypass traffic are to be joined together (in the example shown in FIG. 1A, the routers R7 and R9; and in the example shown in FIG. 1B, the router R7), the transmission amount is adjusted or the path is changed based on the transmission state of the router at which the traffics are to be joined together. Therefore, the jam which might have otherwise been caused on the path leading to the destination can be avoided in advance.

The bypass process may be performed in the router, or between the routers. Especially, if a router at which a non-bypass traffic and the bypass traffic directed toward the same destination are to be joined toger is configured to graps the transmission state including the transfer amount of the data to be bypassed of the router, the jamming state of the path up to the destination can be predicted more accurately, and therefore the jam can be avoided in advance. In the case where data to be bypassed and data not to be bypassed which are output from the same router have different destinations, the jam by competition of the data does not occur. Therefore, it is not necessary to adjust the transmission amount, or to change the path, of the data not to be bypassed.

According to the configuration in this embodiment, the jam which might have otherwise been caused on the path leading to the destination can be avoided in advance. Thus, the traffic can be transferred with a high throughput and a low transfer delay.

<6.3. Other Topologies>

Figure 22A:
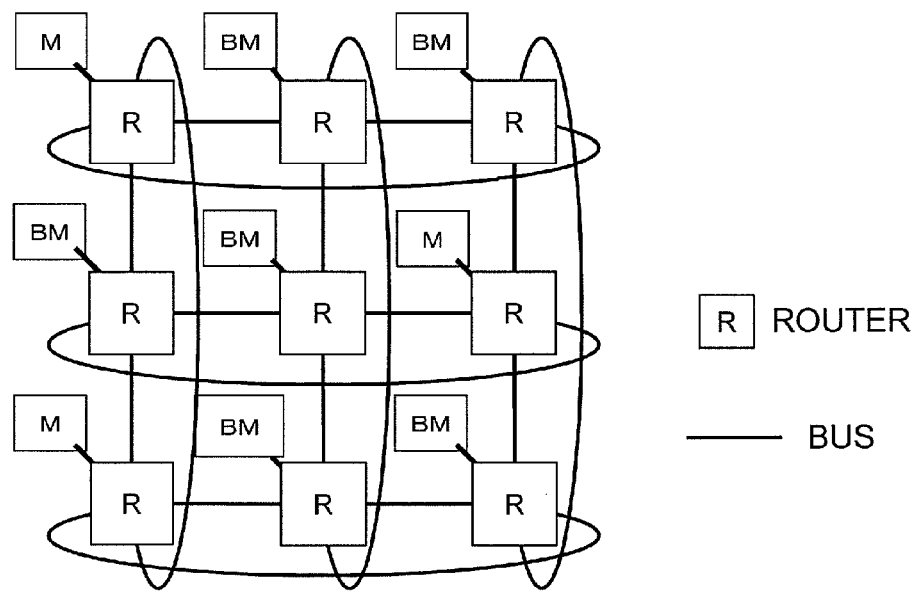
FIG. 22A shows an example of Taurus-type topology in which a plurality of bus masters are connected via distributed buses.
Figure 22B:
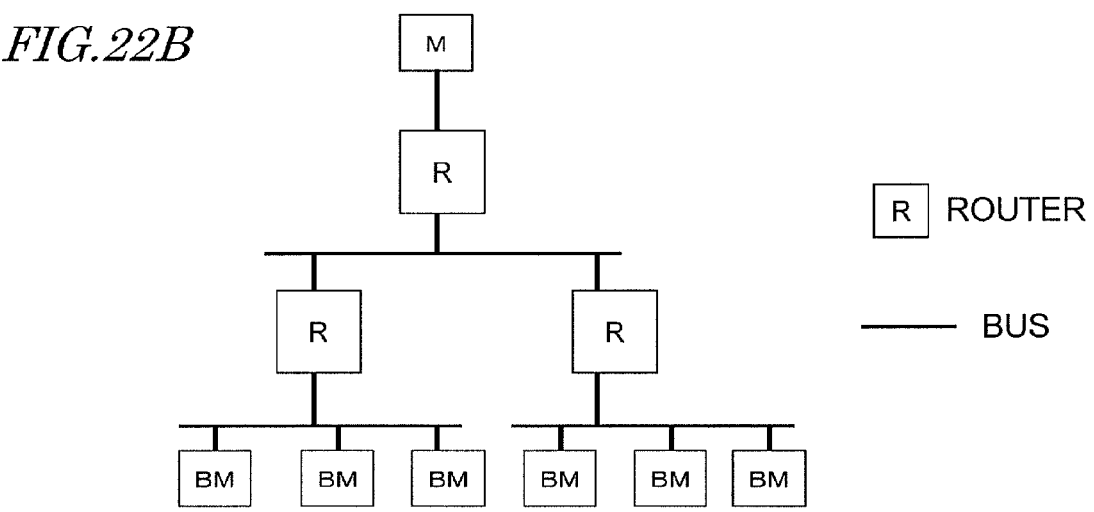
FIG. 22B shows an example of hierarchical topology in which a plurality of bus masters are connected via distributed buses.

In the above description, the topology of the integrated circuit is a multistage interconnection network (FIG. 3, FIG. 11) or a mesh network (FIG. 20). A router 600 in this embodiment is not limited to being used in a multistage interconnection network or a mesh network. For example, as shown in FIG. 22A, the router 600 in this embodiment is usable in a Taurus-type topology in which routers are arranged in a lattice and end routers are connected to each other. Alternatively, as shown in FIG. 22B, the router 600 in this embodiment is usable in a topology in which buses are connected in a hierarchical manner. A router in this embodiment is usable in any topology in which a plurality of bus masters are connected via distributed buses, as well as in the above-described topologies.

(Embodiment 2)

Now, a router according to a second embodiment of the present disclosure will be described.

In the first embodiment, the bypass lines are provided in a router or between routers. In this embodiment, the routers are not provided with bypass lines. In the following description, a traffic corresponding to the bypass traffic in the first embodiment will be referred to as a "high priority traffic", and a traffic corresponding to the non-bypass traffic in the first embodiment will be referred to as a "low priority traffic". The "high priority traffic" is a traffic required to be transferred with low latency such as, for example, video data or audio data, or a traffic having a high emergency level such as information representing a command issued by the user or notifying system abnormality. The "low priority traffic" is a traffic having a low emergency level such as, for example, data on file transfer or data of an application to be processed in the background. Whether a traffic is a high priority traffic or a low priority traffic may be defined by an identifier described in the header flit and representing the priority level. In this specification, transferring a high priority traffic with priority is also encompassed in "bypassing". Hereinafter, a router in this embodiment will be described mainly regarding differences from the router in the first embodiment. Overlapping points with those of the router in the first embodiment will be omitted.

A router in this embodiment can change the transmission path, or adjust the transmission flow rate, of a low priority traffic in accordance with the transmission state (use state of the buffer, etc.) of a router at which high priority traffics and low priority traffics are joined together, while continuously transferring high priority traffics. Owing to this, the interference between the high priority traffics and the low priority traffics can be suppressed, and thus improvement of the throughput and the low latency transfer are expected.

Hereinafter, an example of configuration of a router in this embodiment will be described.

Figure 23:
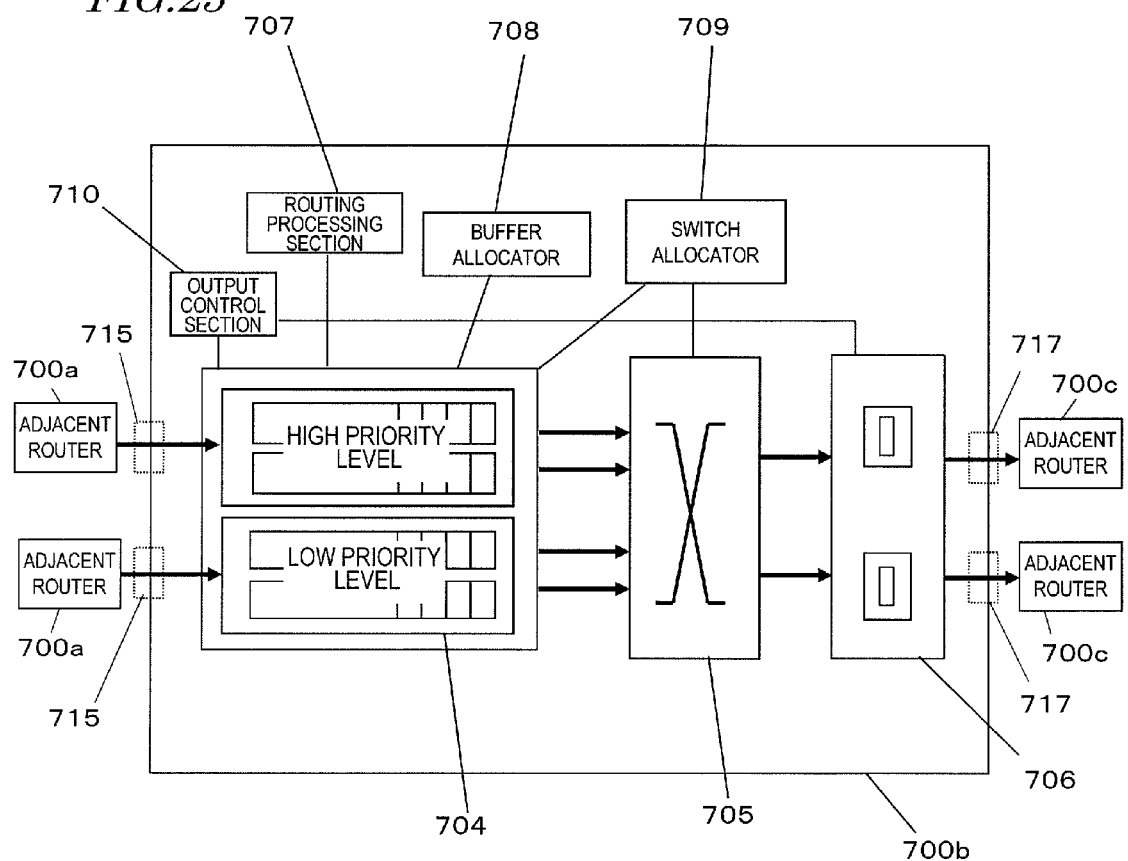
FIG. 23 shows a configuration of a router in a second embodiment.

FIG. 23 shows a schematic configuration of a router 700b in this embodiment. The router 700b determines the destination of a traffic from each of adjacent routers 700a on the previous stage, namely, to which of routers 700c on the subsequent stage the traffic is to be transferred. Thus, the router 700b routes the traffic. A routing processing section 707 in the router 700b receives a flit transferred from one of the adjacent routers 700a on the previous stage and determines output port 717 as the transfer destination based on destination information described in the flit. An algorithm for routing may be dimension-order routing by which the destination is determined dynamically or static routing by which the destination is determined uniquely at the time of designing based on the relationship between the source and the destination, as in the first embodiment. A router in this embodiment are not limited to using any specific routing algorithm.

The router 700b includes a buffer allocator 708 for defining a correspondence between the output ports 717 and buffer queues of output buffers 706. The router 700b also includes a switch allocator 709 for selecting one set of output port and buffer queue from sets of the output ports 717 and the buffer queues of the output buffers 706, the correspondence of which has been defined, in order to transfer traffic. The router 700b transfers the flit to the output buffer 706 via a switch 705. Then, the flit is transferred from the output buffer 706 to the corresponding router. In this embodiment, the output buffers 706 are provided. However, the output buffers 706 may not be provided. In the case where no output buffer 706 is provided, the input buffers of the adjacent router 700c on the subsequent stage may be used as the output buffers 706.

One of features of the router 700b in this embodiment is including an output control section 710 for, while continuously transferring high priority traffics, performing transfer control on a low priority traffic directed toward the same destination as that for the high priority traffics. The output control section 710 performs a process of determining the priority level of the received traffic and thus transfers a high priority traffic with priority over a low priority traffic. In this manner, the output control section 710 in this embodiment also acts as a bypass control section according to the present disclosure. The output control section 710 includes a buffer measurement section (not shown), and performs transfer control on the low priority traffic in accordance with the use state of the output buffer 706 (or the input buffer in the adjacent router 700c on the subsequent stage). Specifically, the output control section 710 performs control of changing at least one of the transmission path and the transmission flow rate of the data based on the free capacity of, or the wait time at, the output buffer 706.

The input buffers 704 and the output buffers 706 each include a plurality of buffer queues. Such a buffer queue may be formed of a virtual channel. In this embodiment, there are two types of buffer queues, namely, buffer queues for the high priority level and buffer queues for the low priority level. The output control section 710 interprets the received header flit to determine the priority level of the received data and specifies a buffer queue to store the data.

Figures 24A, 24B:
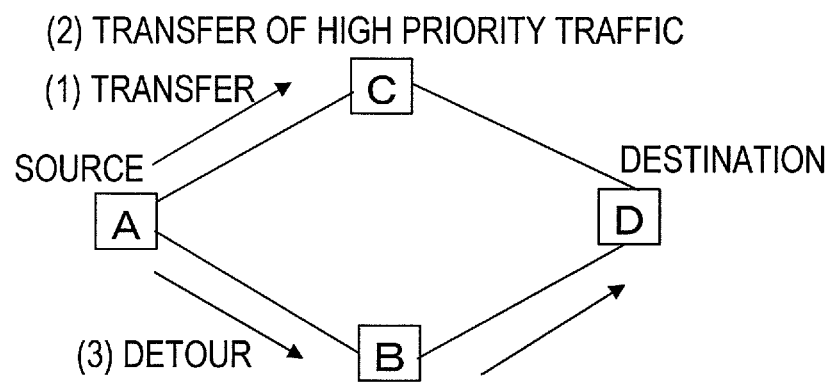
FIG. 24A shows an example of operation of the router by a simple network model in the second embodiment.
FIG. 24B shows an example of path information regarding routers.

FIG. 24A and FIG. 24B show a process performed by a router in this embodiment. FIG. 24A shows how the router in this embodiment changes the transmission path of a low priority traffic, based on a simple network model. First, it is assumed that when router A, which is a source, transfers a high priority traffic and a low priority traffic to router D, which is a destination, via router C ((1) transfer). Upon transferring the high priority traffic ((2) transfer of the high priority traffic), router A changes the transmission path of the low priority traffic to the path passing router B ((3) detour) in order to suppress the interference between the traffics.

FIG. 24B shows an example of path information managed by the routing processing section of router A. In the example shown here, transmission paths from router A as the source to the other routers (B, C and D) are described. Router A determines the path based on such path information. In this embodiment, substantially the same path information is managed by the routing processing section in the other routers.

In the example shown in FIG. 24A, router A changes the path of the low priority traffic. Router A may take a measure of adjusting the transmission flow rate instead of changing the path as described above. In this embodiment, the output control section 710 determines whether to change the path or to adjust the transmission flow rate based on the use state of the output buffer 706 (or the input buffer in the adjacent router 700c).

FIG. 25A is a flowchart showing an operation performed by router A on a low priority traffic. First, it is assumed that during the transfer of a traffic, a high priority traffic is generated on the transmission path (S2301). Whether or not a high priority traffic is being transferred is determined based on whether or not the value of an identifier described in the header flit and representing the priority level exceeds a prescribed threshold value. The output control section 710 determines whether or not to switch the path (to use a detour path) or to adjust the transmission flow rate of the low priority traffic by a method described later (S2305). When determining to switch the path, the output control section 710 sends a control signal for instructing the routing processing section 707 to switch the path. Upon receiving the control signal, the routing processing section 707 selects a detour path (path of A→B→D), and determines the output port corresponding to the detour path (S2302). Next, the buffer allocator 708 and the switch allocator 709 perform a transfer process, and the transfer is executed by use of the detour path ((3) detour) (S2303). By contrast, when determining not to use the detour path, the output control section 710 sends a control signal for instructing the input buffer 704 of the transmission timing. Based on the control signal, the input buffer 704 adjusts the timing of transmitting the flit (S2304).

Figure 25B:
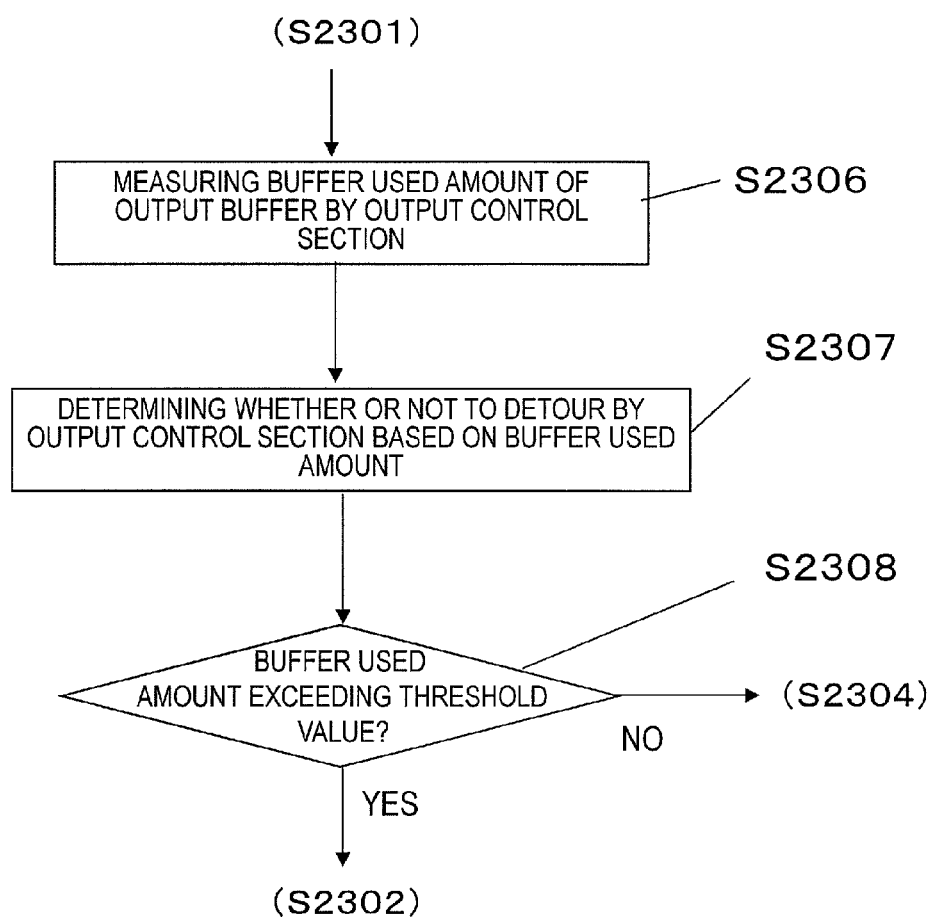
FIG. 25B shows a process of determining whether or not to switch the path in the second embodiment.

The determination on whether or not to use the detour path (S2305) is made by, for example, a procedure shown in FIG. 25B. First, the output control section 710 measures the buffer used amount of the output buffer 706 (S2306). Next, the output control section 710 determines whether or not to detour the traffic based on the measured used amount of the output buffer 706 (buffer used amount) (S2307). Specifically, where the unit time is 10,000 cycle, when the buffer used amount is small (e.g., when the free capacity of the output buffer 706 is equal to or larger than ½ of the physical capacity), the output control section 710 determines that the influence of traffic interference is not strong, and adjusts the transmission timing without changing the path. At this point, the output control section 710 instructs the input buffer 704 to increase the transmission interval of the low priority traffics from the input buffer 704. As a result, the transmission flow rate of the traffics which are output from the switch 705 and the output port 717 is suppressed.

By contrast, when the buffer used amount is large (e.g., when the free capacity of the output buffer is smaller than ½ of the physical capacity), the output control section 710 determines that the influence of traffic interference is strong. In order to suppress the influence of traffic interference immediately, the output control section 710 instructs the routing processing section 707 to search for a detour path. When the routing processing section 707 finds a detour path, the buffer allocator 708 and the switch allocator 709 execute a transfer process based on the detour path. As a result, the transmission path of the traffic not to be bypassed is changed, and thus the traffic interference can be prevented.

The above-described determinations are merely exemplary, and the above-described threshold values may be appropriately designed in accordance with the assumed transfer delay. For example, the following configuration may be adopted: when the free capacity of the output buffer is equal to or larger than ⅔ of the physical capacity, no process is performed; when the free capacity of the output buffer is equal to or larger than ⅓ and smaller than ⅔ of the physical capacity, the flow rate is adjusted; and when the free capacity of the output buffer is smaller than ⅓ of the physical capacity, the path is changed.

The wait time at the output buffer 706 may be measured, instead of the used amount of the output buffer 706, and the measurement result may be used to perform substantially the same control as above. When the buffer capacity is small, it may be easier to reflect the jamming state at the router by making an evaluation based on the wait time than based on the used amount.

In this embodiment also, when the transmission path is to be changed, the receiving node may be changed as well as the path. For example, the system may be configured such that the router which is transferring high priority traffics inquires of the bus master as the source regarding a new destination and changes the destination based on the result.

Figure 26A:
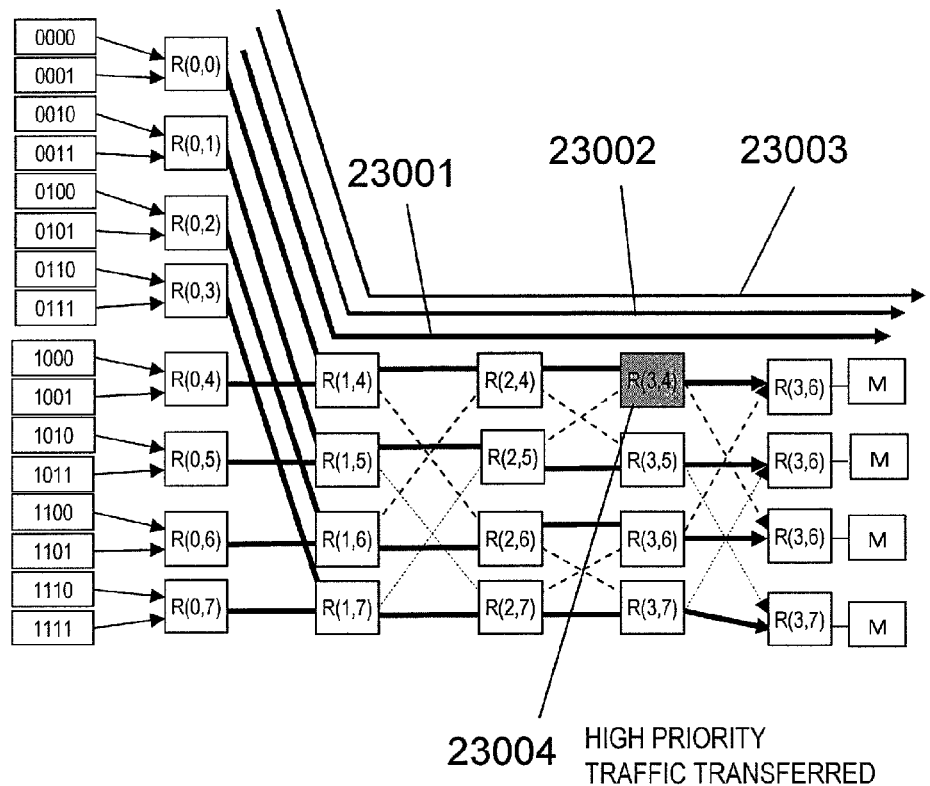
FIG. 26A shows a first example of process performed by the router on a low priority traffic in the second embodiment.
Figure 26B:
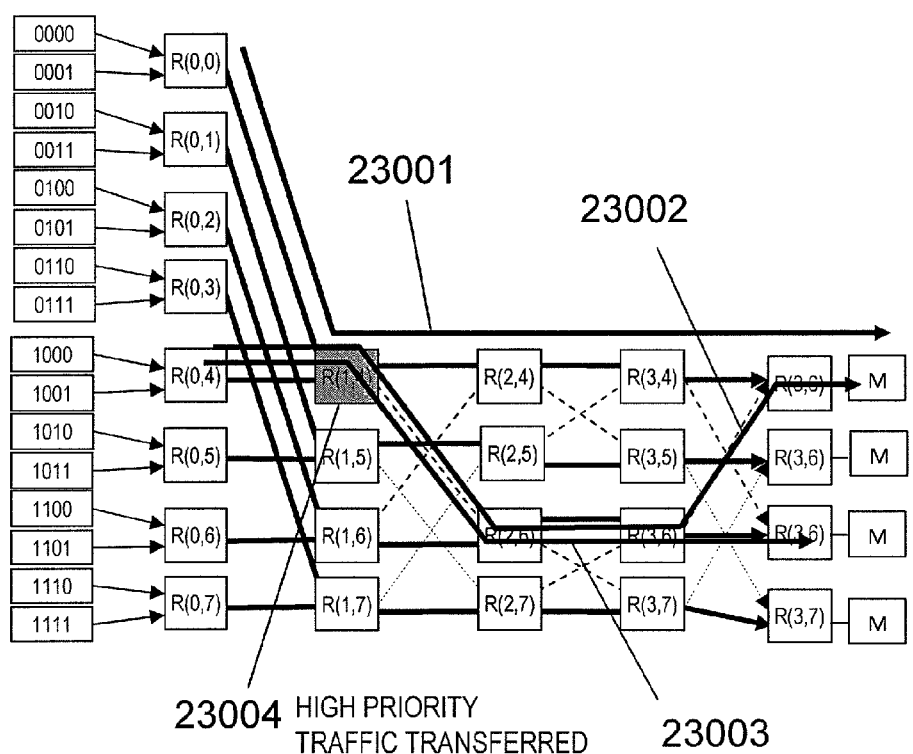
FIG. 26B shows a second example of process performed by the router on a low priority traffic in the second embodiment.

FIG. 26A and FIG. 26B show specific examples of adjustment of the transmission flow rate, detouring and changing of the destination. FIG. 26A shows an example in which while traffics 23001 through 23003 are transferred from one bus master to one memory, a router 23004 suppresses the transmission flow rate. When the traffic 23001 is a high priority traffic, the flow rates of the low priority traffics 23002 and 23003 output from the output buffer 706 in the router 23004 are suppressed.

FIG. 26B shows an example in which while the traffics 23001 through 23003 are transferred from a plurality of different bus masters to one memory, the router 23004 performs a detour or changes the destination (memory). When the traffic 23001 is a high priority traffic, the paths of the low priority traffics 23002 and 23003 are changed. Regarding the traffic 23003, the destination thereof, i.e., the memory, is also changed. For changing the destination, the router 23004 inquires of the bus master as the source regarding a new destination, and reflects the result to change the destination. The criterion based on which the router 23004 determines which of the path change, flow rate adjustment and change of the destination is to be performed may be determined for each router at the time of designing.

In this embodiment, the traffics are classified into high priority traffics and low priority traffics, and while the high priority traffics are transferred, transfer control is performed on the low priority traffics based on the transmission state of the router which is transferring the high priority traffics. However, the present disclosure is not limited to such a form, and may be applicable to any configuration in which when a bypass traffic which is to be processed with priority is transferred, based on the transmission state of the router at which the bypass traffic and a non-bypass traffic are joined together, the transmission path of a non-bypass traffic directed toward the same destination as that for the bypass traffic is changed or the transmission flow rate of such a non-bypass traffic is adjusted.

(Embodiment 3)

Now, a third embodiment according to the present disclosure will be described.

Before describing this embodiment in detail, the basic principle of this embodiment will be first described.

Figure 27:
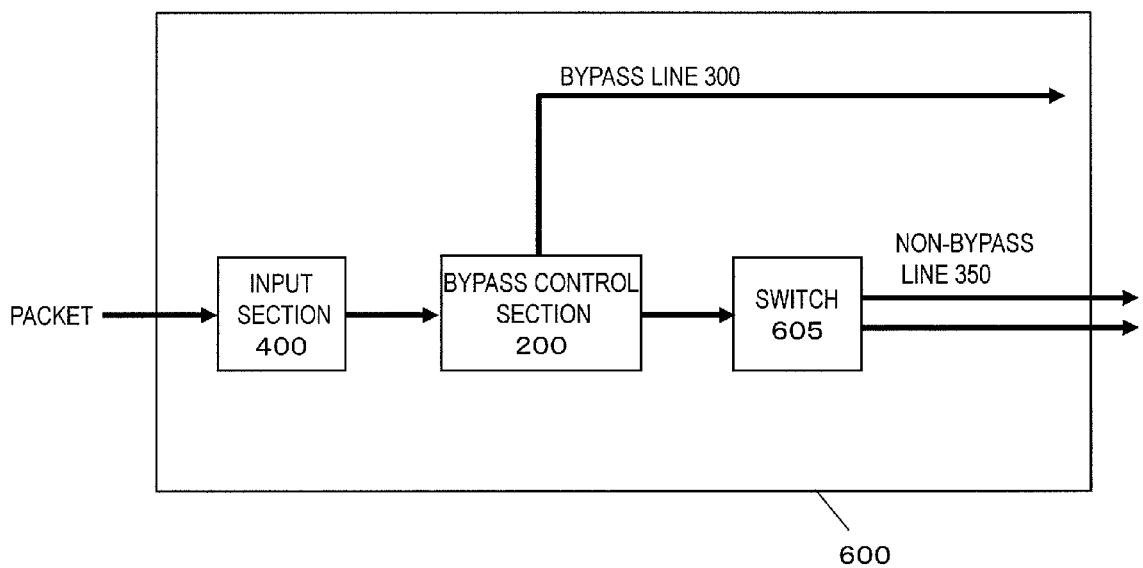
FIG. 27 is a block diagram showing a schematic configuration of a router in a third embodiment.

FIG. 27 is a block diagram showing a schematic configuration of a router 600 in this embodiment. The router 600 includes an input section 400 for receiving a packet, a bypass control section 200 for determining whether to perform a bypass process of outputting an incoming data transfer unit (packet) with priority or to perform a usual process of not outputting the incoming data transfer unit with priority, and a switch 605 for selecting a transmission path for the packet not to be bypassed from a plurality of paths. In the example shown in FIG. 27, a packet to be bypassed is output through a bypass path 300, and a packet not to be bypassed is output through a non-bypass path 350.

Figure 56:
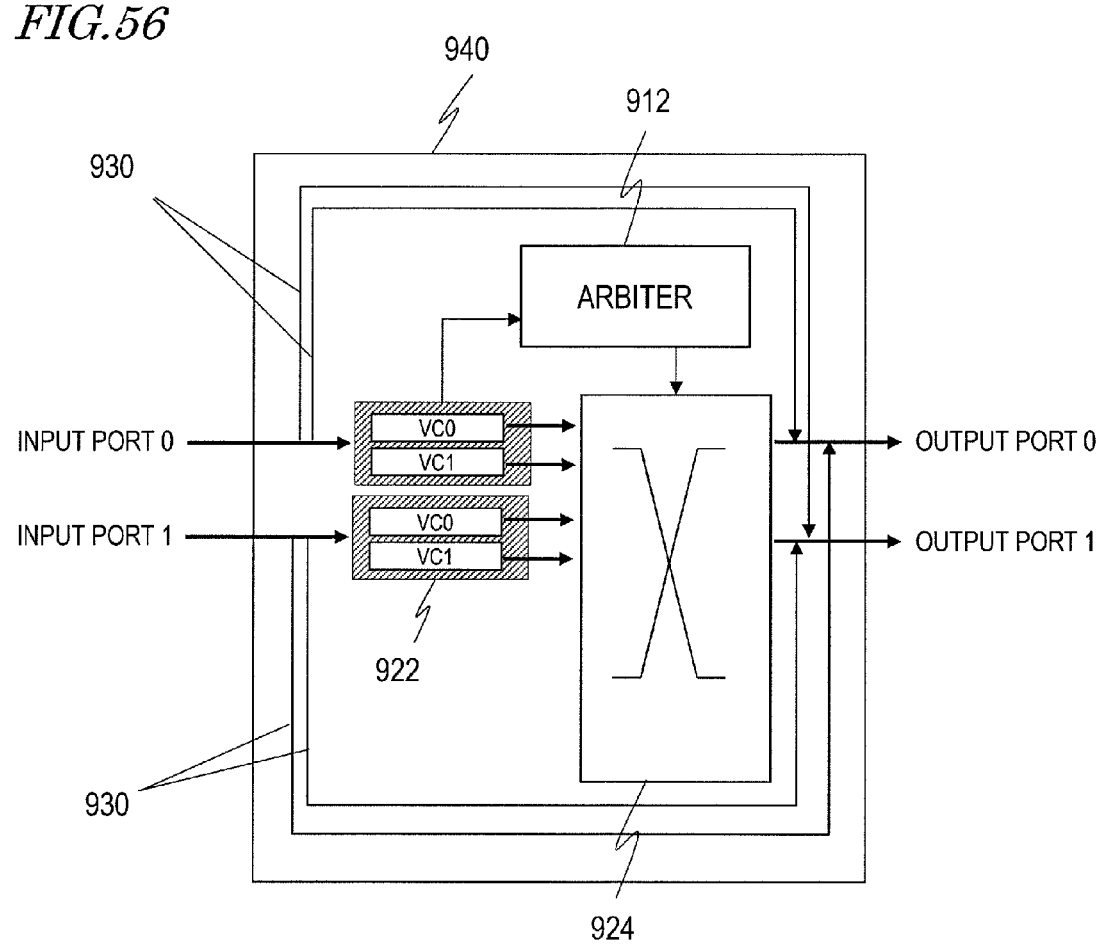
FIG. 56 shows a schematic configuration of a conventional router for performing a bypass process.

The bypass path 300 corresponds to, for example, a path passing the bypass line 930 shown in FIG. 56, and the non-bypass path 350 corresponds to, for example, a path passing the crossbar switch 924 shown in FIG. 56 through which data is output. The present disclosure is not limited to having such a configuration in which the lines are physically independent. The "bypass process" encompasses a process of suppressing a transfer delay by omitting a routing process when transferring a traffic between specific transmission and receiving nodes or by performing the routing process in parallel as disclosed in Non-patent Document 1.

Figure 28A:
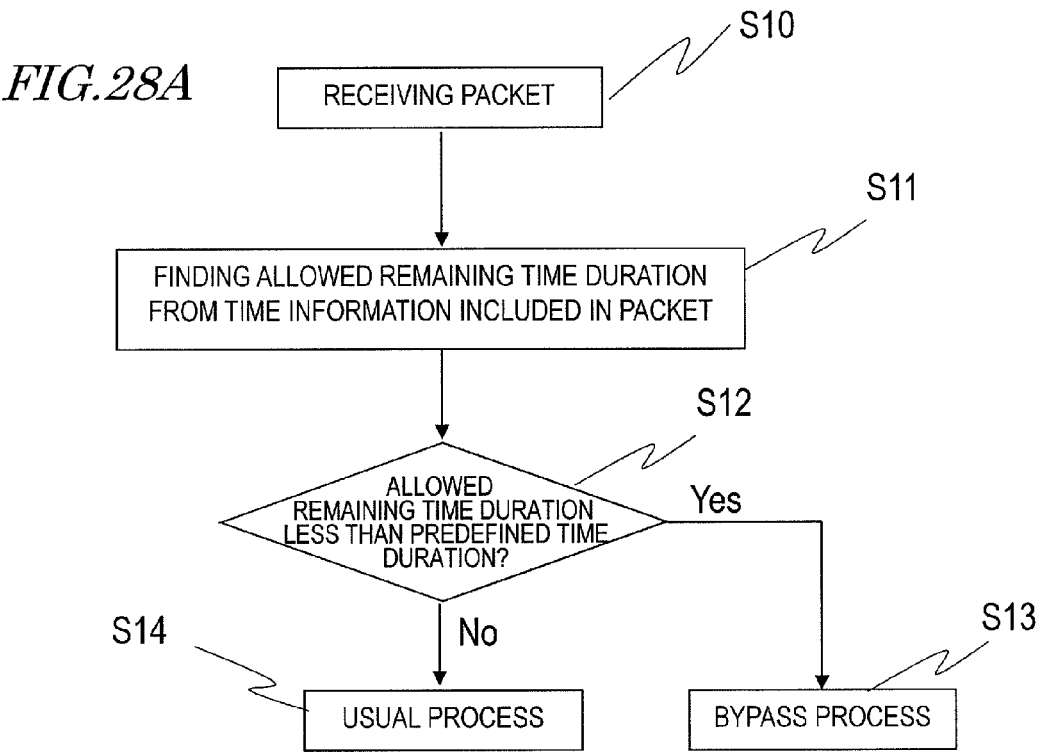
FIG. 28A is a flowchart showing an example of bypass determination process performed by a router.
Figure 28B:
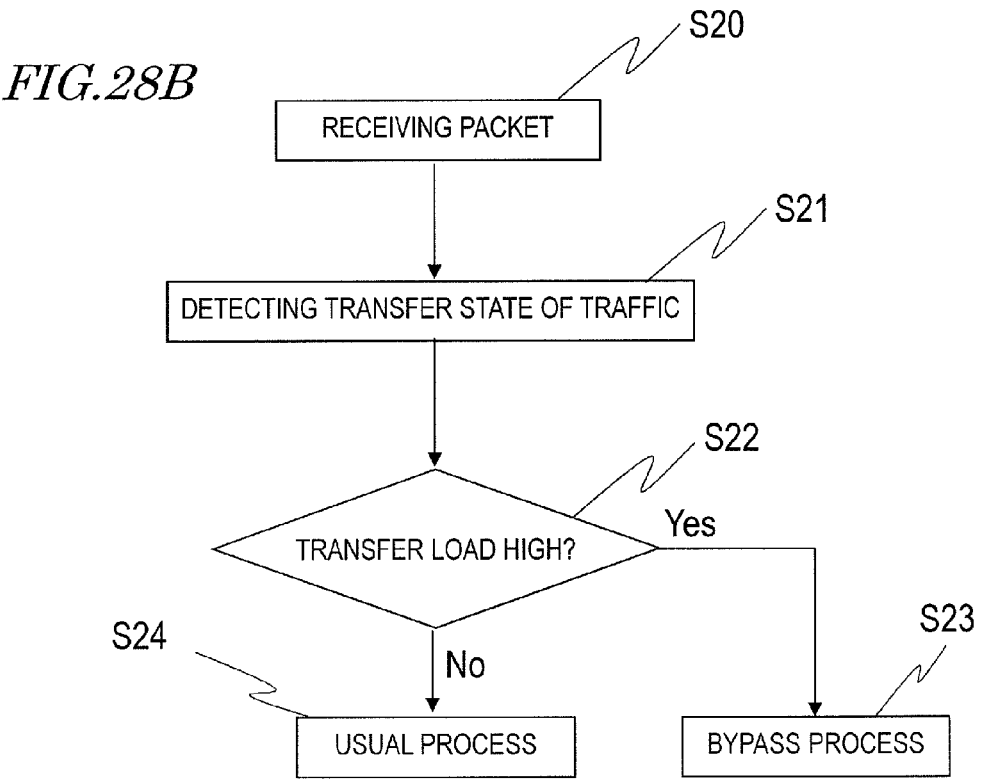
FIG. 28B is a flowchart showing another example of bypass determination process performed by the router.

FIG. 28A and FIG. 28B are each a flowchart showing a process performed by the bypass control section 200. The bypass control section 200 executes at least one of the processed shown in FIG. 28A and FIG. 28B to determine whether or not the received packet needs to be bypassed, and when determining that the received packet needs to be bypassed, performs a bypass process.

In the process shown in FIG. 28A, the bypass control section 200 determines whether or not the packet needs to be bypassed based on information regarding time (time information) included in the packet and thus determines whether or not to perform a bypass process. The bypass control section 200 first receives a packet in step S10. In step S11, the bypass control section 200 finds a remaining time duration which is allowed (allowed time duration) based on the time information of the packet. Next, in step S12, the bypass control section 200 determines whether or not the allowed remaining time duration is shorter than a predefined time duration. When the allowed remaining time duration is shorter than the predefined time duration, the bypass control section 200 determines that the packet needs to be bypassed, and executes a bypass process on the packet. When the allowed remaining time duration is equal to or longer than the predefined time duration, the bypass control section 200 determines that the packet does not need to be bypassed, and executes a usual process on the packet.

By contrast, in the process shown in FIG. 28B, the bypass control section 200 determines whether or not the packet needs to be bypassed based on the transmission state of the traffic when receiving the packet. The bypass control section 200 first receives a packet in step S20. In step S21, the bypass control section 200 finds a transmission state of the traffic. The expression "transmission state of the traffic" refers to an amplitude, a transmission interval or the like which is defined by a group of a plurality of packets transferred before and after the received packet. The term "amplitude" refers to an amount of data transferred per unit time, and the term "transmission interval" refers to a time interval between packets transmitted continually. Next, in step S22, the bypass control section 200 determines whether or not the transfer load is high based on the transmission state of the traffic. The determination on the transfer load may be made by, for example, comparing the amplitude or the transmission interval of the traffic against a predefined threshold value. When determining that the transfer load is high, the bypass control section 200 executes a bypass process on the received packet in step S23. When determining that the transfer load is not high, the bypass control section 200 advances to step S24 and performs a usual process. Oppositely, the bypass control section 200 may be designed so as to perform a usual process when determining that the transfer load is high in step S22 and perform a bypass process when determining that the transfer load is low in step S22.

The router 600 performs at least one of the processes shown in FIG. 28A and FIG. 28B to determine whether or not the received packet needs to be bypassed. Owing to this, the traffic to be bypassed can be appropriately selected in accordance with the allowed remaining time duration and the characteristic of the traffic to be transferred. Thus, the transfer delay of the traffic can be suppressed. The above-described processing procedure is merely exemplary. In this embodiment, the router may make a bypass determination in any of various methods as described later. The router merely needs to be configured to determine whether or not to perform a bypass process based on at least one of the allowed remaining time duration obtained by use of the information regarding time included in the incoming packet and the transmission state of the traffic.

Hereinafter, a specific configuration and operation in this embodiment will be described. The following description will be given mainly regarding points different from those of the first embodiment, and overlapping points with those of the first embodiment will be omitted.

<1. Configuration and Operation of Router>
<1.1 Schematic Configuration of Router>

Figure 29:
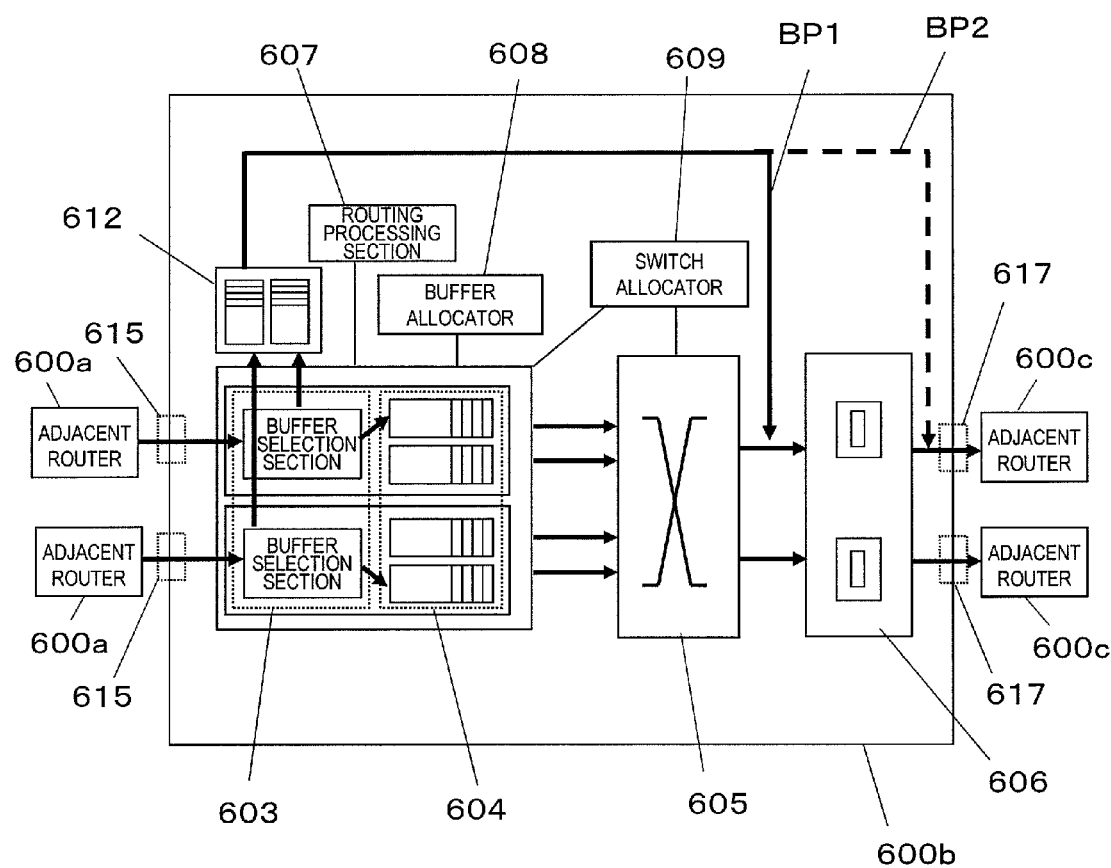
FIG. 29 shows an example of configuration of a transfer system in the third embodiment.

FIG. 29 shows a schematic configuration of a router in this embodiment. In this embodiment also, a system having a configuration of a multistage interconnection network shown in FIG. 3 is assumed. In this embodiment also, the router 600b in the second group will be described as an example, but the routers in the first and third groups have the same basic configuration except that sources and destinations are different.

The router 600b in this embodiment includes, in addition to the elements shown in FIG. 5A, a bypass buffer 612 for storing flits to be bypassed. Data stored on the bypass buffer 612 is transferred to one of the output buffers 606 via the bypass path BP1 after the transmission schedule is adjusted. The packets may be output in the order of arrival with no adjustment of the transmission schedule. In this embodiment, the bypass buffer 612 includes two buffer queues. The present disclosure is not limited to this example, and the number of buffer queues may be appropriately designed in accordance with the transfer amount of traffics. The bypass buffer 612 includes a plurality of queues, like the input buffers 604 and the output buffers 606. The buffer queues may each be formed of a virtual channel.

The buffer selection sections 603 each determine whether or not each received flit need to be bypassed based on the information described in the header flit. When determining that the flit does not need to be bypassed, the buffer selection section 603 stores the traffic including the flit on the input buffer 604. When determining that the flit needs to be bypassed, the buffer selection section 603 sends the traffic to the bypass buffer 612.

In this embodiment, the method for determining whether or not to perform a bypass process is different from that in the first embodiment. By contrast, the process performed when the bypass process is not performed is substantially the same as that in the first embodiment.

<1.2. Schematic Operation of Router>

Figure 30:
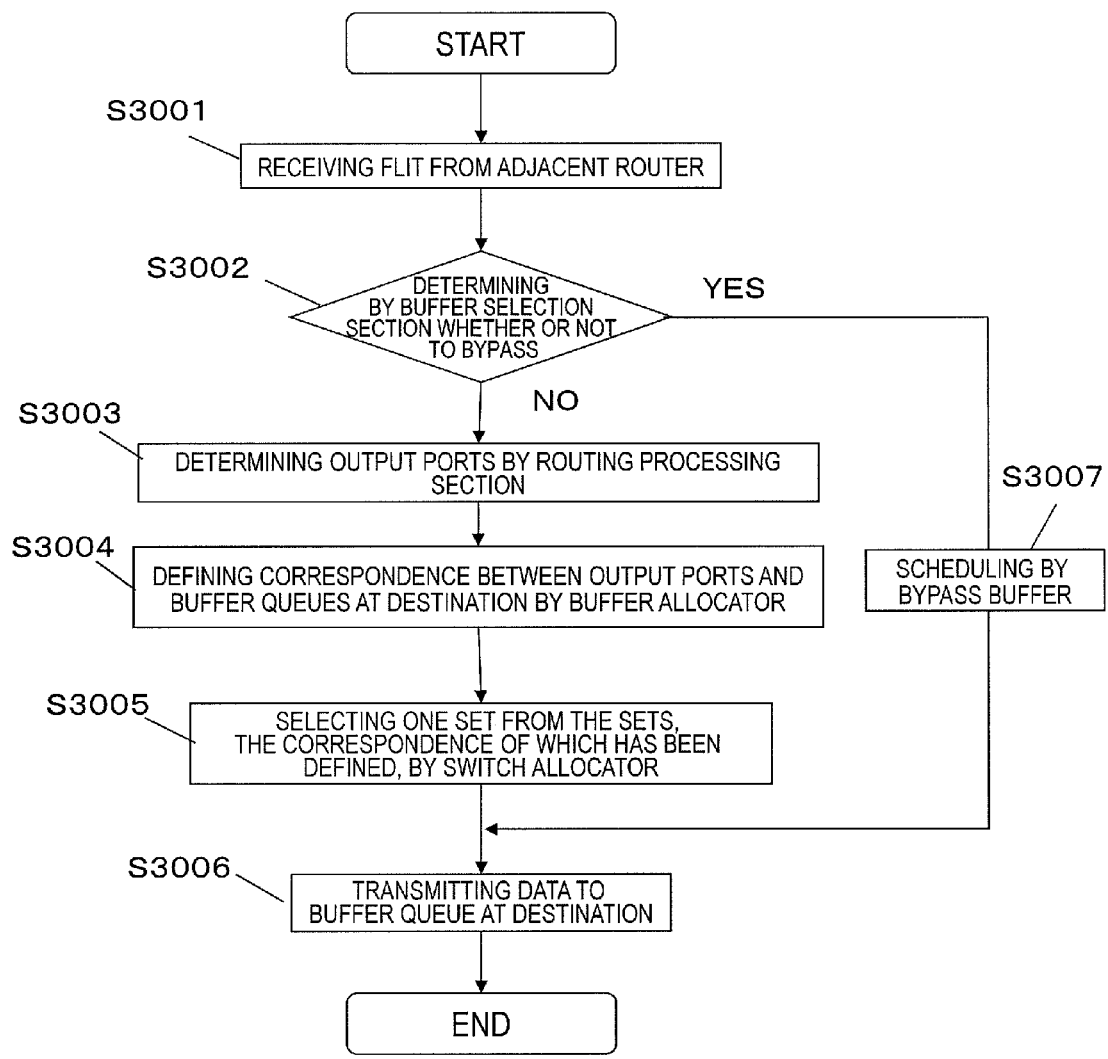
FIG. 30 shows a schematic process performed by the router in the third embodiment.

FIG. 30 is a flowchart showing an operation performed by the router 600b when the router 600b receives a flit. First in step S3001, the buffer selection section 603 in the router 600b receives a flit from the adjacent router 600a. In step S3002, the buffer selection section 603 determines whether or not to perform a bypass process.

When determining that the received flit belongs to a flow which should be bypassed, the buffer selection section 603 sends the flit to the bypass buffer 612. In step S3007, the flit stored on the bypass buffer 612 is subjected to scheduling performed by the bypass buffer 612. Then, in step S3006, the flit is transmitted to the output buffer 606. A specific method used by the buffer selection section 603 for determining whether or not to perform a bypass process will be described later with reference to FIG. 33 through 35.

By contrast, when the bypass process is not to be performed, in step S3003, the routing processing section 607 analyzes the header flit and determines output ports 617. Next, in step S3004, the buffer allocator 608 defines a correspondence between the output ports and the buffer queues of the input buffers in the router as the destination. Next, in step S3005, the switch allocator 609 selects one set of buffer queue and output buffer from sets of the buffer queues of the input buffers 604 and the output ports, the correspondence of which has been defined, in order to transfer the traffic. Then, in step S3006, the data is transferred from the target buffer queue in units of one flit or one packet.

Figure 31:
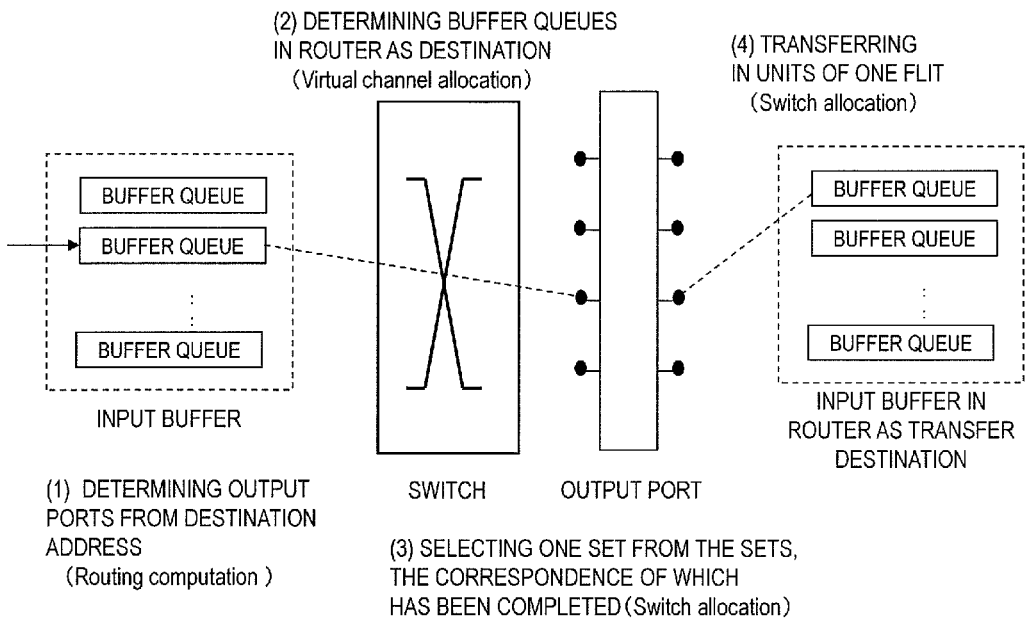
FIG. 31 shows an operation of the router in the third embodiment.

FIG. 31 shows a procedure of a process performed by a general router which does not perform a bypass process. The configuration and the processing procedure of a general router are basically the same as the configuration shown in FIG. 29 and the processing procedure shown in FIG. 30 described above in the case where the bypass process is not performed.

First, (1) the header flit is analyzed to determine the output ports based on the destination address (routing computation: RC). This process is performed by the routing processing section 607 in this embodiment and corresponds to the processing step in S3003.

Next, (2) the buffer queues of the input buffers in the adjacent router as the transfer destination (or the buffer queues of the output buffers 606) are determined (virtual channel allocation: VA). This process is performed by the buffer allocator 608 in this embodiment and corresponds to the processing step in S3004. The order by which the correspondence between the output ports and the buffer queues is defined may be determined by the round-robin method or based on a selection criterion such as the order of packet arrival, the order of time limit or the like.

Next, (3) one set of buffer queue and output buffer is selected from sets of the buffer queues of the input buffers 604 and the output buffers 606, the correspondence of which has been defined (switch allocation: SA), in order to transfer the traffic. In this step also, the order by which one set of buffer queue and output buffer is selected from sets of the buffer queues of the input buffers 604 and the output buffers 606, the correspondence of which has been defined, may be determined by the round-robin method or based on a selection criterion such as the order of packet arrival, the order of time limit, the order of priority level for the routing process, the order of burstiness level of the traffic or the like. The traffics may be distinguished by the burstiness level, so that a highly bursty traffic is selected with priority. Owing to this, it is made easier to obtain the transfer performance of a bursty traffic, namely, to perform low-latency transfer within an permissible time delay or to perform high throughput transfer within a permissible throughput. It should be noted that the data, even if being selected, cannot be transferred unless the router 600c as the transfer destination is capable of receiving the data. Therefore, only when it is determined that the router 600c as the transfer destination is capable of receiving the data, the data is transferred. This process is performed by the switch allocator 609 in this embodiment and corresponds to the processing step in S3005.

Then, (4) data is transferred from the target buffer queue in units of one flit (switch traversal: ST). This process is performed by the switch allocator 609 in this embodiment and corresponds to the processing step in S3006. The size of the data to be transferred may be in units of one packet instead of one flit as described above.

The characteristic of a bursty traffic may be represented by at least one of the transfer amount per unit time, transmission cycle, transmission interval, number of packets transferred continually, and time delay.

Specifically, the data may be determined as having burstiness in at least one of the cases where the transfer amount per unit time of the data is larger than a predefined threshold value, where the transmission cycle of the data is shorter than a predefined threshold value, where the transmission interval of the data is shorter than a predefined threshold value, where the number of packets transferred continually is larger than a predefined threshold value, and where the permissible time delay for the data is shorter than a predefined threshold value. It may be determined whether or not a traffic has burstiness from, for example, any of the above-described viewpoints, and the result may be used as the information which represents the priority level of the process. Alternatively, whether a traffic has burstiness or not may be described in the header of the packet as an identifier (e.g., information representing burstiness or information usable for identifying a bus master which transmitted the bursty traffic). Such information allows a bursty traffic to be distinguishable from a non-bursty traffic.

In a specific example, the bus master-side NIC 620a shown in FIG. 4 may determine whether or not data transmitted from the bus master has burstiness (or determine the priority level of the data), and provide the header flit 504 shown in FIG. 6 with information which represents whether or not the data has burstiness (or the priority level of the data). Owing to this, the header flit interpretation section 901 in each router can determine whether or not the data has burstiness from the header flit and perform a routing process in accordance with whether or not the data has burstiness (or the priority level of the data).

<1.3. Configuration and Operation of Buffer Selection Section>

Figure 32:
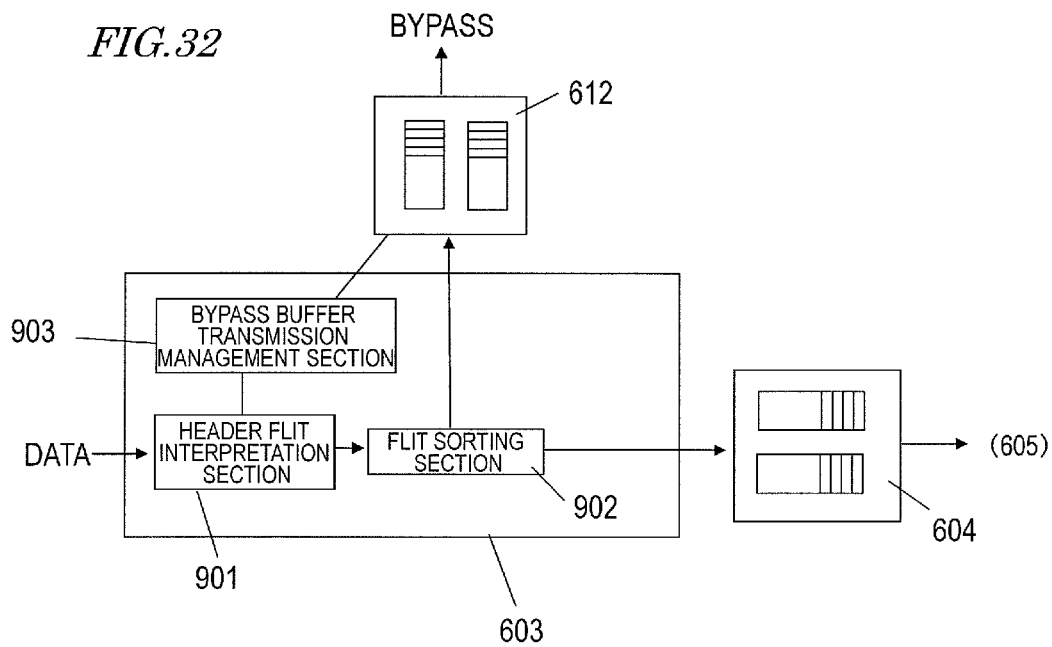
FIG. 32 shows a configuration of a buffer selection section in the router in the third embodiment.

FIG. 32 is a block diagram showing a configuration of the buffer selection section 603 in this embodiment. The buffer selection section 603 determines whether to bypass a traffic received by the router 600b or to transfer the traffic by a usual process. The selection section 603 includes the header flit interpretation section 901 for interpreting the structure of a flit shown in FIG. 6, the flit sorting section 902 for allocating the traffic either to the bypass buffer 612 or to the input buffer 604, and a bypass buffer transmission management section 903 for managing transmission of the traffic which is output from the bypass buffer 612.

The flit sorting section 902 determines whether or not to bypass the received traffic based on the analyzed structure of the traffic. When determining to bypass the received traffic, the flit sorting section 902 transfers the traffic to the bypass buffer 612.

The data transferred to the bypass buffer 612 is transmitted from the bypass buffer 612 after being subjected to scheduling adjustment performed by the bypass buffer transmission management section 903 based on the analysis results provided by the header flit interpretation section 901. The scheduling by the bypass buffer transmission management section 903 is performed by a round-robin method or based on the time limit, priority information or the like.

When determining not to bypass the received traffic, the flit sorting section 902 transfers the traffic to the input buffer 604. The process of each section will be described later in detail.

Figure 33:
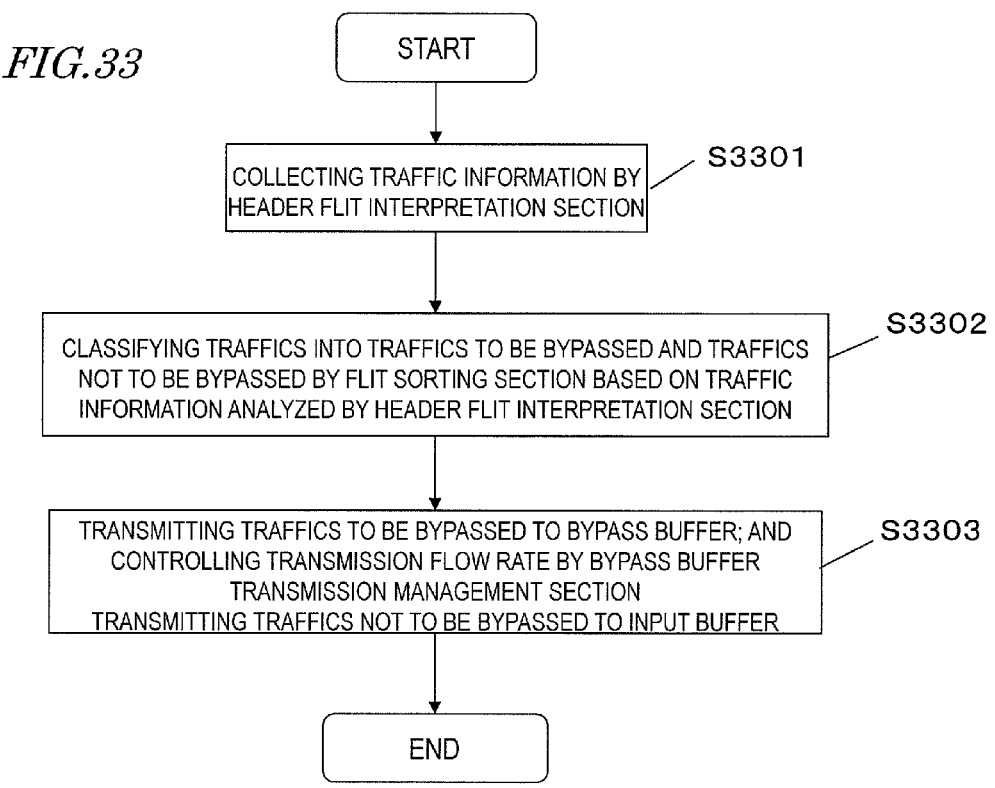
FIG. 33 shows a procedure of operation performed by the buffer selection section in the third embodiment.

FIG. 33 is a flowchart showing a flow of operation performed by the buffer selection section 603. First, the header flit interpretation section 901 collects traffic information and interprets the information (S3301). Next, based on the traffic information analyzed by the header flit interpretation section 901, the flit sorting section 902 classifies the traffics into traffics to be bypassed and traffics not to be bypassed from the viewpoint of at least one of the time duration remaining for the transfer (remaining time duration) and characteristics of the contents to be transferred (S3302). The traffics to be bypassed are transmitted to the bypass buffer 612, and the transmission flow rate thereof is controlled by the bypass buffer transmission management section 903. The traffics not to be bypassed are transmitted to the input buffer 604, subjected to the processes in S3003 through S3005 shown in FIG. 30, and transmitted to the output buffer 606 (S3303).

<1.4. Detailed Structure of Header Flit>

Figure 34:
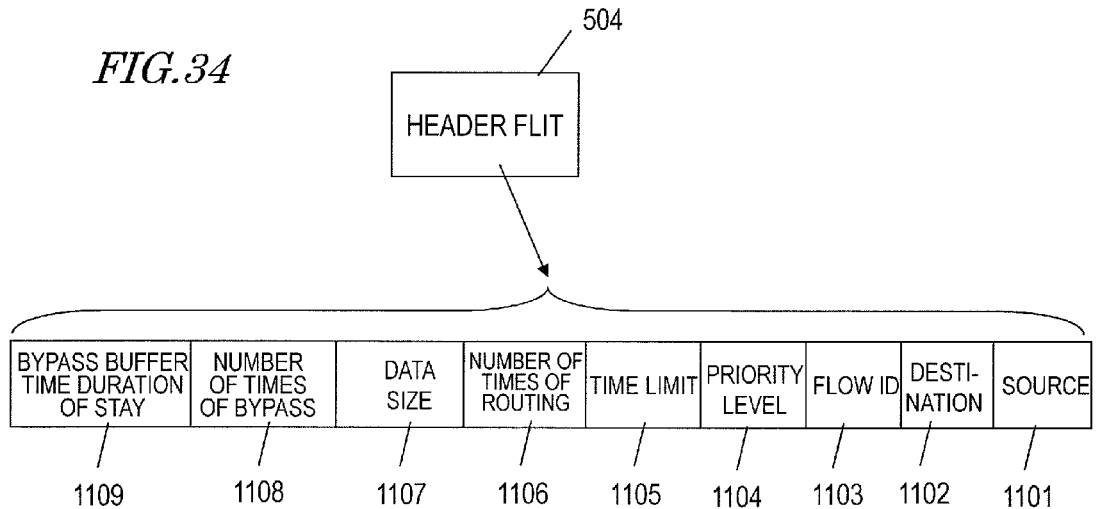
FIG. 34 shows a detailed structure of a header flit in the third embodiment.

FIG. 34 shows a detailed structure of the header flit 504 in this embodiment. The header flit 504 has the following fields: fields where the source 1101 and the destination 1102 between the transmission and receiving nodes are described; a field 1103 where a flow ID for identifying individual traffic is described; a field 1104 where the priority level defining the importance level of the traffic is described; a field 1105 where the time limit for the traffic is described; a field 1106 where the number of times that the traffic has been routed by the router is described; a field 1107 where the data size of the traffic is described; a field 1108 where the number of times that the traffic has been bypassed is described; and a field 1109 where the time duration in which the traffic has stayed in the bypass buffer is described.

Figures 35, 36:
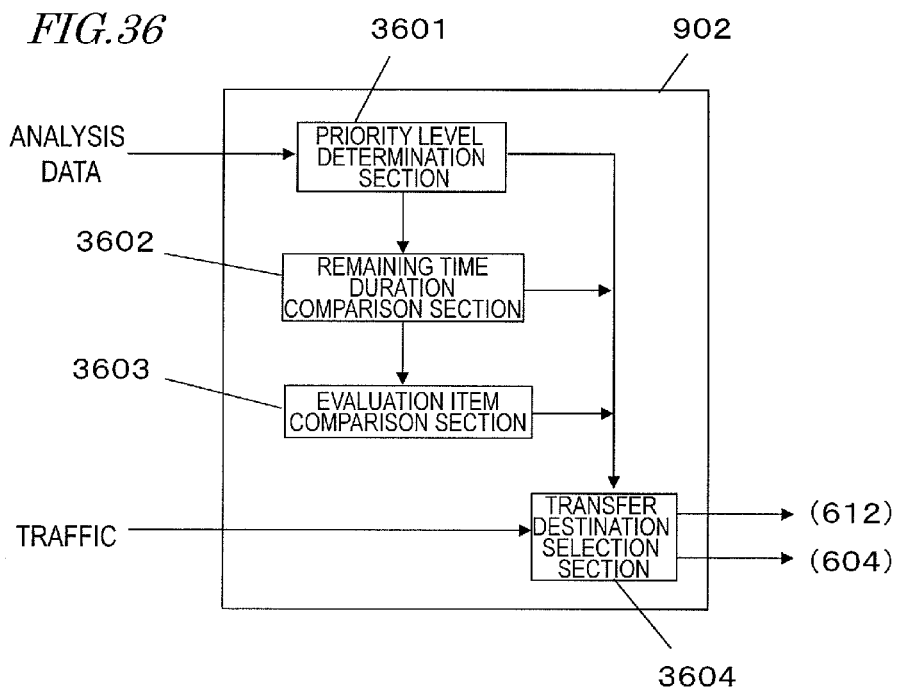
FIG. 35 shows analysis results provided by a header flit interpretation section in third embodiment.
FIG. 36 shows an example of configuration of a flit sorting section in the third embodiment.

FIG. 35 shows the results of analysis performed by the header flit interpretation section 901. The flow ID is an ID usable for uniquely specifying the traffic on the system. The flow ID is allocated by the router connected to the bus master. An ID allocation range may be defined for each router to which a flow ID is allocated, so that an ID can be allocated uniquely on the system.

The priority level represents the importance level of the traffic to be transmitted. For example, a high priority level is allocated to video, audio and control data which is highly required to be transferred with low latency. By contrast, a low priority level is allocated to text and image data which is not highly required to be transferred with low latency.

The time limit represents a time duration which is allowed for data to arrive at the destination from the source. The time may be expressed by the unit of, for example, the number of clocks, μ seconds or the like. The time may be expressed by the absolute time on the system or the relative time from predefined reference time. In the example shown in FIG. 35, flow ID 321 has a shorter time limit than flow ID 234 (1201).

The number of times of routing represents the number of routers that the traffic passed while being transferred from the source to the destination. The number of routers is provided by counting up the number of times of routing in the header flit each time the traffic passes a router. In the example shown in FIG. 35, flow ID 456 has a larger number of times of routing than flow ID 567 (1204). It is considered that a flow having a larger number of times of routing has a larger transfer delay by the influence of the routing delay.

The data size represents the size of the data to be transferred. In general, control data has a small size, whereas video or audio data has a large size (1205). As a parameter representing a characteristic of the traffic, the data size is used in this example. Alternatively, information other than the data size may be described in the header flit. A traffic having a large amplitude and transferred continually and instantaneously (at a short transmission interval) (bursty traffic) has a strong influence on the other traffic (e.g., the traffic interference between such a traffic and other traffics is large). Therefore, the header flit may be designed to include the maximum amplitude value of the traffic, or the transmission interval or transmission cycle of the data, so that such a bursty traffic is not joined with other traffics on the same transmission path or at the same router. Owing to such a design, the transfer performance can be improved. Specific applications of these parameters will be described later with reference to FIG. 36.

The number of times of bypass represents the number of bypass paths of the routers that the traffic passed while being transferred from the source to the destination (1203). The number of times of bypass is provided as follows: each time the traffic passes a bypass path of a router, the respective router counts up the number of times of bypass in the header flit.

The bypass buffer time duration of stay represents an accumulated amount of time durations in which the traffic waited in the bypass buffer in the routers. The time durations in which the traffic waited in the bypass buffer in the routers while being transferred from the source to the destination are accumulated. The time may be expressed by the unit of the number of clocks, μ seconds or the like. The time may be expressed by the absolute time on the system or the relative time from predefined reference time. In the example shown in FIG. 35, flow ID 123 waited for 0 in the bypass buffer, and flow ID 321 waited for 200 in the bypass buffer (1202). The bypass buffer time duration of stay may be an accumulated amount of time durations in which the traffic waited in the bypass buffer in a part of the routers, instead of all the routers that the traffic passed. The range of the other routers from which such information is to be collected, or the collection interval (time interval at which the time durations of stay in the bypass buffers in the target routers are collected), can be determined based on the wait time at the bypass buffer in the router of interest. The average value or the peak value of the time durations may be used as the bypass buffer time duration of stay, instead of the accumulated amount.

The header flit interpretation section 901 sends the information representing the analysis results shown in FIG. 35 to the flit sorting section 902 as the analysis data, separately from the traffic.

<1.5. Bypass Determination Process by Flit Sorting Section>

<1.5.1. Bypass Determination Process Based on Priority Level, Remaining Time Duration, and Other Evaluation Items>

Now, a process of determining whether or not to perform a bypass process based on the allowed remaining time duration for a traffic which is a target of routing will be described. In this embodiment, the determination process is performed based on the information representing the priority level included in the packet (flit) or other evaluation items, as well as the remaining time duration.

FIG. 36 is a block diagram showing a configuration of the flit sorting section 902. The flit sorting section 902 sorts flits based on the analysis results of the header flit provided by the header flit interpretation section 901. As shown in FIG. 36, analysis data and traffic are input from the header flit interpretation section 901 to the flit sorting section 902. The flit sorting section 902 includes a priority level determination section 3601 for determining whether or not to perform a bypass process based on the information described in the header flit and representing the priority level, a remaining time duration comparison section 3602 for determining whether or not to perform a bypass process based on the remaining time duration allowed for each piece of traffic (described later in detail), an evaluation item comparison section 3603 for determining whether or not to perform a bypass process based on an evaluation time of attention (described later in detail), and a transfer destination selection section 3604 for transferring the packet to either the bypass buffer 612 or the input buffer 604 based on the determination result made by each of these sections.

Figure 37:
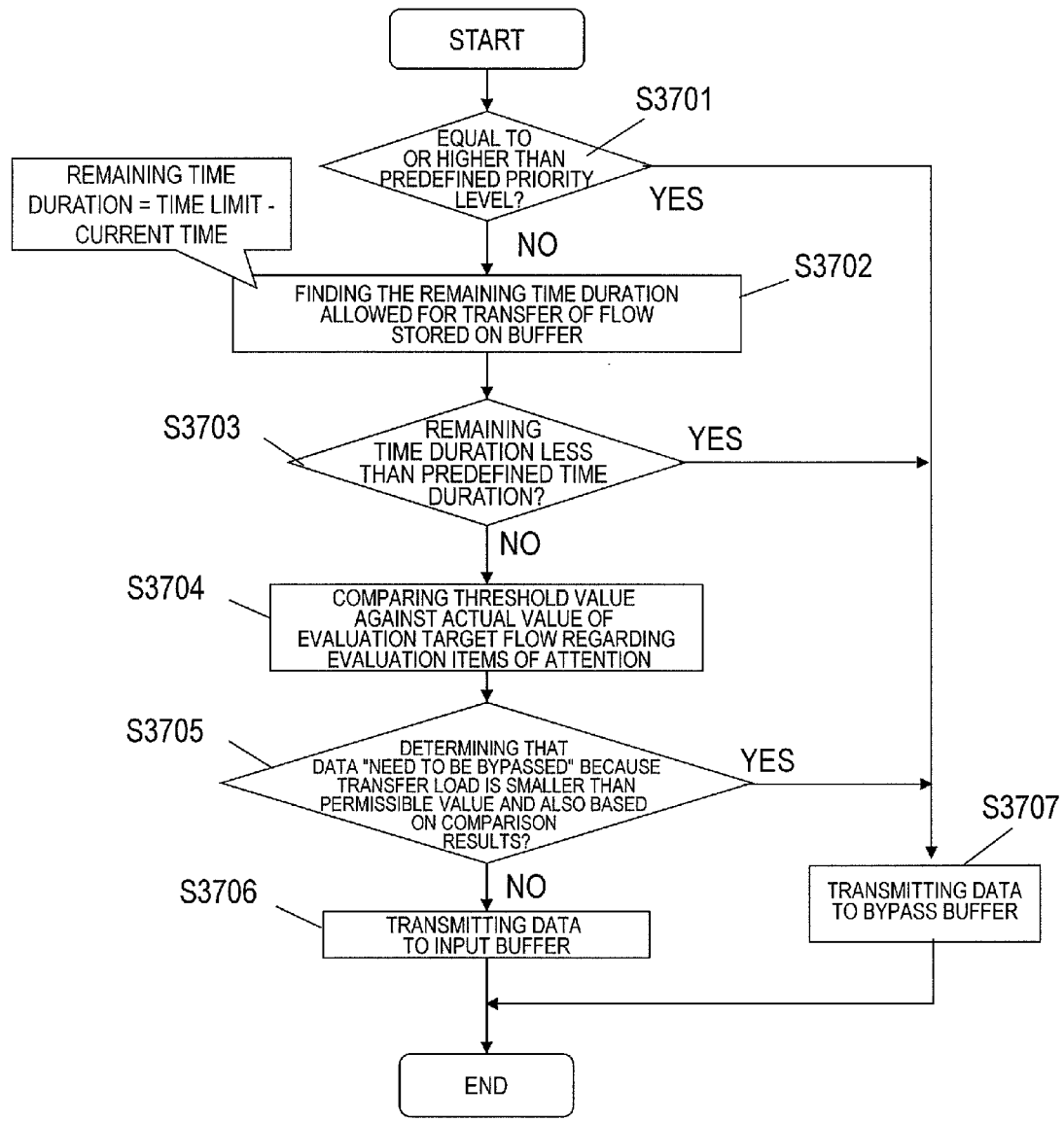
FIG. 37 shows a process performed by the flit sorting section in the third embodiment.

FIG. 37 is a flowchart showing a process performed by the flit sorting section 902. The flit sorting section 902 first determines whether or not the value of the priority level described in the header of the received flit is equal to or higher than a predefined priority level (S3701). When the value of the priority level is equal to or higher than the predefined priority level, the transfer destination selection section 3604 transmits the traffic to the bypass buffer 612 (S3707). As the priority level is higher, the degree of request for low-latency transfer is higher. When the value of the priority level is lower than the predefined priority level, the remaining time duration comparison section 3602 finds the remaining time duration allowed for each piece of the traffic stored on the bypass buffer 612 (S3702). The remaining time duration may be found by, for example, any of the following methods.

$$\text{Remaining time duration} = \text{time limit} - \text{current time} \quad (1)$$

$$\text{Remaining time duration} = \text{permissible time delay} - \\ (\text{time duration of stay} + \text{routing delay} \times \text{number of times of routing}) \quad (2)$$

The time limit and the time duration of stay (bypass buffer time duration of stay) are elements described in the header flit shown in FIG. 34. The current time is the time at which the router of interest received the traffic. The permissible time delay is the maximum time delay which is permissible in an application defined between the transmission and receiving nodes. The permissible time delay may be described in the header flit or may be defined and registered for each router at the time of designing. The routing delay is the time delay caused by routing which is required each time the data passes a router. Specifically, a fixed value (e.g., four cycles) is set as the routing delay per router. The remaining time duration is calculated from such information by use of either one of expressions (1) or (2). The time duration of stay in expression (2) is an accumulated amount of time delays caused in the bypass buffer in the routers that the flit passed until arriving at the router of interest. The "routing delay× number of times of routing" represents the time delay caused while the data is transferred from the router of interest to the receiving node as the destination via the input buffer by a usual process (total sum of the time required by the transfer process and the wait time at the buffer). A sum of the time duration of stay and (routing delay×number of times of routing) is defined as a delay caused by a routing process while the data is transferred from the transmission node to the receiving node. The number of times of routing from the router of interest to the receiving node is found by subtracting the number of times of routing described in the header flit from the number of routers that the data passed while being transferred from the transmission node to the receiving node.

The remaining time duration may be obtained by use of expression (1) or (2) above, but instead, the remaining time duration may be a value obtained by subtracting a prescribed time duration which is determined by a packet length, from the remaining time duration calculated by use of expression (1) or (2) above. In this case, even where there are both a long packet and a short packet, the remaining time duration can be found more accurately.

In step S3703 shown in FIG. 37, the remaining time duration comparison section 3602 determines whether or not the remaining time duration found by any of the above-described methods is shorter than a predefined remaining time duration. When the remaining time duration is shorter than the predefined remaining time duration, the transfer destination selection section 3604 determines that there is no time to spare in the remaining time duration, and in step S3707, transmits the data to the bypass buffer 612. When the remaining time duration is equal to or longer than the predefined remaining time duration, the transfer destination selection section 3604 determines that there is some time to spare in the remaining time duration, and the process advances to step S3704.

In step S3704, the evaluation item comparison section 3603 compares a threshold value predefined for each flow which is a target of evaluation, regarding each of the evaluation items of attention, against actual value of the received data. Herein, the "evaluation items of attention" are, for example, the bypass buffer time duration of stay, number of times of bypass, number of times of routing and the like shown in FIG. 34. The evaluation item to pay attention to may be arbitrarily determined at the time of designing the system. As the threshold value, an average value is provided at the time of designing of the system. For example, the numerical value of "2" is set as the threshold value for the number of times of bypass, and the numerical value of "5" is set as the threshold value for the number of times of routing.

Next, in step S3705, the evaluation item comparison section 3603 determines whether or not the transfer load on the transmission path used by the router for bypassing (e.g., free capacity of the bypass buffer 612, wait time at the bypass buffer 612) is smaller than a permissible value. Herein, the "wait time at the bypass buffer 612" means a time duration required for a packet arriving at the bypass buffer 612 to be transmitted. The "transfer load" is measured by, for example, a measurement section (not shown). The data in a flow as a target of evaluation may be determined as needing to be bypassed based on the determination result that the transfer load is smaller than the predefined permissible value and also based on the results of comparison regarding the evaluation items described above against the threshold values. In this case, in step S3707, the transfer destination selection section 3604 transmits the data to the bypass buffer 612. Otherwise, in step S3706, the transfer destination selection section 3604 transmits the data to the input buffer 604.

Owing to the above-described processes, when the transfer capability of the bypass path is not fully used (e.g., when the occupied ratio of the bypass buffer is lower than 50%, the wait time at the bypass buffer 612 is shorter than 100 cycles), the difference in the transfer quality among a plurality of flows to be bypassed can be decreased regarding the evaluation items of attention. For example, when the information regarding the number of times of bypass is used as the evaluation item, the flow having a small number of times of bypass may be transferred with priority, so that the bypass process is prevented from being performed only on a specific flow. Owing to this, the variance of the transfer performance (transfer delay, throughput,) among the flows can be alleviated.

The router is not limited to performing the processing flow shown in FIG. 37, and merely needs to be configured to determine whether or not to perform a bypass process at least based on the allowed remaining time duration found in step S3702.

<1.5.2. Bypass Determination Process Based on Traffic Characteristics>

Figure 38:
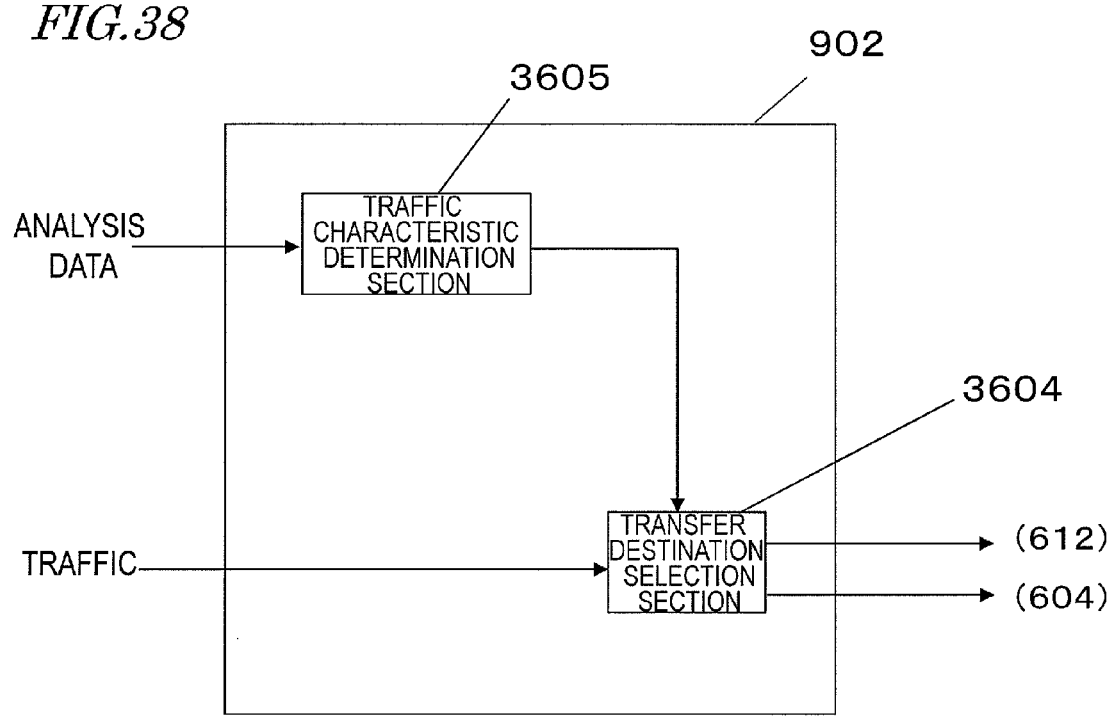
FIG. 38 shows another example of configuration of the flit sorting section in the third embodiment.

FIG. 38 shows another example of the flit sorting section 902. In this example, the flit sorting section 902 includes a traffic characteristic determination section 3605 for determining whether or not to perform a bypass process based on a characteristic of the traffic found by the analysis results of the header flit provided by the header flit interpretation section 901, and the transfer destination selection section 3604 for sending the data to the bypass buffer 612 or the input buffer 604 based on the determination result.

Whether or not a bypass process is to be performed may be determined based on the characteristic of the data to be transferred as well as the free capacity of the bypass buffer 612 or the wait time at the bypass buffer 612. Specifically, the traffic characteristic determination section 3605 may determine whether or not to perform a bypass process based on whether or not there is a bursty traffic which is being transferred or the level of burstiness of the traffic. For example, the traffic characteristic determination section 3605 acquires information, regarding a highly bursty traffic such as video data or the like, on the maximum amplitude value of the traffic, the transmission interval or transmission cycle of the packets or the like from the analysis results provided by the header flit interpretation section 901. When such information represents a value equal to or larger than a corresponding threshold value defined at the time of designing, it is determined that the influence of traffic interference is strong and it can be determined not to bypass the target flow. Or conversely, when such a highly bursty traffic is to be bypassed, it may be determined not to bypass a non-bursty traffic because the interference between the highly bursty traffic and other traffics is strong. Based on the determination result, the transfer destination selection section 3604 transfers the traffic to the bypass buffer 612 or the input buffer 604.

In general, when the traffic is highly bursty, the maximum amplitude value of the traffic is large, and the transmission interval or transmission cycle of the packets is short. A traffic having a transmission interval or transmission cycle of the packets which is shorter than a prescribed threshold value may be defined as a "bursty traffic". The threshold value used for defining the burstiness is found experimentally by, for example, a simulation at the time of designing. The information on the maximum amplitude value of the traffic or the transmission interval or transmission cycle of the packets may be acquired by a measurement performed by the header flit interpretation section 901 of the router for each flow. Alternatively, such information may be described in advance in the header flit shown in FIG. 35, so that the header flit interpretation section 901 can interpret the description.

A bursty traffic is separated from a non-bursty traffic, and the bursty traffic is transferred by a bypass path whereas the non-bursty traffic is transferred by a usual transmission path. Thus, the traffic interference between the bursty traffic and the non-bursty traffic can be prevented. Owing to this, the transfer performance requested for a bursty traffic, namely, the low-latency transfer within a permissible time delay or a high throughput can be obtained with certainty.

Methods for separating a bursty traffic from a non-bursty traffic include, as described above, a method of setting a bypass path in the router, and a method of providing a bypass path outside the router. Such methods can prevent the traffic interference from occurring due to the buffer in the router being shared, and also can eliminate competition among processes regarding the use of the crossbar switch in the router. Even in the case where a bypass process, if performed, is performed in the router, the system may be configured such that the determination on whether or not to perform the bypass process is made only by the router connected to the bus master and is not performed in any router which is not connected to the bus master. Owing to such a configuration, the process of determining whether or not to perform a bypass process is prevented from causing the traffic interference between a bursty traffic and a non-bursty traffic. When the system is thus configured, the flow control, which is usually performed between routers adjacent to each other, needs to be performed between a router connected to the bus master and a router connected to the memory. In the case where the lines are provided for a long distance, a bus buffer (repeater for dividing the long lines) needs to be provided on the bypass path. In the case where there are a plurality of bursty traffics, it is effective to provide an independent transmission path for each of the bursty traffics, as in the case of the method of providing a bypass path outside the router. In such a configuration, the number of positions at which traffic interference may occur is small, and therefore, the effect of improving the transfer performance of a bursty traffic is conspicuous.

As described in detail later, a dedicated buffer may be provided in the router and allocated only to a bursty traffic. Such a configuration can prevent the traffic interference more easily than the method of providing a bypass path although an influence of traffic interference remains. In the case where there are a plurality of bursty traffics, it is effective to allocate a dedicated buffer provided in each router on the transmission path to each of the bursty traffics. In such a configuration, the chances in which traffic interference may occur are decreased, and therefore, the effect of improving the transfer performance of a bursty traffic is conspicuous. A specific configuration of the buffer will be described in a fourth embodiment.

In this specification, the method of allocating a dedicated buffer provided in each router on the transmission path to each of the bursty traffics is considered as one method for realizing an independent bypass path. Namely, a buffer provided in each router on the transmission path and allocated to a bursty traffic is defined as being corresponding to a bypass transmission path. A transmission path may be designed with a combination of the above-described approaches in accordance with the characteristic of the traffic (permissible time delay, throughput to be guaranteed, number of bursty traffics, number of traffics, etc.).

Data having a small size such as audio data or video data, data having a small maximum amplitude value, or data having a long transmission interval or transmission cycle may be bypassed with priority. Owing to this, the interference between traffics on the bypass transmission path can be decreased.

In order to represent the transmission state of a traffic in another method, an identifier indicating that the traffic is to be bypassed may be provided in the header flit. At the time of designing, a designer can determine whether the target traffic is to be bypassed or not, for example, from the viewpoint of a characteristic of the traffic such as burstiness, capability of real-time performance or the like or the viewpoint of the influence of traffic interference caused on the transmission path, and describe information which represents the determination result in the header flit of the target traffic. In this case, the head flit interpretation section 901 in each router may interpret the identifier indicating whether or not the data should be bypassed, so that it can be determined whether or not to perform a bypass process.

In this embodiment, the flit sorting section 902 has a configuration shown in FIG. 36 or FIG. 38. The flit sorting section 902 is not limited to having such a configuration. For example, the flit sorting section 902 may have both of the configurations. In such a case, it is determined whether or not to perform a bypass process based on both of the time information found from the information included in the packet and the load of the traffic.

<1.6 Scheduling by Bypass Buffer Transmission Management Section>

Now, an example of transmission scheduling performed by the bypass buffer 612 in step S3007 shown in FIG. 30 will be described. The bypass buffer transmission management section 903 shown in FIG. 32 determines a transmission order or transmission time (transmission interval or transmission timing) of data output from the bypass buffer 612, based on the allowed remaining time duration found by the remaining time duration comparison section 3602 shown in FIG. 36. The transmission order or transmission time may be determined based on other information instead of the allowed remaining time duration. For example, the transmission order or transmission time may be determined based on an appropriate combination of information on the time limit of an incoming packet, the time duration of stay of the traffic in the bypass buffer 612 when the packet was input, the number of times of routing and the like. Owing to such scheduling, a packet required to be transferred more quickly is transmitted more quickly, and thus the delay of the bypass traffic can be further decreased.

In the above description, the elements of the router 600 are each represented as an individual functional block. Alternatively, the operation of the router 600 may be realized by execution of a program defining the processes of these functional blocks by use of a processor (computer) mounted on the router 600. A processing procedure of such a program is as shown in the flowcharts in, for example, FIGS. 30, 33 and 37.

<2. Modifications>

<2.1 Configuration with No Output Buffer>

Figure 39:
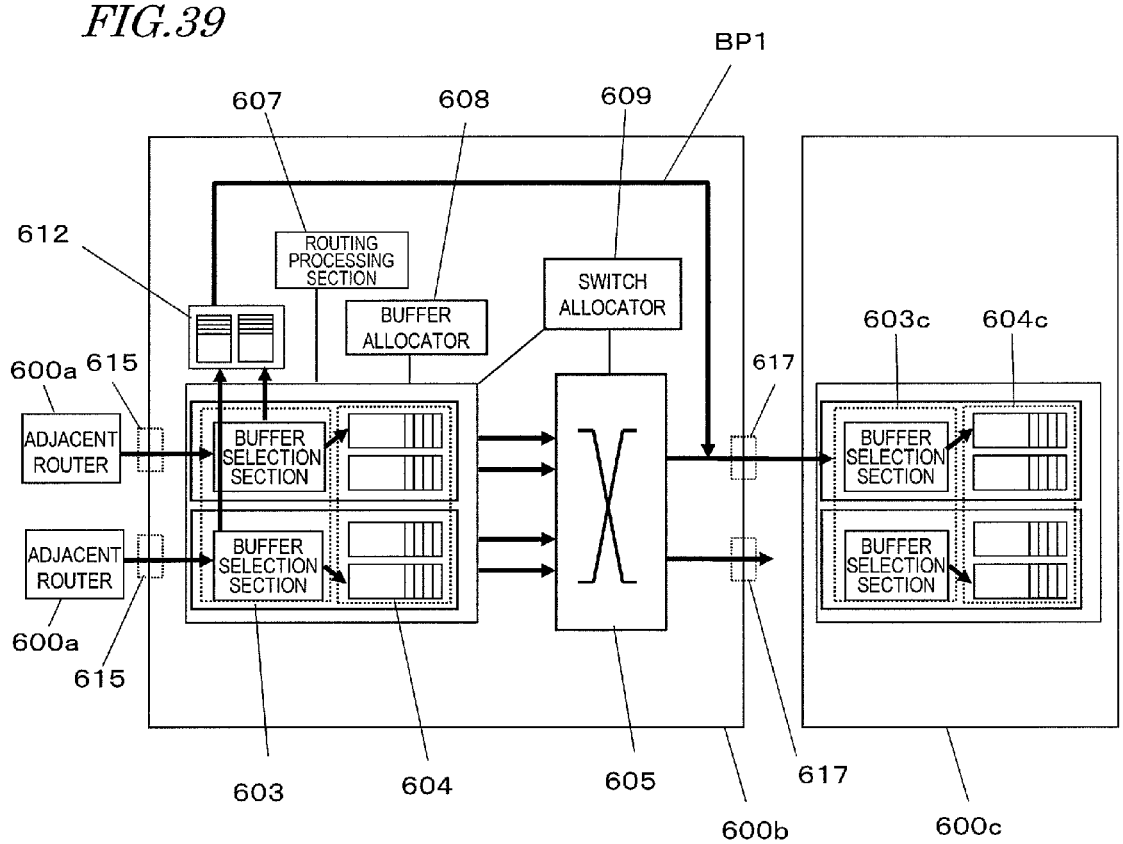
FIG. 39 shows an example of configuration of a router with no output buffer in the third embodiment.

In the configuration shown in FIG. 29, the router 600b includes the output buffers 606. As described above, the router does not need to include any output buffer 606. FIG. 39 shows an example of configuration of the router 600b which does not include any output buffer 606. In this router 600b, the output of the crossbar switch 605 is input to the buffer selection section 603c of the adjacent router 600c on the subsequent stage. Such a configuration can suppress the memory capacity and thus is effective when the data transfer system is incorporated into a specific apparatus.

<2.2 External Wiring>

Figure 40:
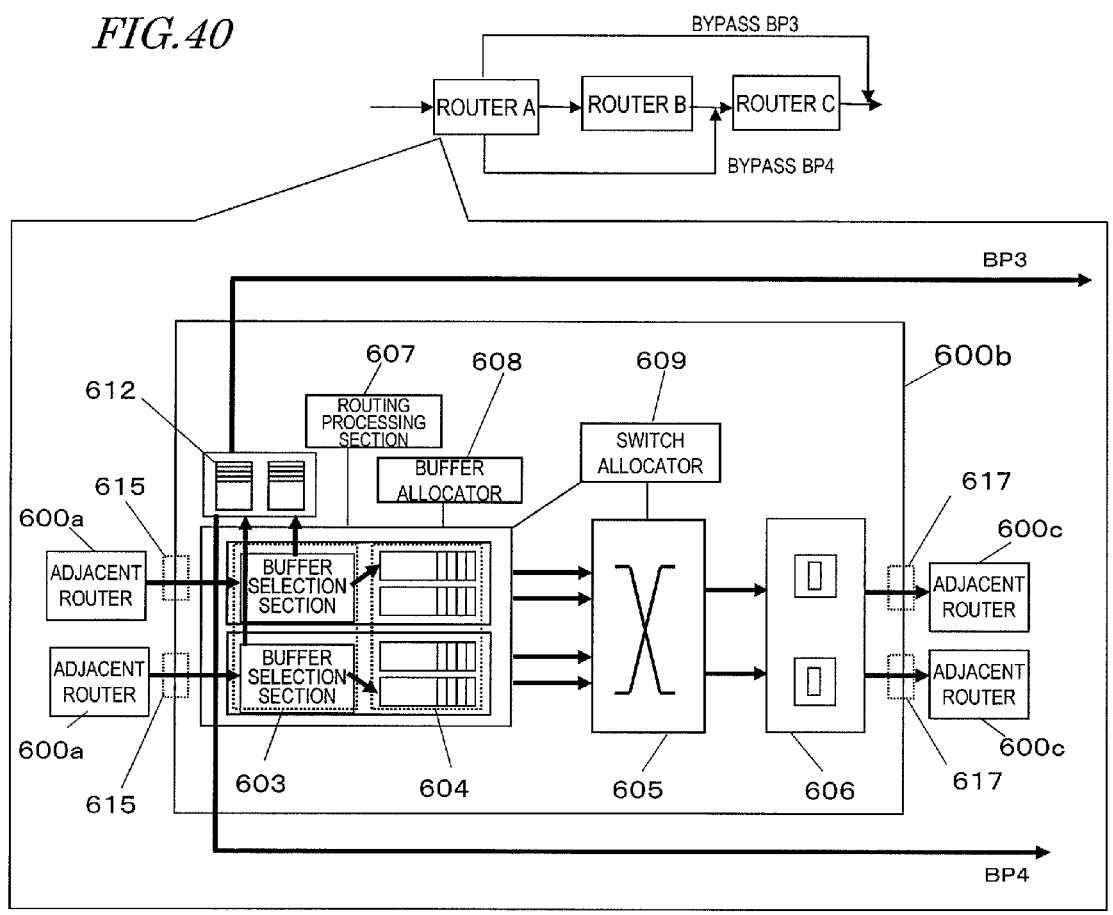
FIG. 40 shows an example of configuration of a router for performing a bypass process by use of external lines in the third embodiment.

In the above description, as shown in FIG. 29, an example in which the bypass process is performed in the router 600b (internal wiring) is described. Lines may be provided so as to transfer the bypass traffic to the outside of the router 600b (external wiring), like in the first embodiment. FIG. 40 shows an example of configuration in which the lines are provided outside the router 600b for perform a bypass process. In this example, the buffer selection section 603 transfers a traffic to routers external to the router 600b or to the memory 105 by bypass paths BP4 and BP3.

According to the configuration using the internal wiring, the bypass process is closed for each router. Therefore, the router is highly reusable as a processing module. Namely, each individual router can be replaced as one component. However, since the data needs to pass all the routers up to the destination, overhead of the process is likely to occur. By contrast, according to the configuration using the external wiring, the router is not as highly reusable as a processing module as in the case of the internal wiring. However, since the data does not need to pass all the routers up to the destination, overhead of the process can be decreased.

In this embodiment also, the bypass process is usable in the application described above with reference to FIG. 20. On the traffic generated from the bus master 101a shown in FIG. 20, the router R9 performs a bypass process of outputting a packet with priority based on at least one of the remaining time duration, obtained by use of information on the time included in the incoming packet, and the transmission state of the traffic when the packet was input. The bus master may output a plurality of types of traffics. Specifically, the bus master may transmit traffics which are different in the time limit or the priority level or traffics which are different in the amplitude or the transmission interval in a mixed state. A network may be constructed by combining the external wiring and the internal wiring. For example, the router R9 may be configured with the internal wiring, so that low-latency transfer is realized more easily than in the case where the network is constructed only with the external wiring or only with the internal wiring.

<2.3. Other Topologies>

In the above description, the topology of the integrated circuit is a multistage interconnection network (FIG. 3). Like in the first embodiment, a router 600 in this embodiment is not limited to being used in a multistage interconnection network. For example, the router in this embodiment is usable in the mesh topology as shown in FIG. 12(b) in which the routers are arranged in a lattice, the Taurus-type topology as shown in FIG. 22A, or in the topology as shown in FIG. 22B in which buses are connected in a hierarchical manner. A router in this embodiment is usable in any topology in which a plurality of bus masters are connected via distributed buses, as well as in the above-described topologies.

(Embodiment 4)

Now, the fourth embodiment according to the present disclosure will be described. Before describing a specific configuration and operation in this embodiment, the basic principle of this embodiment will be first described.

A router in this embodiment appropriately allocates buffer queues (data storage sections) to bursty traffics, and thus can suppress the traffic interference and realize low-latency transfer while increasing the utilization efficiency of the buffer queues. In general, when a traffic is highly bursty, the maximum amplitude value of the traffic is large, and the transmission interval or transmission cycle of the packets is short. Therefore, the traffic interference is likely to occur, and the transfer delay is likely to be caused. In this situation, the router in this embodiment exclusively allocates specific buffer queues to bursty traffics and stores the bursty traffics in the specific buffer queues, and thus increases the utilization efficiency of the buffer queues and suppresses the traffic interference.

Figure 41A:
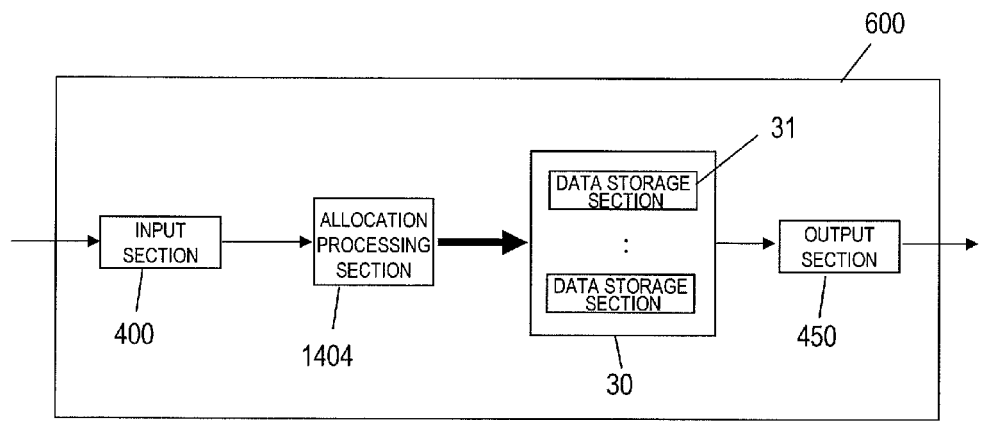
FIG. 41A shows a first example of schematic configuration of a router in a fourth embodiment.

FIG. 41A shows an example of schematic configuration of a router 600 in this embodiment. As shown in FIG. 41A, The router 600 includes an input section 400 for receiving data, a buffer section 30 including a plurality of data storage sections 31 for temporarily storing data, an output section 450 for sequentially outputting the data stored on the buffer section 30, and an allocation processing section 1404 for allocating the received data to any of the data storage sections 31 based on information representing the burstiness of the data received.

Based on the information representing the burstiness of traffic received by the input section 400, the allocation processing section 1404 determines whether or not to allocate the data to a pre-secured specific data storage section. For example, when the maximum amplitude value of the received traffic is larger than a preset threshold value, or when the transmission cycle or transmission interval is shorter than a preset threshold value, the allocation processing section 1404 secures one free data storage section 31 and stores the data on the data storage section 31.

Figure 41B:
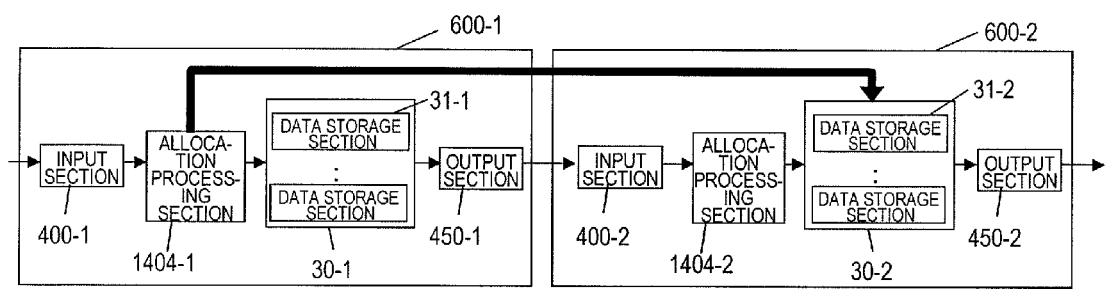
FIG. 41B shows a second example of schematic configuration of the router in the fourth embodiment.

The routers 600 may have a configuration shown in FIG. 41B. In the configuration shown in FIG. 41B, the allocation processing section 1404-1 allocates the data to a plurality of data storage sections 31-2 in a router 600-2, which is a transfer destination, instead of a router 600-1 of interest. This configuration may be adopted for, for example, bypassing data to a buffer section 30-2 of the router 600-2 as the transfer destination without having the data pass a buffer section 30-1 in the router 600-1. The allocation processing section 1404-1 allocates the received data to the pre-secured specific data storage section 31-2 in the router 600-2 as the transfer destination, based on the burstiness of the received data, like in the above-described example.

Owing to the above-described configuration, a highly bursty traffic uses the specific data storage section 31, and therefore, the interference with the other traffics is suppressed. As a result, the transfer delay of the traffics can be decreased.

In this embodiment, the information representing the burstiness is not limited to the above-described amplitude, transmission cycle or transmission interval of the traffic, and may be any other index. For example, a specific type of data (e.g., specific video or audio data) may be used as a bursty traffic. Information representing the burstiness may be measured by a measurement section in the router of interest, or may be attached to the data to be transmitted. For example, a bus master as a source may attach a flag which indicates that the data is highly bursty to the data before transmitting the data. Specifically, information representing the burstiness of the traffic may be provided in the header flit at the time of designing based on the traffic characteristic described above. An identifier indicating whether or not the traffic is a bursty traffic may be provided in the header flit so as to make the traffic distinguishable from the other traffics, so that each router can easily process the bursty traffic without observing the traffic characteristic.

In the following, first, a specific configuration of a router having a bypass function will be described, and also an embodiment in which a specific buffer queue is exclusively allocated to a bursty traffic in a router having a bypass function will be described. Next, an embodiment in which a specific buffer queue is exclusively allocated to a bursty traffic in a general router having no bypass function will be described. As seen from the latter example, a router according to the present disclosure does not absolutely need to include a bypass line.

Hereinafter, a specific configuration and operation in this embodiment will be described. This embodiment is different from the third embodiment in the configuration and operation of the bypass buffer 612 and the bypass buffer transmission management section 903. The following description will be given mainly regarding points different from those of the third embodiment, and overlapping points with those of the third embodiment will be omitted.

<1. Configuration and Operation of Router>
<1.1 Schematic Configuration of Router>

The physical configuration of the router in this embodiment is substantially the same as that shown in FIG. 29. In this embodiment also, a system having a multistage interconnection network shown in FIG. 3 is assumed. The configuration and operation described above with reference to FIG. 30 through FIG. 35 are applicable to this embodiment.

The bypass buffer 612, the input buffers 604 and the output buffers 606 in this embodiment each includes a buffer section including a plurality of buffer queues. Such a buffer section may be formed of virtual channels. In the case where the buffer is formed of virtual channels, a plurality of virtual circuits are constructed. In this embodiment, the buffer queues or the virtual channels each have a function of a data storage section according to the present disclosure.

<1.2. Operation of Flit Sorting Section>

Figure 42:
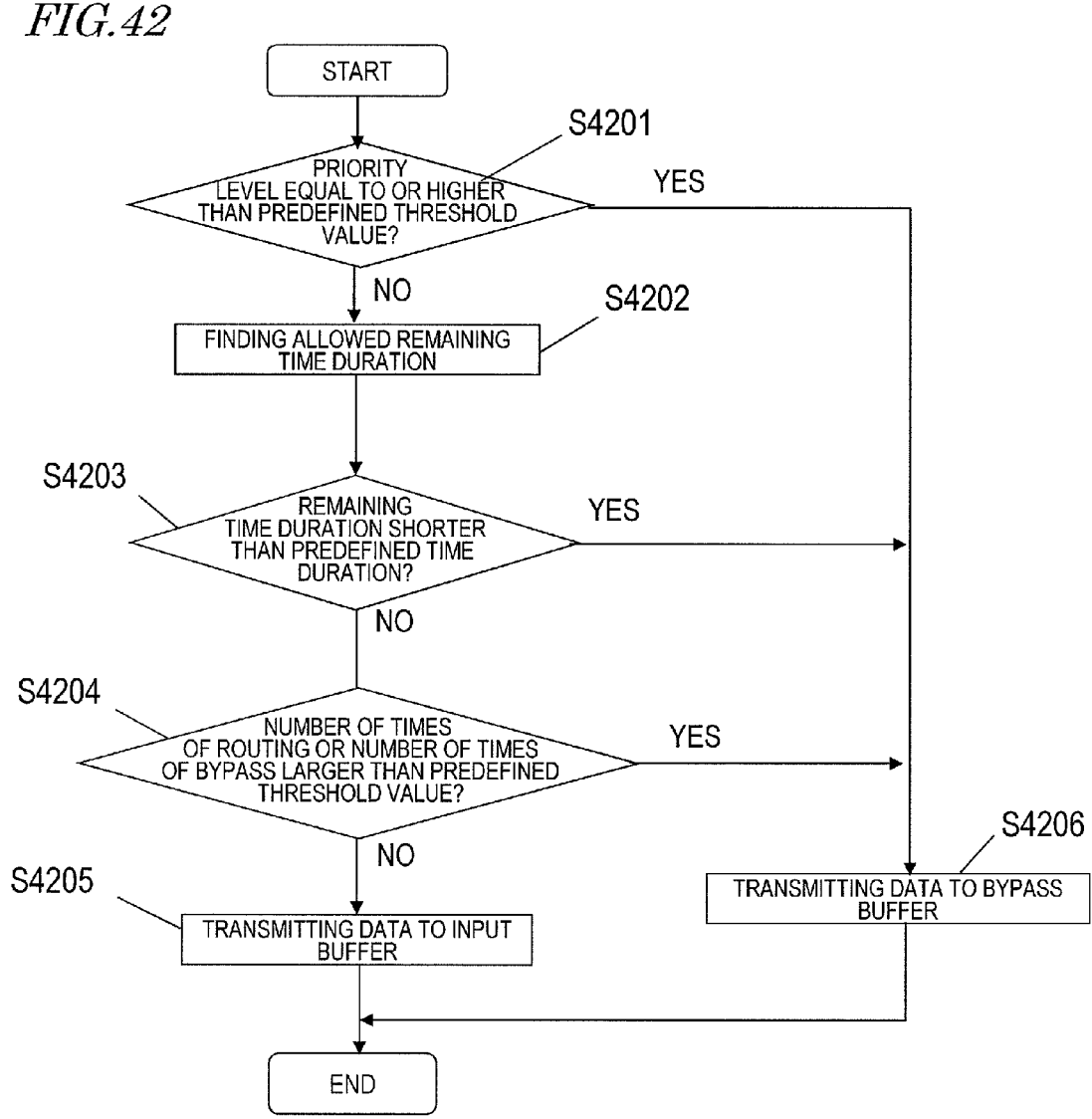
FIG. 42 shows a schematic process performed by the router in the fourth embodiment.

FIG. 42 is a flowchart showing an example of process performed by the flit sorting section 902 in this embodiment. Like in the third embodiment, the flit sorting section 902 determines whether or not to perform a bypass process based on the analysis results provided by the header flit interpretation section 901. First, in step S4201, the flit sorting section 902 first determines whether or not the value of the priority level described in the received flit is equal to or higher than a predefined threshold value. When the value of the priority level is equal to or higher than the threshold value, the process advances to step S4206, where the flit sorting section 902 transmits the flit to the bypass buffer 612. When the value of the priority level is lower than threshold value, the process advances to step S4202, where the flit sorting section 902 finds the remaining time duration allowed for completing the transmission. The remaining time duration is found by, for example, subtracting the current time from the time limit which is obtained from the time limit information described in the header flit. Next, in step S4203, the flit sorting section 902 determines whether or not the remaining time duration is shorter than a predefined threshold value. When the remaining time duration is shorter than the predefined threshold value, the process advances to step S4206, where the flit is transmitted to the bypass buffer. When the remaining time duration is equal to or longer than the predefined threshold value, in step S4202, the flit sorting section 902 determines whether or not the number of times of routing or the number of times of bypass of the flit is larger than a predefined threshold value. When the number of times of routing or the number of times of bypass is larger than the predefined threshold value, the process advances to step S4206, where the flit is transmitted to the bypass buffer. When the number of times of routing or the number of times of bypass is equal to or smaller than the predefined threshold value, the process advances to step S4205, where the flit is transmitted to the input buffer 604.

The operation of the flit sorting section 902 shown in FIG. 42 is merely exemplary, and the flit sorting section 902 does not need to operate as in the flow chart shown in the figure. For example, the flit sorting section 902 may make only one of the determinations in steps S4201, S4203 and S4204, or may make a determination based on any other information shown in FIG. 34.

<1.3. Configuration and Operation of Bypass Buffer and Bypass Buffer Transmission Management Section>
<1.3.1. Configuration of Bypass Buffer and Bypass Buffer Transmission Management Section>

Now, a configuration of the bypass buffer transmission management section 903 and the bypass buffer 612 will be described.

Figure 43:
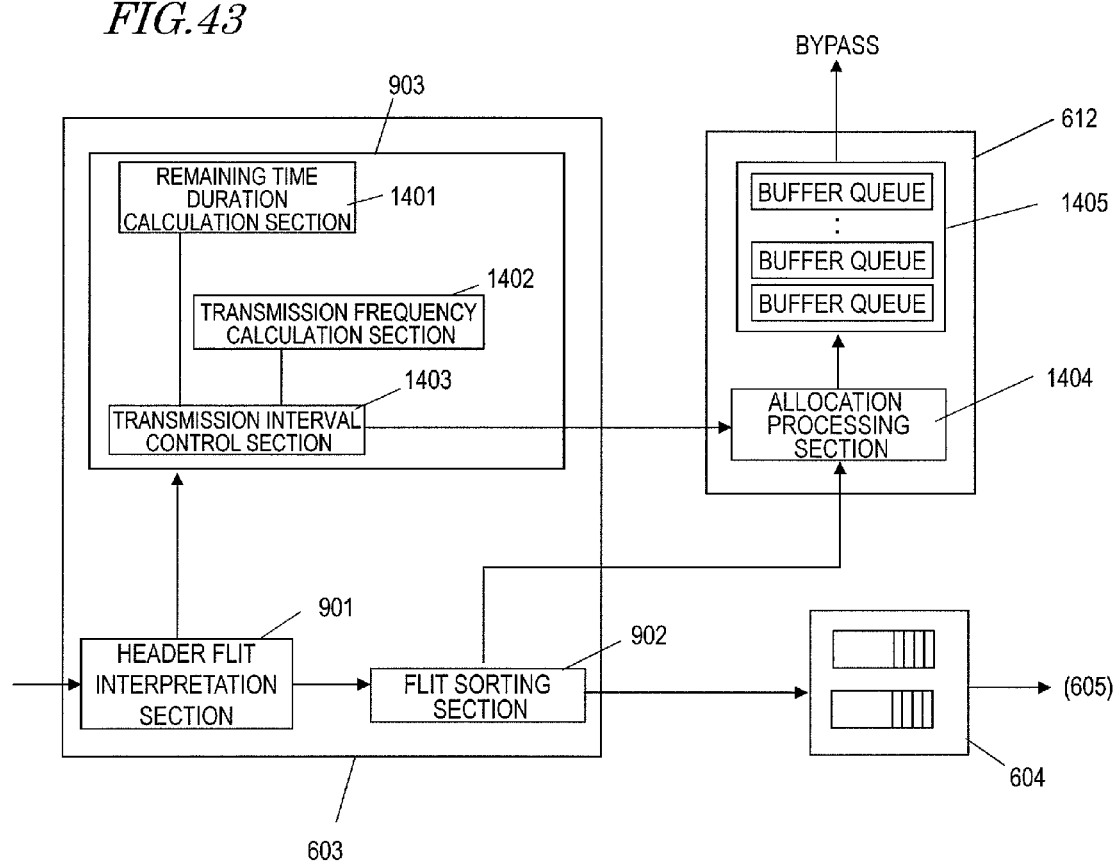
FIG. 43 shows a configuration of a buffer selection section in the router in the fourth embodiment.

FIG. 43 is a block diagram showing a detailed configuration of the bypass buffer transmission management section 903 and the bypass buffer 612 shown in FIG. 32. The bypass buffer 612 includes an allocation processing section 1404 and a buffer section 1405 including a plurality of buffer queues. In this embodiment, the buffer selection section 603 and the allocation processing section 1404 cooperate to realize a function of a bypass control section.

Traffic allocated to the bypass buffer 612 by the flit sorting section 902 is input to the allocation processing section 1404. The allocation processing section 1404 allocates the received traffic to the plurality of buffer queues based on information representing the burstiness of the traffic. In this embodiment, the allocation processing section 1404 is provided in the bypass buffer 612. Alternatively, the allocation processing section 1404 may be provided outside the bypass buffer 612. The buffer section 1405 is not limited to having the configuration shown in FIG. 43, and the buffer queues may be independently provided in a router which is a bypass destination. Alternatively, the buffer queues of the input buffer in another router which is a bypass destination may be shared with other traffics not to be bypassed.

When the traffic is highly bursty, the maximum amplitude value of the traffic is large, and the transmission interval or transmission cycle of the packets is short. Therefore, when a bursty traffic is transferred, the traffic interference is likely to occur, and the possibility that a transfer delay is caused is high. In this situation, the router in this embodiment appropriately allocate bypass traffics to the plurality of buffer queues in consideration of the burstiness of the bypass traffics, so as to suppress the traffic interference. Information on the traffic characteristic may be measured by the router of interest, or may be described in the header flit when the traffic is transmitted from the bus master as the information shown in FIG. 34 and interpreted by the router of interest.

The information representing the burstiness may be, for example, at least one of the transfer amount per unit time, transmission cycle, transmission interval, number of packets transferred continually, and time delay. The information representing the burstiness may be at least one of the permissible throughput and permissible time delay of the data. The permissible throughput is also represented as the transfer amount per unit time, transmission cycle, transmission interval, or number of packets transferred continually, and is defined for each bus master at the time of designing as a value which needs to be fulfilled as a designing request value. The permissible time delay is represented as a transfer time delay of a one-way or roundtrip transmission path, which includes a routing delay, a processing delay and the like. The permissible time delay is also defined for each bus master as a value which needs to be fulfilled as a designing request value.

As described above, the data can be determined as having burstiness in at least one of the cases where the transfer amount per unit time of the data is larger than a predefined threshold value, where the transmission cycle of the data is shorter than a predefined threshold value, where the transmission interval of the data is shorter than a predefined threshold value, where the number of packets transferred continually is larger than a predefined threshold value, and where the permissible time delay of the data is shorter than a predefined threshold value. A case where bursty data is transmitted is, for example, a case where data having a short permissible time delay such as video, audio, or control data is packetized and transmitted as many continuous packets from the same bus master.

Whether or not the data transmitted from the bus master has burstiness is determined by the bus master-side NIC 620a shown in FIG. 4 based on any of the above-described determination criteria, and the data can be transferred with information indicating whether or not the data has burstiness being provided in the header flit. Owing to this, the header flit interpretation section 901 can determine whether or not the data has burstiness based on the contents of the header flit. Therefore, each router can perform a routing process in accordance with whether or not the data has burstiness.

The information representing the burstiness does not absolutely need to be transmitted, together with the data, as information representing the permissible throughput or permissible time delay. For example, the information representing the burstiness may be transferred, together with the data, in the form of an identifier specifying the burstiness, a priority level of the data, or an identifier specifying a transmission node. For example, a bursty traffic may be made distinguishable by setting the threshold of the priority level at a specific value (high value) or by attaching an identifier which specifies a transmission node (bus master) for transmitting the bursty traffic. In this embodiment, the method of providing the information which represents the burstiness is not limited to any specific method.

The bypass buffer transmission management section 903 includes a remaining time duration calculation section 1401 for calculating a time duration remaining for transferring traffic, a transmission frequency calculation section 1402 for calculating transmission frequency of traffic from each buffer queue of the buffer section 1405 based on the calculated remaining time duration, and a transmission interval control section 1403 for controlling the transmission interval from each buffer queue of the buffer section 1405 based on the calculated transmission frequency. In this embodiment, the bypass buffer transmission management section 903 has a function of a transmission management section and a measurement section according to the present disclosure. A specific operation of each section of the bypass buffer transmission management section 903 will be described later.

<1.3.2. Allocation Operation of Traffics to Buffer Queues>

Figure 44:
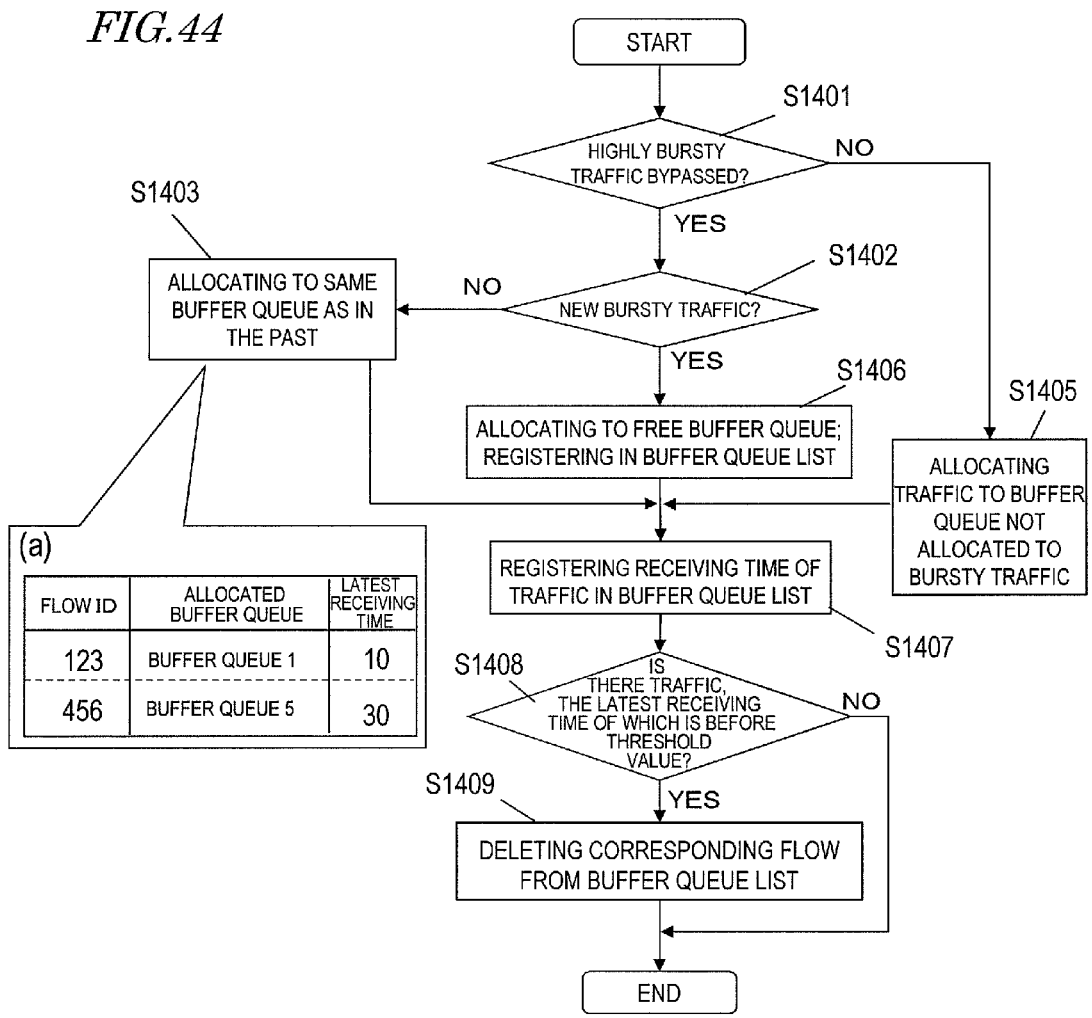
FIG. 44 shows a procedure of operation of the buffer selection section in the fourth embodiment.

FIG. 44 shows a flowchart showing an operation of allocating data to the plurality of buffer queues. The allocation processing section 1404 allocates the received data to the buffer queues of the buffer section 1405 based on the burstiness of the received data.

First, in step S1401, the allocation processing section 1404 determines whether or not the traffic that has been determined to be bypasseed is highly bursty (bursty traffic). Whether or not a traffic is highly bursty is determined based on the information included in the header flit analyzed by the header flit interpretation section 901 (FIG. 35) or based on the measurement result of the maximum amplitude value of the like of the traffic. When the information included in the header flit is utilized, the allocation processing section 1404 may make the determination based on the analysis results provided by the header flit interpretation section 901. By contrast, when the measurement result is utilized, the system may be configured such that, for example, the bypass buffer transmission management section 903 measures the amplitude of the traffic (transmission amount of data per unit time), transmission cycle, transmission interval or the like and the result is received by the allocation processing section 1404. Alternatively, the allocation processing section 1404 itself may have such a measurement function. The allocation processing section 1404 may be configured to compare the measurement result against a preset threshold value and determine whether or not the received traffic is a bursty traffic based on the comparison result.

When the traffic is determined as not being a bursty traffic, the process advances to step S1405, where the allocation processing section 1404 allocates the data to a buffer queue which is not allocated to a bursty traffic. By contrast, when a highly bursty traffic has been determined to be bypassed, the process advances to step S1402, where the allocation processing section 1404 determines whether or not the received bursty traffic is a newly received bursty traffic. When the traffic is a bursty traffic already received, the process advances to step S1403, where the allocation processing section 1404 allocates the traffic to a buffer queue to which the traffic was allocated in the past. When the received bursty traffic is a newly received traffic, the process advances to step S1406.

The allocation of the traffics to the buffer queues is managed, for example, as follows. The allocation processing section 1404 has a buffer queue list (data storage section utilization information) showing which bursty traffic was allocated to which buffer queue. FIG. 44(a) shows an example of content of the buffer queue list at one point in time. The correspondence between the flow IDs of the traffics and the buffer queues to which the traffics are allocated is managed by the buffer queue list. By referring to the buffer queue list, the allocation processing section 1404 determines whether or not the traffic is a newly received traffic. In the buffer queue list, information representing the latest receiving time is also registered. As described later, the latest receiving time is used for an operation of releasing the buffer queue list. In the example of buffer queue list shown in FIG. 44(*a*), the latest receiving time is represented as the relative time from the reference time. The latest receiving time may be represented in any form.

In step S1406, the allocation processing section 1404 allocates the newly received traffic to a free buffer queue and newly registers the traffic to the buffer queue list. The routers may be configured such that when all the buffer queues have traffics allocated thereto, the newly received traffic waits in an adjacent router on the previous stage until one of the buffer queues becomes free.

When the received traffic is allocated to a buffer queue in any of steps S1403, S1405 and S1406, the process advances to step S1407, where the time at which the traffic was received is registered to the buffer queue list or updated. Then, in step S1408, it is determined whether or not the transmission of each bursty traffic is at a stop. Specifically, it is determined whether or not there is a bursty traffic which has not been transferred for a predetermined time duration, by a comparison between the latest transmission time of each flow registered in the buffer queue list and the current time. When the buffer queue list includes a traffic, the latest receiving time of which is before a predefined threshold value (e.g., the latest receiving time of which is at least 10,000 cycles before the current time), it is determined that the transmission of the bursty traffic is at a stop. In this case, in step S1409, the allocation processing section 1404 releases the buffer queue which has been allocated to the bursty traffic determined as being at a stop and makes the buffer queue available to another traffic. Specifically, the allocation processing section 1404 deletes the information of the flow corresponding to the traffic which is at a stop, from the buffer queue list. When there is no bursty traffic which has not been transferred for the predetermined time duration, it is determined that no transmission of bursty traffic is at a stop. Thus, the process is terminated with no buffer queue being released.

In the above description, each router autonomically releases the buffer queue. The operation of releasing the buffer queue is not limited to the above. For example, the transmission-side NIC or bus master may notify each router that the transmission of the target bursty traffic has been finished, and each router which received the notification may delete the target flow from the buffer queue list.

The method of determining whether or not a traffic has burstiness is not limited to the above. Such a determination may be made in consideration of, for example, the influence on other traffics at the time of designing. For example, a traffic having a small maximum amplitude value but having a short transmission interval or transmission cycle of packets, such as audio data, may be determined as a bursty traffic and processed as described above. It is not even necessary to transmit information representing the traffic characteristic such as the amplitude of the traffic. Any method which can distinguish a bursty traffic from other traffics may be used. For example, a bit flag representing that the traffic is a bursty traffic, or information representing the priority level, may be provided in the header flit, so that it is determined whether or not the traffic is a bursty traffic based on the value thereof.

Owing to the above-described configuration, the influence of a bursty traffic can be limited to being exerted on a specific buffer queue, unlike in a configuration using a conventional algorithm of the conventional round-robin method, by which bursty packets are sequentially allocated to all the buffer queues. As a result, even when the bursty traffic encounters a jam and the transfer delay is increased, the transfer delay of the entire system can be suppressed from increasing. In addition, according to this embodiment, unlike according to a conventional method, buffer queues are not steadily secured but a specific buffer queue is exclusively secured only while a bursty traffic flows and the buffer queue is released when the flow stops. Therefore the utilization efficiency of the buffer queues is increased, and the transfer efficiency of the system is improved.

<1.3.3. Operation of Bypass Buffer Transmission Management Section>

Figure 45:
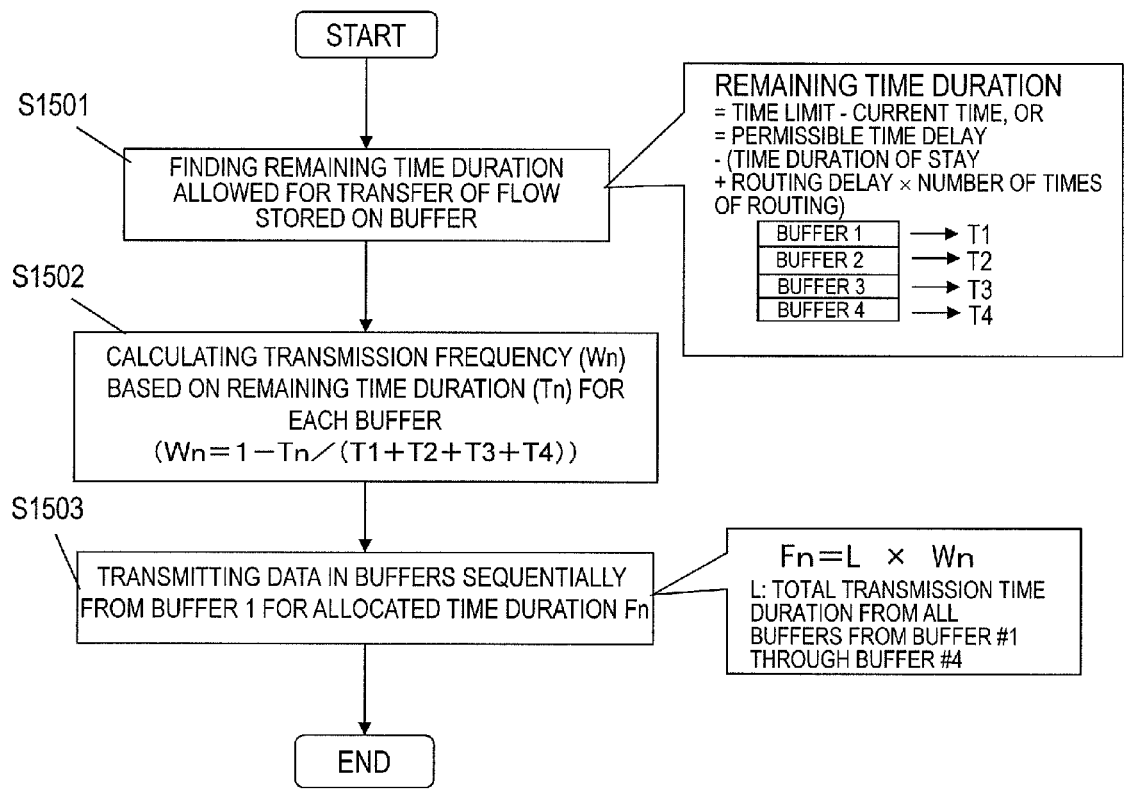
FIG. 45 shows a process performed by a bypass buffer transmission management section in the fourth embodiment.

Now, an operation of the bypass buffer transmission management section 903 will be described. FIG. 45 is a flowchart showing an operation performed by the bypass buffer transmission management section 903. The bypass buffer transmission management section 903 performs scheduling of transmission from each buffer of the bypass buffer 612 based on the remaining time duration allowed for transferring a traffic which is a target of routing.

In the case where the plurality of buffer queues store different traffic, the bypass buffer transmission management section 903 determines from which buffer queue the data is to be transmitted. The bypass buffer transmission management section 903 selects a buffer queue from which data is to be output based on, for example, information representing the priority level or emergency level of the traffic, and determines an order by which the data is output from the buffer queues. The bypass buffer transmission management section 903 may output the traffics from the traffic having a highest level of burstiness. In the following example, the order by which the data is output is determined based on the remaining time duration allowed for each piece of data.

As described above, the bypass buffer 612 includes a plurality of buffer queues, and traffic is temporarily stored on the buffer queues of the bypass buffer 612. Regarding the traffic stored on the bypass buffer 612, the transmission schedule is adjusted based on the remaining time duration allowed for each piece of traffic to arrive at the destination. Then, the traffic is output to the output buffer 606. A specific procedure of adjusting the transmission schedule will be described below.

The remaining time duration calculation section 1401 shown in FIG. 43 finds the remaining time duration allowed for transferring each piece of traffic stored on the bypass buffer 612 (S1501). The remaining time duration is found by any of the following methods.

$$\text{Remaining time duration} = \text{time limit} - \text{current time} \quad (1)$$

$$\begin{aligned}\text{Remaining time duration} = &\text{permissible time delay} - \\ &(\text{time duration of stay} + \text{routing delay} \times \text{number of} \\ &\text{times of routing})\end{aligned} \quad (2)$$

The time limit and the time duration of stay (time duration of stay at each buffer queue of the bypass buffer) are elements described in the header flit shown in FIG. 35. The current time is the time at which the router of interest received the traffic. The permissible time delay is the maximum time delay which is permissible in an application defined between the transmission and receiving nodes. The permissible time delay may be described in the header flit or may be defined and registered for each router at the time of designing. The routing delay is the time delay caused by routing which is required each time the data passes a router. Specifically, a fixed value (e.g., four cycles) may be set as the routing delay per router. The remaining time duration is calculated from such information by use of either one of expressions (1) or (2). The time duration of stay in expression (2) is an accumulated amount of time delays caused in the buffer queue of the bypass buffer in the routers that the flit passed until arriving at the router of interest. The "routing delay×number of times of routing" represents the time delay caused while the data is transferred from the router of interest to the receiving node as the destination via the input buffer by a usual process (total sum of the time required by the transfer process and the wait time at the buffer). A sum of the time duration of stay and (routing delay×number of times of routing) is defined as a delay caused by a routing process while the data is transferred from the transmission node to the receiving node. The number of times of routing from the router of interest to the receiving node is found by subtracting the number of times of routing described in the header flit from the number of routers that the data passed while being transferred from the transmission node to the receiving node.

The remaining time duration may be obtained by expression (1) or (2) above, but instead, the remaining time duration may be a value obtained by subtracting a prescribed time duration which is determined by a packet length, from the remaining time duration calculated by use of expression (1) or (2) above. In this case, even where there are both a long packet and a short packet, the remaining time duration can be found more accurately.

Next, the transmission frequency calculation section 1402 calculates the transmission frequency (Wn) based on the remaining time duration (Tn) for each buffer queue (S1502). Herein, n is the buffer queue number. In the case where the bypass buffer 612 includes four buffer queues, the calculation expression for finding Wn may be, for example, expression (3).

$$Wn=1-Tn/(T1+T2+T3+T4) \quad (3)$$

By such a definition, as the remaining time duration for a buffer queue is shorter, the transmission frequency from that buffer queue is made higher.

The total transmission time duration of data from all the buffer queues from buffer queue #1 through buffer queue #4 is L. The time duration required to transfer data from all the buffer queues from buffer queue #1 through buffer queue #4 is set as one cycle. The transmission time duration Fn allocated for transmission from each buffer queue in one cycle is defined by the following expression (4).

$$Fn=L\times Wn \quad (4)$$

Based on the above expression (4), the transmission interval control section 1403 calculates the time duration Fn allocated to each buffer queue sequentially for buffer queue 1, and transmits the data from each buffer queue for the allocated time duration Fn (S1503).

In this embodiment, the above-described scheduling is performed from the viewpoint of guaranteeing the performance of completing the data transfer within a predetermined time duration. The scheduling may be performed with attention being paid to any of the evaluation items shown in FIG. 35. Specifically, transmission may be performed in the order from the data having a shortest time limit, from the data having a longest bypass buffer time duration of stay, or from the data having a largest number of time of routing. Such a method can alleviate the variance in the transfer delay among the flows. The transmission time duration of each traffic may be found by use of the time limit, time duration of stay, or number of times of routing, instead of Tn. In the case where the time limit is used, the difference between the time limit and the current time is found and the difference is used as the remaining time duration, as described above.

Figure 46:
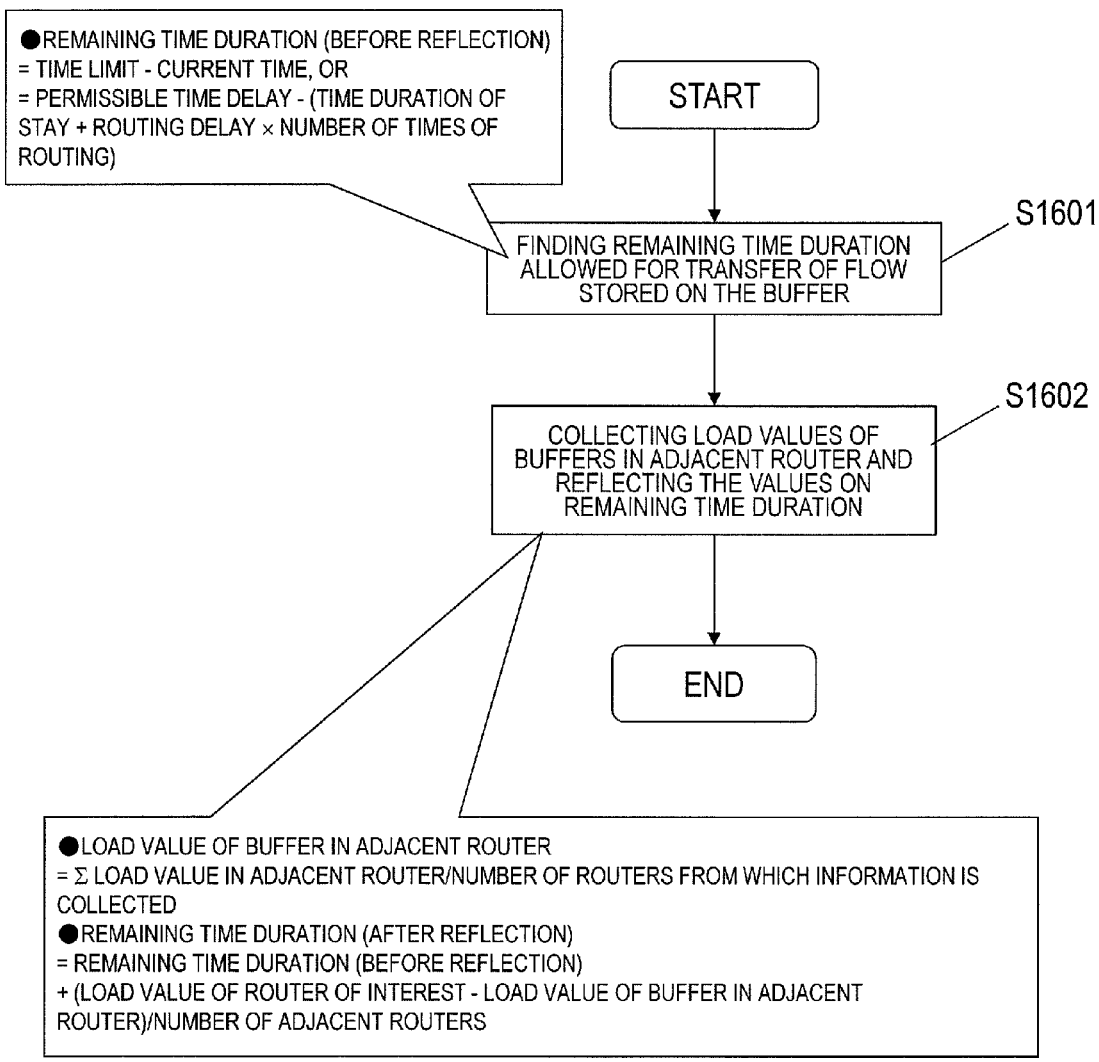
FIG. 46 shows a method of dynamically correcting a selection criterion used by a flit sorting section in the fourth embodiment.

FIG. 46 shows a method for dynamically correcting the selection criterion used by the flit sorting section 902. FIG. 46 shows a method of calculating the remaining time duration by use of wait time at the bypass buffer in another router as well as the wait time at the bypass buffer in the router of interest. In this manner, the remaining time duration can be calculated in consideration of the lack of balance of the jam among the routers.

First, like in the example shown in FIG. 45, the remaining time duration allowed for transferring the data stored on the buffer is found (S1601). Next, load values of adjacent routers are collected and reflected on the remaining time duration (S1602). Specifically, information on the wait time at the bypass buffers in the adjacent routers is collected, and an average value thereof is set as the load value of the buffers in the adjacent routers. The load value of the buffers in the adjacent routers is represented by the following expression (5).

Load value of the buffers in the adjacent routers=Σ (load value of the buffers in the adjacent routers)/(number of routers from which information is collected) (5)

The remaining time duration found in the example shown in FIG. 46 is set as the remaining time duration (before reflection). A difference between the load value of the router of interest and the load value of the adjacent routers is obtained. The difference is normalized by the load value of the router of interest, and a total sum of such normalized values is obtained. The sum is divided by the number of the adjacent routers to be averaged. The averaged value is multiplied by the remaining time duration (before reflection). The result is the remaining time duration (after reflection) obtained in consideration of the load amount of the entire system. The remaining time duration (after reflection) is represented by the following expression (6).

Remaining time duration(after reflection)=remaining time duration(before reflection)+remaining time duration(before reflection)×Σ(load value of the router of interest−load value of the adjacent routers)/(load value of the router of interest× number of the adjacent routers) (6)

The load information collected from other routers may be the free capacity or used amount of the buffer, instead of the wait time at the buffer. The wait time at the bypass buffer may be the average value or the peak value. In the above description, the load information is collected from the adjacent routers. Alternatively, the load information may be collected from other routers which are not adjacent.

Figure 47:
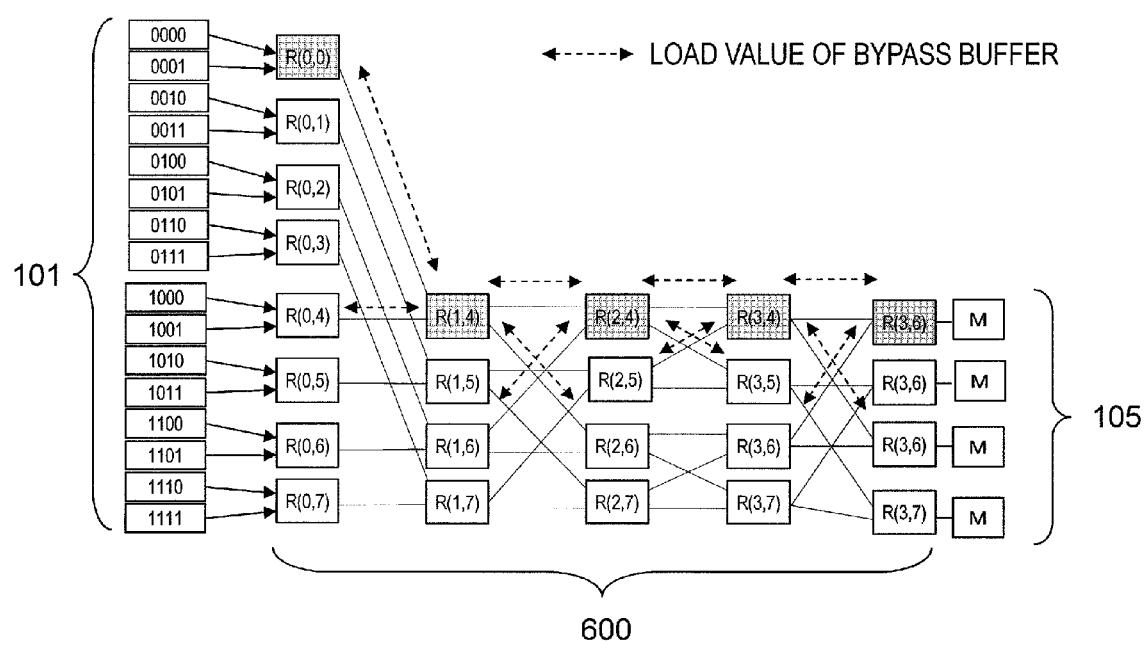
FIG. 47 shows an example of transmitting load value information in the fourth embodiment.

FIG. 47 shows an example of transmitting load value information. In this example, a system configuration of a butterfly network is assumed for the sake of explanation. Each router of interest notifies each router connected thereto of information on the wait time at the bypass buffer thereof (load value of the router of interest). The notification interval may be constant or may be determined based on the magnitude of the load of the router of interest. When the load of the router of interest is large, it may be determined that the load amount of the bypass buffers in the entire system is large and thus the notification interval may be made short. By contrast, when the load of the router of interest is small, the notification interval may be made long in order to suppress the overhead caused by the notification.

The notification range is set as follows according to a preferable design: when the load of the each router is large, the notification range is made large in order to decrease the load amount of the bypass buffers in the entire system quickly; and by contrast, when the load of the each router is small, the notification range is made small in order to suppress the overhead caused by the notification. The notification range may be specified by, for example, the following method. A router for sending the notification describes, in the header flit, the number of routers to which the notification is to be sent, and the value of the number of routers is subtracted each time the notification passes the router.

The notification direction may be limited to toward the bus master which is the source or toward the memory which is the destination. In this manner, the message can be notified efficiently to a router having a high load value. Therefore, the notification messages can be decreased efficiently.

According to the method described in the above example, the router of interest notifies the message to other routers. Alternatively, the router of interest may notify a load state to other routers. The load values of the buffers in other routers are collected, and the remaining time duration allowed for the traffic at the router of interest is corrected by use of the collected load values. Thus, the lack of balance of the jam among the routers is decreased, and the transfer performance of the entire system can be improved. Owing to this, the throughput can be improved, and low-latency transfer can be realized.

In the above description, the elements of the router 600 are each represented as an individual functional block. Alternatively, the operation of the router 600 may be realized by execution of a program defining the processes of these functional blocks by use of a processor (computer) mounted on the router 600. A processing procedure of such a program is as shown in the flowcharts in, for example, FIGS. 42, 44, 45, and 46.

<2. Modification>
<2.1. Configuration with No Output Buffer>

In this embodiment also, the router 600b does not need to include any output buffer 606. As shown in FIG. 39, a configuration in which the router 600b does not include any output buffer 606, and the output of the crossbar switch 605 is input to the buffer selection section 603c in the adjacent router 600c on the subsequent stage may be adopted. Such a configuration can suppress the memory capacity and thus is effective when the data transfer system is incorporated into a specific apparatus.

<2.2 External Wiring>

In this embodiment also, lines may be provided so as to transfer the bypass traffic to the outside of the router 600b (external wiring) as shown in FIG. 40. According to the configuration using the internal wiring, the bypass process is closed for each router. Therefore, the router is highly reusable as a processing module. Namely, each individual router can be replaced as one component. However, since the data needs to pass all the routers up to the destination, overhead of the process is likely to occur. By contrast, according to the configuration using the external wiring, the router is not as highly reusable as a processing module as in the case of the internal wiring. However, since the data does not need to pass all the routers up to the destination, overhead of the process can be decreased.

<2.3. Configuration with No Bypass Buffer>

Figure 48A:
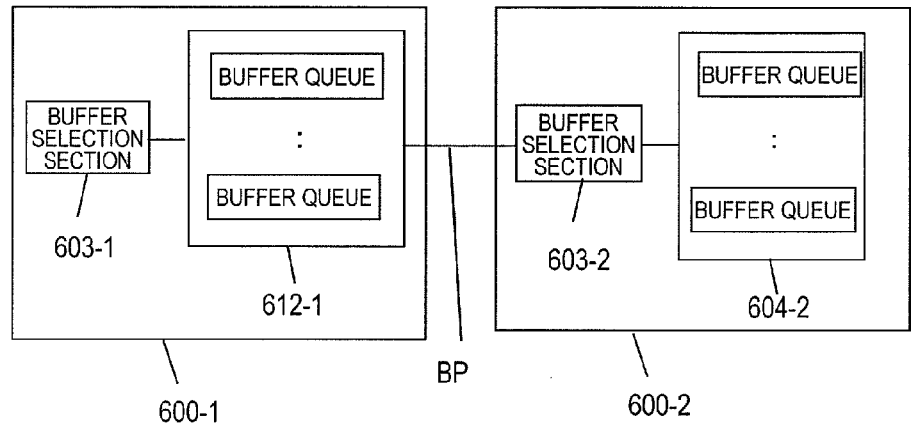
FIG. 48A shows an example of configuration in the case where a bursty traffic is allocated to a buffer queue of a bypass buffer of the router in the fourth embodiment.
Figure 48B:
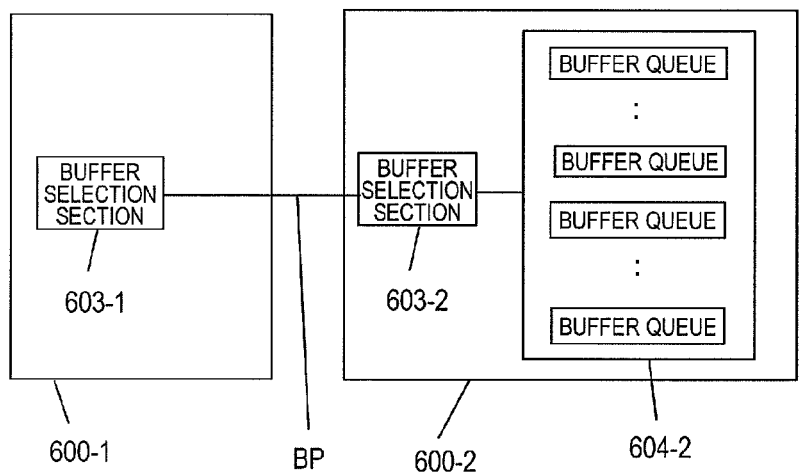
FIG. 48B shows an example of configuration in the case where a bursty traffic is allocated to a buffer queue of an input buffer in a router as a destination in the fourth embodiment.
Figure 48C:
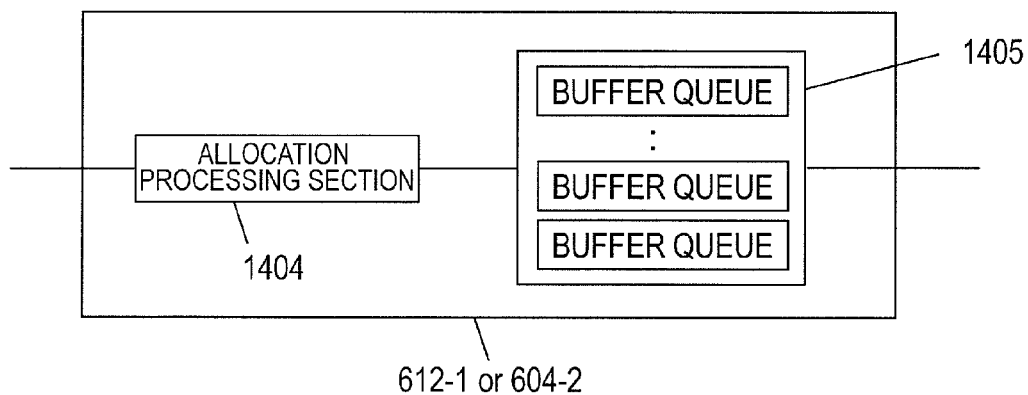
FIG. 48C shows an example of configuration of the bypass buffer or the input buffer in the fourth embodiment.

In this embodiment, each router includes the bypass buffer 612. However, the bypass buffer 612 is not an indispensable element. In the case where the bypass buffer 612 is not provided, the system may be configured to include buffer queues for bypass traffics in the input buffer in a router which is a bypass destination. FIG. 48A through FIG. 48C shows a schematic configuration with the bypass buffer 612 and a schematic configuration without the bypass buffer 612.

FIG. 48A shows a schematic configuration of two routers 600-1 and 600-2 connected to each other via a bypass path BP in the case where each router in the system includes the bypass buffer 612 as preconditioned in the above description. In the figure, the elements of the router 600-1 are represented by the respective reference numeral with "-1", and the elements of the router 600-2 are represented by the respective reference numeral with "-2". As described above, a bypass traffic is stored on a buffer queue of the bypass buffer 612 in the router 600-1 of interest and then is input to the router 600-2 which is the transfer destination.

FIG. 48B shows an example of configuration in the case where the bypass buffer 612 is not provided, and the input buffer 604-2 in the router 600-2 is shared by bypass traffics and non-bypass traffics. In this example of configuration, a traffic bypassed by the router 600-1 of interest is stored on a buffer queue of the input buffer 604-1 in the router 600-2 as the transfer destination. In this manner, each router of interest may use the input buffer of the router 600-2 as the bypass destination, instead of including an output buffer in the router 600-1 of interest.

FIG. 48C shows a configuration of a bypass buffer 612-1 or the input buffer 604-2 for storing a bypass traffic. In the configuration shown in FIG. 48A, as described above, the allocation processing section 1404 and the buffer 1405 including a plurality of buffer queues are provided in the bypass buffer 612-1. By contrast, in the case where the configuration shown in FIG. 48B is adopted, the above-described allocation processing can be realized as long as the allocation processing section 1404 and the buffer 1405 including a plurality of buffer queues are provided in the input buffer 604-2.

In the configuration shown in FIG. 48A, the usability of the router is raised, but the buffer used amount is increased. By contrast, in the configuration shown in FIG. 48B, the usability of the router is decreased, but the buffer used amount can be decreased.

<2.4. Configuration in which Bypass Process is not Performed>

In the above description, each router performs a bypass process of processing a part of the traffics with priority by, for example, the bypass determination process shown in FIG. 42. A router in this embodiment does not absolutely need to perform such a bypass process. Even in the case where a general router configuration with neither the bypass line nor the bypass buffer 612 is used, it is sufficient that the system is configured to exclusively allocate the received traffic to a specific buffer queue based on the burstiness of the received traffic. Hereinafter, an example in which the process performed by the allocation processing section 1404 and the transmission interval control section 1403 described above is applied to a general router including neither the bypass line nor the bypass buffer 612 will be described.

Even a general router, as in the configuration shown in FIG. 29, includes the routing processing section 607 for analyzing a header flit and determining the output ports, a buffer allocator 608 for determining buffer queues of the input buffers in an adjacent router which is a transfer destination (or buffer queues of the output buffers in the router of interest), and a switch allocator 609 for selecting one set of buffer queue and output buffer from sets of the buffer queues of the input buffers and the output buffers, the correspondence of which has been defined, in order to transfer the traffic. The router further includes input buffers 604 for storing data received from the adjacent router 600a and output ports 617 for outputting data to the adjacent router 600c. However, the router includes none of the bypass buffer 612 and the bypass lines BP1 and BP2.

In such a router, the above-described allocation process and scheduling process may be applied as follows. First, the function of the allocation processing section 1404 shown in FIG. 43 is added to the buffer allocator 608 shown in FIG. 29. The function of the transmission interval control section 1403 shown in FIG. 43 is added to the switch allocation 609 shown in FIG. 29. The buffer allocator 608 may find the remaining time duration as in step S1602 shown in FIG. 46, and may define a correspondence between the output ports and the buffer queues in an order from the traffic having a shortest remaining time duration. The switch allocator 609 may process the traffics in an order from the traffic having a highest level of burstiness.

Figure 49:
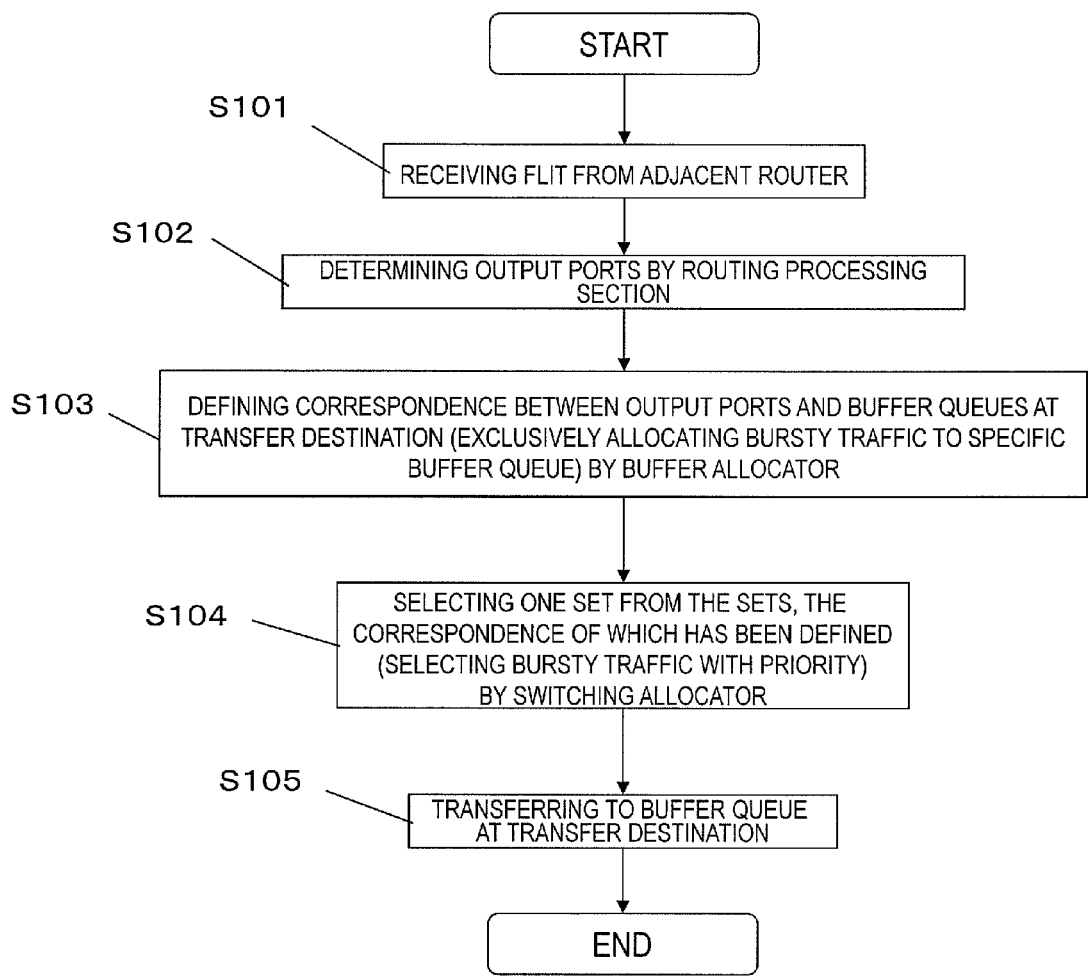
FIG. 49 shows a procedure of process performed by a router with no bypass function in the fourth embodiment.

FIG. 49 is a flowchart showing an example of operation performed by such a router. The router 600b first receives a flit from the adjacent router 600a (S101). Next, the routing processing section 607 analyzes the header flit and determines the output ports 617 (S102). Then, the buffer allocator 608 defines a correspondence between the output ports 617 and the buffer queues of the input buffers in the adjacent router 600c as the transfer destination (or the buffer queues of the output buffers 606 in the router 600b of interest) (S103). As a method for allocating a buffer queue, the method described with reference to FIG. 44 by which a specific buffer queue is exclusively allocated to a bursty traffic is used. Next, the switch allocator 609 selects one set of buffer queue and output buffer from sets of the buffer queues and the output buffers, the correspondence of which has been defined (S104). According to one selection method, a traffic having a higher level of burstiness is selected with priority. According to another method, as described above with reference to FIG. 45, one set may be selected based on the allowed remaining time duration. Alternatively, one set used for transmission may be selected by use of the information on the time limit, time duration of stay, number of times of routing or the like described in the header flit. In the final step, the data is transferred from the selected buffer queue in units of flit or packet (S105).

Figure 50:
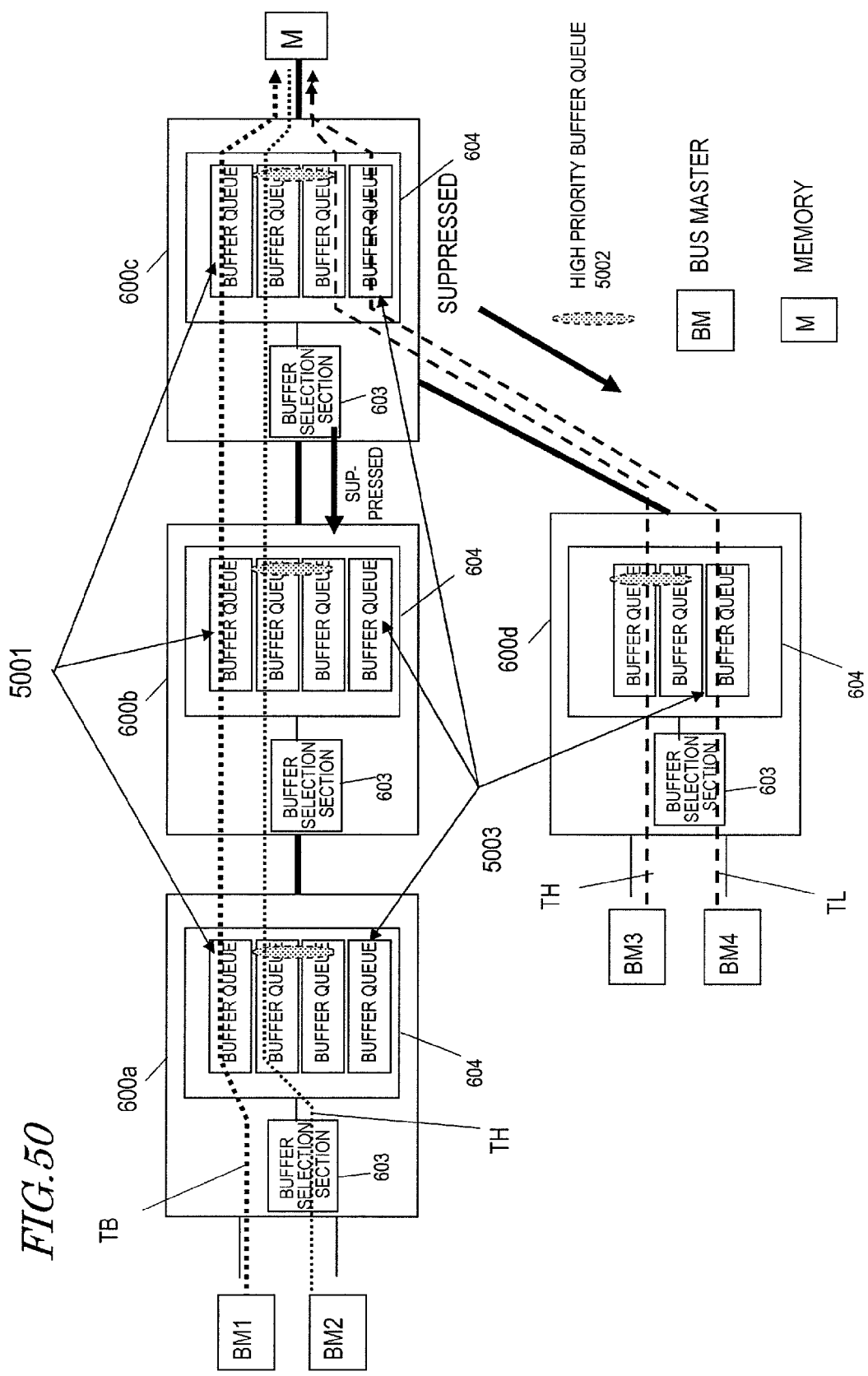
FIG. 50 shows an example of operation of allocating a buffer queue in accordance with the priority level in the fourth embodiment.

Next, FIG. 50 will be referred to. FIG. 50 shows a specific example in which a plurality of bus masters BM1 through BM4 are connected to a memory M via a plurality of routers 600a through 600d. In this example, it is assumed that a dedicated buffer (input buffer 604) in each router on the transmission paths is allocated to each bursty traffic, so that bypass paths are set. The buffer queues of the input buffer 604 which are allocated by each router on the transmission paths from the bus masters to the memory corresponds to bypass paths.

In the example of configuration shown in FIG. 50, four bus masters, namely, bus master BM1 for transferring a bursty traffic TB, bus masters BM2 and BM3 for transferring a high priority traffic TH, and bus master BM4 for transferring a low priority traffic TL are provided. The input buffer 604 in each router includes a buffer queue 5001 for a bursty traffic, a buffer queue 5002 for a high priority traffic, and a buffer queue 5003 for a low priority traffic. In this example, there is one type of bursty traffics. In the case where there are a plurality of types of bursty traffics, each router may include a plurality of independent buffer queues for bursty traffics, or a plurality of bursty traffics may share one buffer queue. In order to suppress the traffic interference among the plurality of bursty traffics, a physically independent path may be prepared to construct a transmission path.

In each router, the buffer queues are allocated to the traffics in an order of the bursty traffics, which have the highest priority level, the high priority traffics, and then the low priority traffic. A specific allocation process of the input buffers 604 is a process of determining the buffer queues of the input buffer in the adjacent router as the transfer destination (or the buffer queues of the output buffer of the router of interest) (VA) described above with reference to FIG. 30, and is executed by the buffer allocator 608 based on the priority level described above.

These buffer queues are configured based on priority queue/priority scheduling. Data in a high priority level buffer queue is transferred with priority, and data in a low priority level buffer queue cannot be transferred while there is data in the high priority level buffer queue. A specific data transfer procedure is a process (SA) described above with reference to FIG. 30, namely, a process of selecting one set of buffer queue and output buffer from the sets of buffer queues and output buffers, the correspondence of which has been defined. This process is executed by the switch allocator 609 based on the priority level described above.

A bursty traffic TB is allocated to a buffer queue, in each router on the path to the memory M, having a highest priority level and is transferred to the memory with the highest priority. By contrast, the transfer of a high priority traffic TH and a low priority traffic TL each having a priority level lower than that of the bursty traffic TB is suppressed until the transfer of the bursty traffic TB is completed, based on the priority scheduling. Specifically, this state corresponds to a case described above with reference to FIG. 30 in which when the buffer allocator 608 issues an allocation request for an input buffer to a router as the transfer destination, the router as the transfer destination rejects the buffer allocation request.

In the example shown in FIG. 50, when data is transferred from the buffer queue 5001 in the router 600c for bursty traffics, transfer of the high priority traffic and the low priority traffic is suppressed. When the buffer queue 5002 for high priority traffics and the buffer queue 5003 for low priority traffics are full, an instruction may be issued sequentially to an immediately previous router, or a router or a bus master as the source of the data to suppress data transfer. The router or bus master instructed to suppress data transfer can alleviate the jam by stopping data transmission, decreasing the transmission amount of data, or changing the transfer destination of data, i.e., the memory. This state corresponds to the case described above in which when the buffer allocator 608 issues an allocation request for an input buffer to a router as the transfer destination, the router as the transfer destination rejects the buffer allocation request.

Whether or not a traffic is bursty can be determined based on, for example, at least one of the allowed remaining time duration obtained from the information on the time included in the packet, priority level of the routing process, and information representing the burstiness. The packet information to be interpreted by each router may be in the form of an identifier usable for specifying the burstiness, a priority level of the data, or an identifier specifying a transmission node for transmitting a bursty traffic (determined at the time of designing) as described above.

The characteristic representing the burstiness may be determined based on at least one of the transfer amount per unit time, transmission cycle, transmission interval, number of packets transferred continually, and time delay. Specifically, the data is characterized as having burstiness in at least one of the cases where the transfer amount per unit time of the data is larger than a predefined threshold value, where the transmission cycle of the data is shorter than a predefined threshold value, where the transmission interval of the data is shorter than a predefined threshold value, where the number of packets transferred continually is larger than a predefined threshold value, and where the permissible time delay for the data is shorter than a predefined threshold value, as described above. The information representing the burstiness may be provided by use of the permissible throughput of data in each bus master or permissible time delay of data, which are parameters of specification required at the time of designing.

Now, the relationship between the notification function of notifying that a bypass transfer is being performed and the flow control on a traffic performed by the buffer allocator 608 as an operation for securing an input buffer (process by which the router as the source notifies whether or not a buffer is available in the router as the destination, before the data transfer) will be described. It is assumed that while a bursty traffic is transferred from the router 600*c* immediately previous to the memory M to the memory M, transfer of a non-bursty traffic is blocked at the router 600*c* by the influence of the transfer of the bursty traffic, as described above. In this case, no buffer in the router 600*c* can be secured for the non-bursty traffic. In this situation, a case will be discussed where the router 600*b* (or the router 600*d*) closer to the bus master inquires of the router 600*c* immediately previous to the memory M whether or not a buffer can be secured, before transferring the non-bursty traffic. In this case, during the notification process in traffic flow control which is performed from the router 600*c* to the router 600*b* (or the router 600*c*) closer to the bus master, it is notified that no buffer can be secured. This notification process is the same as a notification process by which the router 600*c* immediately previous to the memory M notifies the router 600*b* (or the router 600*d*) closer to the bus master that the router 600*c* is performing the bypass process. Namely, as described above in the first embodiment, a notification process in flow control can be used also as the notification of information which represents that transfer cannot be made due to the bursty traffic (bypass notification in a wide sense). During the transfer of the bursty traffic (or while the bypass transmission path is in use), transfer of the non-bursty traffic is blocked. Therefore, in the configuration shown in FIG. 50, the router 600*c* informs the result of flow control performed on the non-bursty traffic (notification indicating that no buffer queue can be secured for the non-bursty traffic) to the router as the source of the data or the bus master sequentially, and instructs the router and bus master to suppress data transfer. In the final step, the bus master can determine whether or not to adjust the transmission amount of non-bursty traffic, or whether or not to stop/suspend the transmission thereof. In general, the above function of the router 600*d* and the router 600*c* may be realized by a part of process of a memory controller for controlling a memory such as a DRAM, an SRAM or the like.

The flow control on a traffic between routers adjacent to each other can be realized as follows. The buffer allocator 608 in the router as the transfer source issues an allocation request for an input buffer to the buffer allocator 608 in the router as the transfer destination. The buffer allocator 608 in the router as the transfer destination sends a response on whether or not the allocation of an input buffer in the router as the transfer destination is possible to the buffer allocator 608 in the router as the transfer source. The transfer amount of traffics between the routers adjacent to each other may be adjusted, for example, at the timing when the allocation request for an input buffer is sent or when the response on whether or not the allocation of an input buffer is possible is sent back.

Owing to the above-described processes, even a router with no bypass line can use buffer queues in accordance with the traffic characteristic or can transfer the traffic in consideration of the time allowed for packet transfer. Even in such a router, the selection criterion used by the flit sorting section 902 may be corrected dynamically. The type of the bursty traffics (e.g., audio data, video data or correspondence between and transmission node and the receiving node) may be identified, so that the correspondence between the output ports and the buffer queues of the router as the transfer destination may be defined. The correspondence between an output port and a specific buffer queue of the router as the transfer destination may be defined without identifying the type of bursty traffics.

<2.5. Other Topologies>

In the above description, the topology of the integrated circuit is a multistage interconnection network (FIG. 3). A router 600 in this embodiment is not limited to being used in a multistage interconnection network. For example, the router in this embodiment is usable in the mesh topology as shown in FIG. 12(*b*) in which the routers are arranged in a lattice, the Taurus-type topology as shown in FIG. 22A, or in the topology as shown in FIG. 22B in which buses are connected in a hierarchical manner. A router in this embodiment is usable in any topology in which a plurality of bus masters are connected via distributed buses, as well as in the above-described topologies.

(Exemplary Application 1)

Figure 51:
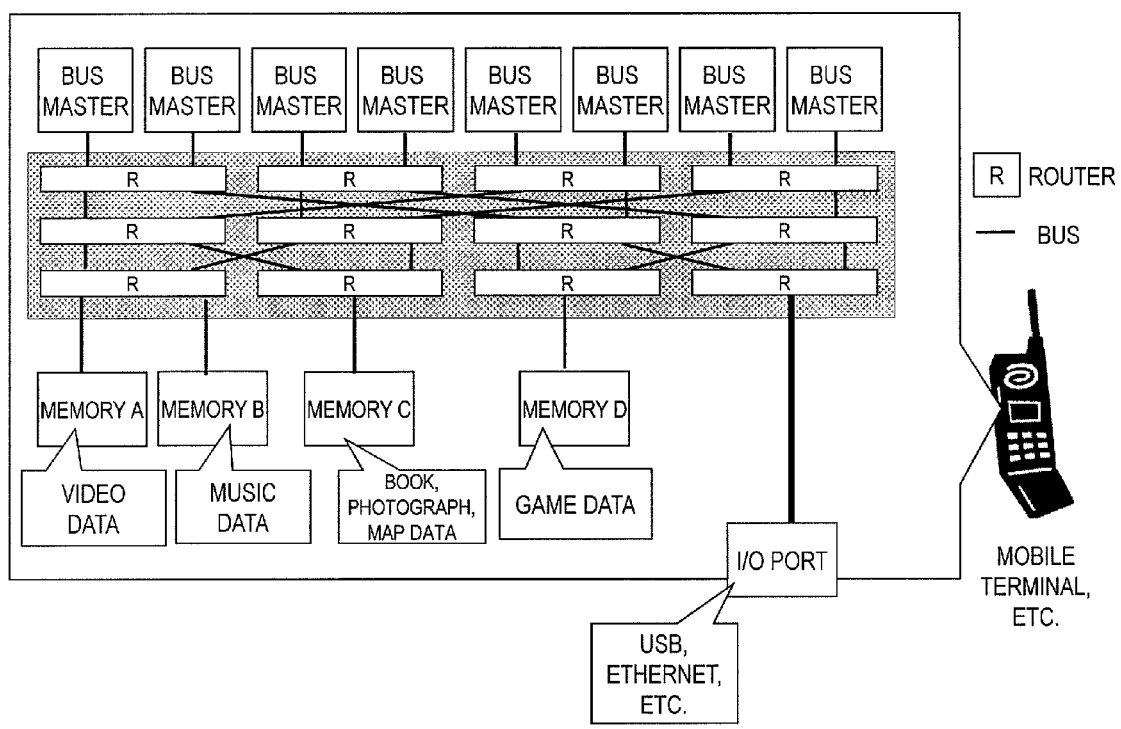
FIG. 51 shows an example of application of a router to a memory bus.

Hereinafter, exemplary applications of a router in each of the above embodiments to actual devices will be described. FIG. 51 illustrates an example in which multiple bus masters and multiple memories on a semiconductor circuit and common input/output ports (I/O ports) for exchanging data with external devices are connected together with distributed buses. Such a semiconductor circuit may be used in, for example, mobile terminals such as mobile phones, PDAs (personal digital assistants), electronic book readers and the like, and devices such as TVs, video recorders, camcorders, surveillance cameras and the like. The bus masters may be, for example, CPUs, DSPs, transmission processing sections or image processing sections. The memories may be volatile DRAMs or nonvolatile flash memories. The memories may each include a volatile memory and a nonvolatile memory. The input/output ports may be USB, Ethernet™ or any other communications interfaces to be connected to a storage device such as an external hard disc drive (HDD), a solid-state drive (SSD), a DVD drive or the like.

When multiple applications or services are used in parallel to each other (e.g., when multiple different video clips or musical tunes are reproduced, recorded or transcoded; when book, photograph or map data is viewed or edited; or when a game is played), bus masters will access memories more frequently. If there was only one memory to be accessed by the bus masters, those accesses would be overconcentrated at one point. In order to solve this, the input and output transmission ranges should be broadened on the memory side, which would increase the cost.

To avoid such overconcentrated memory accesses, it is effective to connect those bus masters and memories together with distributed buses, either by physically classifying the memories to be used by bus masters in accordance with the type of application or service or by using external storage devices such as an external HDD.

However, for example, if a bus master has transmitted a data packet to memory A at a high rate in order to save video data, all the buffers on the transmission path will be frequently occupied with the packets addressed to memory A. When this occurs, data will not flow to the other memories smoothly and the performances of the other applications or services will decline and the processing time will increase. This problem is caused because each router routes the incoming data packets while keeping the order of the packets.

By contrast, in the case where a router in any of the embodiments of the present disclosure is used, packets having a high emergency level or importance level are transferred with priority. Therefore, packets directed to a specific memory are prevented from occupying buffers. Owing to this, data important in applications or services can be transferred within the time limit. As a result, the applications or services can provide user responsiveness with certainty, and video and audio data can provide a good quality. Traffic interference between low priority level data and high priority level data can be suppressed, and thus the transfer efficiency of the entire system can be improved, and power savings can be realized. Especially when the data transfer is delayed more than having been expected at the time of designing, important data can be transferred with priority as a measure in the case of emergency. This is also effective as a measure against the case where the system is overloaded beyond expectations.

(Exemplary Application 2)

Now, an exemplary application of a router in each of the above embodiments to a multi-core processor will be described.

Figure 52:
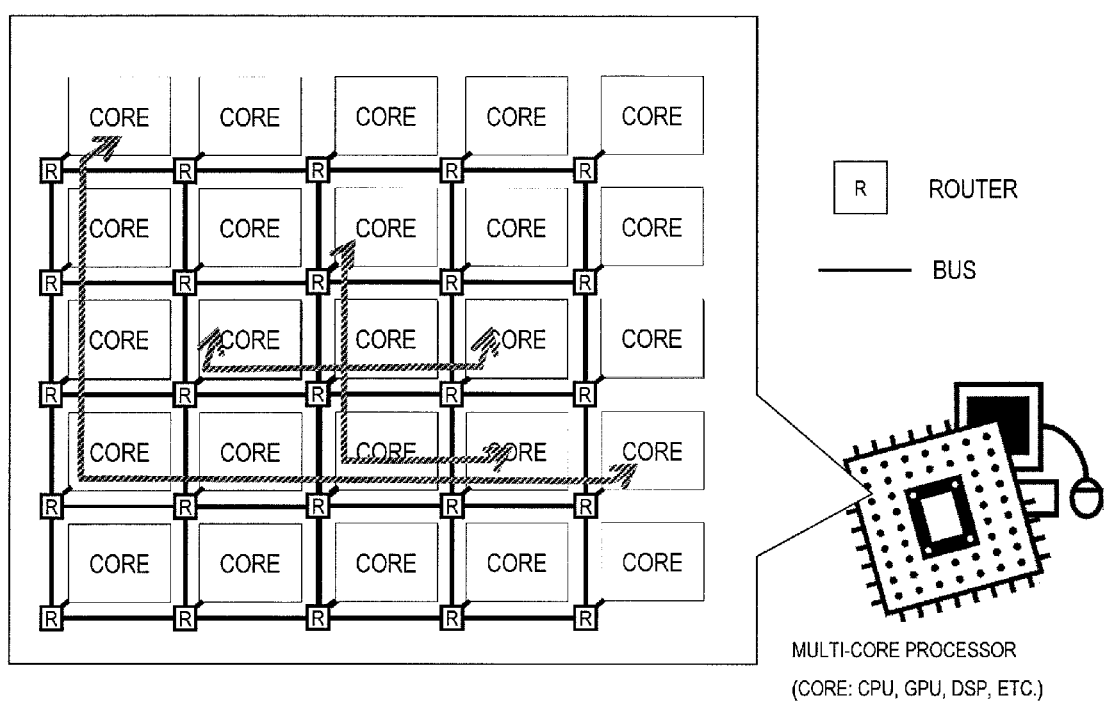
FIG. 52 shows an example of application of a router in a multi-core processor.
Figure 53A:
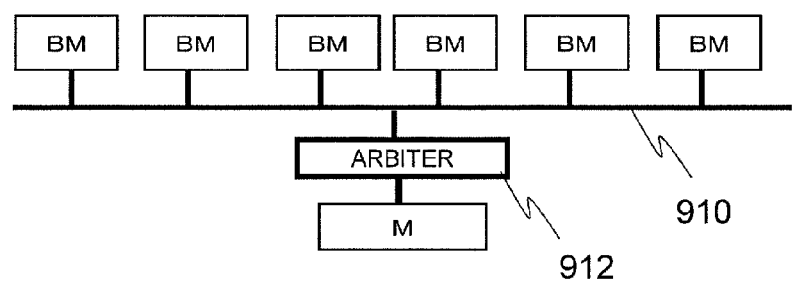
FIG. 53A shows an example of conventional centralized bus control.
Figure 53B:
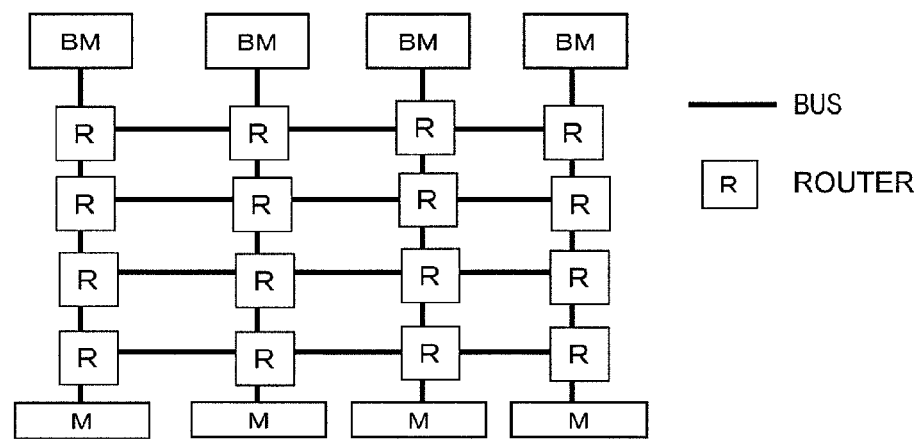
FIG. 53B shows an example of conventional distributed bus control.
Figure 54:
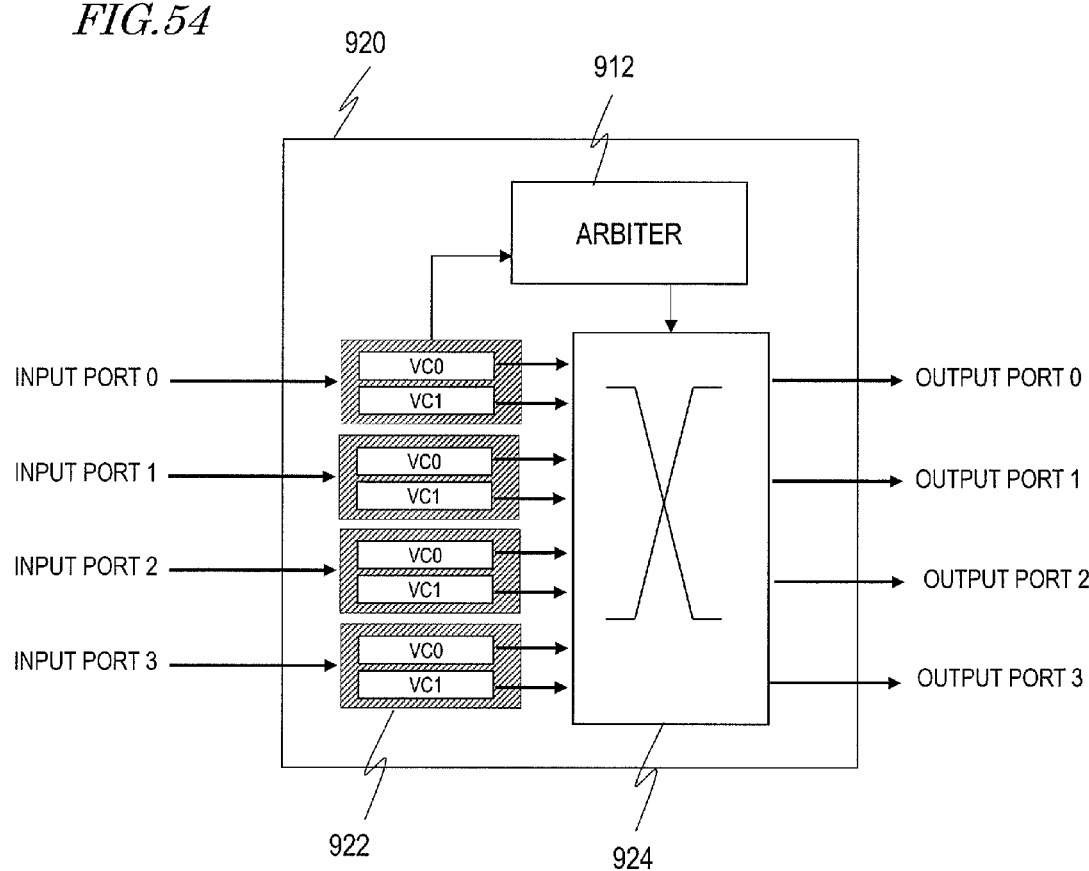
FIG. 54 shows a schematic configuration of a conventional router.
Figure 55:
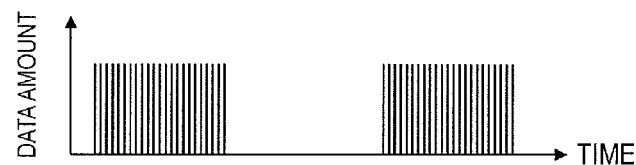
FIG. 55 shows an example of bursty traffic.

FIG. 52 illustrates a multi-core processor in which a plurality of core processors such as a CPU, a GPU, a DSP or the like are arranged in a mesh pattern and connected together with distributed buses in order to improve the processing performance of these core processors. In this configuration, each of these core processors may function as either a first node or a second node according to the present disclosure.

On this multi-core processor, communications are carried out between core processors. For example, each core processor has a cache memory for storing data necessary for performing arithmetic processes. Information stored on the cache memories can be exchanged between the core processors. Owing to this, information can be shared by the core processors, and the processing performance thereof can be improved.

However, the communications performed between the core processors on such a multi-core processor are different in positional relationship, distances (number of hops), and communication frequency. Therefore, if data packets are routed with the order thereof being maintained, there may be a router which has all the buffers occupied with packets addressed to a particular core processor and does not allow the data to flow smoothly. As a result, the performance of the multi-core processor will decline and the processing time thereof will be increased.

By contrast, in the case where a router in any of the embodiments of the present disclosure is used, packets having a high emergency level or importance level are transferred with priority. Therefore, packets directed to a specific memory are prevented from occupying buffers. Owing to this, data important in applications or services can be transferred within the time limit. In addition, the applications or services can provide user responsiveness with certainty, and video and audio data can provide a good quality. Traffic interference between data to be transferred with high priority and data to be transferred with low priority can be suppressed, and thus the transfer efficiency of the entire system can be improved, and power savings can be realized. Especially when a data transfer is delayed more than having been expected at the time of designing, important data can be transferred with priority as a measure in the case of emergency. This is also effective as a measure against the case where the system is overloaded beyond expectations.

(Exemplary Application 3)

In the embodiments and exemplary applications described above, configurations in which a router according to the present disclosure is implemented on a chip are described. In addition to being carried out as a router implemented on a chip, the present disclosure can be carried as a simulation program for performing design and verification processes which are executed in order to allow the router according to the present disclosure to be implemented on a chip. Such a simulation program is executed by a computer. For example, the elements shown in FIG. 5A and FIG. 5B are implemented as a class of objects on the simulation program. By loading a predefined simulation scenario, each class has operations corresponding to the elements performed by the computer. In other words, the operations corresponding to the elements are carried out either in series or in parallel as processing steps executed by the computer.

By loading a simulation scenario defined by a simulator, a class that is implemented as routers determines the conditions such as the priority level threshold value, time limit, traffic threshold value, and the like. This class of routers also determines the conditions such as transmission timing, destination, priority level, time passage information and the like of packets to be transmitted from other classes of routers.

In each simulation scenario, a class that is implemented as routers with bypass lines receives data from other classes of routers, and selectively executes either one of a bypass process and a usual process in accordance with whether or not the data should be bypassed. When the bypass process is to be performed, this class may send a bypass notification packet to other classes of routers in accordance with the traffic state or the buffer state, as described above in the first embodiment.

A class of routers which received the bypass notification packet decreases the transfer load by adjusting the flow rate or changing the transmission path based on the transmission state of a router at which non-bypass traffics and bypass traffics are joined together. The transmission state is, for example, the use state of the output buffer or the use state of the input buffer in an adjacent router on the subsequent stage. When the number of times of routing of the bypass notification packet is equal to or smaller than a defined value, this class of routers sends the bypass notification packet to still other classes of routers.

In each simulation scenario, a class that is implemented as routers without bypass lines, when transferring a high priority traffic, adjusts the flow rate of, or changes the path for, a low priority traffic based on the transmission state of a router at which non-bypass traffics and bypass traffics are joined together. The transmission state is, for example, the use state of the output buffer or the use state of the input buffer in an adjacent router on the subsequent stage.

A class that is implemented as routers performs an operation until the condition for ending the simulation, which is described in the simulation scenario, is satisfied. This class of routers calculates the throughput and latency during the operation, the variation in flow rate on the bus, the estimated operating frequency and power dissipation and the like, and provides such data to the user of the program. Based on such data, the user of the program evaluates the topology and performance and performs design and verification processes.

Usually on each row of the simulation scenario, information such as the ID of a node as the source, the ID of a node as the destination, the size of a packet to be sent, the transmission timing, and the like is described. By evaluating a plurality of simulation scenarios in a batch, it can be determined efficiently whether or not the intended performance is ensured by every scenario considered. Furthermore, performance comparison is performed while the topology or the number of nodes of the bus, and the arrangement of the transmitting nodes, routers and receiving destinations nodes are changed, so that it can be determined which network architecture is best suited to the simulation scenario. The configuration of any of the embodiments described above can be used as design and verification tools for this embodiment. In this manner, the present disclosure is also applicable as such design and verification tools.

For applying a router in each of the above embodiments to an actual device, the processes in the embodiments may be applied independently or in a combination. For example, the router may be configured to perform a process in the third embodiment of determining whether or not a bypass process is to be performed based on the burstiness of the data and also to perform a bypass notification process or transfer control on a non-bypass traffic in the first embodiment. Alternatively, the router may be configured to perform a process in the fourth embodiment of allocating buffer queues based on the burstiness of the data and also to perform a bypass notification process or transfer control on a non-bypass traffic in the first embodiment. Still alternatively, for example, the process in the second embodiment and the process in the third embodiment or the fourth embodiment may be combined. In this manner, processes in the embodiments may be combined in any possible manner. A combination of such processes in the embodiments can provide a combined effect.

A router according to the present disclosure is usable for transferring data on a data transfer system such as a system LSI.

While the present disclosure has been described with respect to preferred embodiments thereof, it will be apparent to those skilled in the art that the disclosed disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A router usable in a data transfer system which includes a first node for transmitting data, a second node for receiving the data transmitted from the first node, and a plurality of routers for routing the data transferred between the first node and the second node via a bus; the router comprising:

an input section configured to receive an input of data;
a switch configured to select a transmission path for the data input to the input section from a plurality of paths;
a bypass control section configured to determine, based on a type of the data input to the input section, whether or not to perform a bypass process of outputting the data with priority; and
an output control section configured to change at least one of a transmission path and a transmission flow rate of data which is not to be subjected to the bypass process and thus to control an output of the data, the output control section configured to execute a control by which when the bypass control section did not execute the bypass process, an output of the data which is not to be subjected to the bypass process is controlled based on a transmission state of another first router at which data that was not subjected to the bypass process and data that was subjected to the bypass process by another second router are joined together.

2. The router of claim 1, further comprising a bypass notification section configured, when the bypass process was executed, to notify information indicating that the bypass process was executed to another router that inputted data to the input section.

3. The router of claim 1, further comprising a buffer section configured to store the data input to the input section;
wherein the bypass control section is configured to determine whether to execute a usual process of outputting the data input to the input section via the buffer section or to execute a bypass process of outputting the data without having the data pass the buffer section, the determination being made based on the type of the input data.

4. The router of claims 1, wherein the bypass control section is configured to determine whether to perform a usual process of outputting the data via the switch or to perform a bypass process of outputting the data via a bypass without having the data pass the switch, the determination being made based on information representing burstiness of the data input to the input section.

5. The router of claim 1, further comprising a buffer section including a plurality of data storage sections configured to store the data received by the input section;
wherein the bypass control section is configured to determine whether or not to store the data on a pre-secured specific data storage section among the plurality of data storage sections, or whether or not to store the data on a pre-secured specific data storage section among a plurality of data storage sections in a buffer section of another router which is an output destination, the determination being made based on information representing burstiness of the data received by the input section, and thus to execute the bypass process on the data determined as having burstiness.

6. The router of claim 4, wherein the information representing burstiness is at least one of a transfer amount per unit time, a transmission cycle, a transmission interval, a number of packets transferred continually, and a time delay.

7. The router of claim 4, wherein the information representing burstiness is at least one of a permissible throughput and a permissible time delay of the data.

8. The router of claim 4, wherein the information representing burstiness is at least one of an identifier representing burstiness, a priority level of the data, an identifier representing the type of the data, and an identifier specifying the first node.

9. The router of claim 4, wherein the bypass control section is configured to determine the data as having burstiness and execute the bypass process in at least one of the cases where the transfer amount per unit time of the data is larger than a predefined threshold value, where the transmission cycle of the data is shorter than a predefined threshold value, where the transmission interval of the data is shorter than a predefined threshold value, where the number of packets transferred continually is larger than a predefined threshold value, and where the permissible time delay of the data is shorter than a predefined threshold value.

10. The router of claim 1, wherein the input section is configured to receive information representing the transmission state of the another first router, and the output control section is configured to execute the second control based on the information.

11. The router of claim 1, wherein the transmission state is at least one of a free capacity of a buffer connected to the switch, a used amount of the buffer, a wait time, a throughput, and a transfer efficiency.

12. The router of claim 11, wherein the output control section includes a buffer measurement section configured to measure at least one of the free capacity of the buffer and the wait time at the buffer.

13. The router of claim 12, wherein when the free capacity of the buffer is equal to or larger than a preset threshold value, the output control section decreases the transmission flow rate of, or stops the transfer of, the data which is not to be subjected to the bypass process; and when the free capacity of the buffer is smaller than the threshold value, the output control section changes the transmission path for the data which is not subjected to the bypass process.

14. The router of claim 12, wherein the buffer is an input buffer of an adjacent router.

15. The router of claim 1, wherein:
in the data received by the input section, an identifier representing at least one of a priority level, time passage information, a packet length, and a number of routing stages is described; and
the bypass control section is configured to determine whether or not to execute the bypass process based on the identifier.

16. The router of claim 1, wherein:
in the data received by the input section, an identifier representing a priority level is described; and
the output control section is configured to control an output from the switch of a low priority traffic having a priority level lower than the threshold value when a high priority traffic having a priority level set to a value equal to or higher than a preset threshold value is transmitted.

17. A method for controlling a router usable in a data transfer system which includes a first node for transmitting data, a second node for receiving the data transmitted from the first node, and a plurality of routers for routing the data transferred between the first node and the second node via a bus; the method comprising the steps of:
receiving an input of data;
selecting a transmission path for the data from a plurality of paths by use of a switch;
determining, based on a type of the data, whether or not to perform a bypass process of outputting the data with priority; and
executing a control by which when the bypass process was not executed, at least one of the transmission path and the transmission flow rate of the data which is not to be subjected to the bypass process is changed based on a transmission state of another first router at which data which was not subjected to the bypass process and data which was subjected to the bypass process by another second router are joined together.

18. The method of claim 17, the method further comprising executing another control by which when the bypass process was executed, at least one of a transmission path and a transmission flow rate of data which is not to be subjected to the bypass process and has the same destination as data which was subjected to the bypass process is changed based on a transmission state of the router.

19. A control program, stored on a non-transitory computer-readable medium, and to be executed by a computer mounted on a router usable in a data transfer system which includes a first node for transmitting data, a second node for receiving the data transmitted from the first node, and a plurality of routers for routing the data transferred between the first node and the second node via a bus; the control program causing the computer mounted on the router to execute the steps of:
receiving an input of data;
selecting a transmission path for the data from a plurality of paths by use of a switch;
determining, based on a type of the data, whether or not to perform a bypass process of outputting the data with priority; and
executing control by which when the bypass process was not executed, at least one of the transmission path and the transmission flow rate of the data which is not to be subjected to the bypass process is changed based on a transmission state of another first router at which data which was not subjected to the bypass process and data which was subjected to the bypass process by another second router are joined together.

20. The control program of claim 19, the program causing the computer to further execute another control by which when the bypass process was executed, at least one of a transmission path and a transmission flow rate of data which is not to be subjected to the bypass process and has the same destination as data which was subjected to the bypass process is changed based on a transmission state of the router.

21. A simulation program, stored on a non-transitory computer-readable medium, and to be executed by a computer, the program being dedicated to design a router usable in a data transfer system which includes a first node for transmitting data, a second node for receiving the data transmitted from the first node, and a plurality of routers for routing the data transferred between the first node and the second node via a bus; the simulation program causing the computer to execute the steps of:
receiving an input of data;
selecting a transmission path for the data from a plurality of paths by use of a switch;
determining, based on a type of the data, whether or not to perform a bypass process of outputting the data with priority; and
executing control by which when the bypass process was not executed, at least one of the transmission path and the transmission flow rate of the data which is not to be subjected to the bypass process is changed based on a transmission state of another first router at which data which was not subjected to the bypass process and data which was subjected to the bypass process by another second router are joined together.

22. The router of claim 1, wherein the output control section further configured executes another control by which when the bypass control section executed the bypass process, an output of the data which is not to be subjected to the bypass process and has the same destination as data that was subjected to the bypass process is controlled based on a transmission state of the router.

23. The simulation program of claim 21, the program causing the computer to further execute another control by which when the bypass process was executed, at least one of a transmission path and a transmission flow rate of data which is not to be subjected to the bypass process and has the same destination as data which was subjected to the bypass process is changed based on a transmission state of the router.

\* \* \* \* \*